US012750132B2

(12) United States Patent
Qian et al.

(10) Patent No.: US 12,750,132 B2
(45) Date of Patent: Sep. 29, 2026

(54) LETTER DOWNLOAD QUERY METHOD IN BeiDou COMMUNICATION SYSTEM, SYSTEM, AND RELATED APPARATUS

(71) Applicant: Huawei Technologies Co., Ltd., Shenzhen (CN)

(72) Inventors: Feng Qian, Shanghai (CN); Wenyu Gan, Shanghai (CN); Ying Zhu, Shenzhen (CN); Xudong Zhu, Shanghai (CN); Haibo Xu, Beijing (CN); Bao Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 414 days.

(21) Appl. No.: 18/294,838

(22) PCT Filed: Aug. 4, 2022

(86) PCT No.: PCT/CN2022/110364
§ 371 (c)(1),
(2) Date: Feb. 2, 2024

(87) PCT Pub. No.: WO2023/011605
PCT Pub. Date: Feb. 9, 2023

(65) Prior Publication Data

US 2024/0429999 A1 Dec. 26, 2024

(30) Foreign Application Priority Data

Aug. 6, 2021 (CN) ......................... 202110903843.2
Oct. 18, 2021 (CN) ......................... 202111212370.8

(51) Int. Cl.
*H04B 7/185* (2006.01)

(52) U.S. Cl.
CPC ..... *H04B 7/18586* (2013.01); *H04B 7/18584* (2013.01)

(58) Field of Classification Search
CPC ............ H04B 7/18586; H04B 7/18584; H04B 7/185; H04B 7/18558; H04L 51/58;
(Continued)

(56) References Cited

U.S. PATENT DOCUMENTS 6,223,045 B1 * 4/2001 Valentine ................ H04W 4/14
455/433
2009/0248813 A1 * 10/2009 Sawhney .............. H04L 51/063
709/206

(Continued)

FOREIGN PATENT DOCUMENTS

CN 115842799 A 3/2023

*Primary Examiner* — Abdullahi Ahmed
(74) *Attorney, Agent, or Firm* — Conley Rose, P.C.

(57) ABSTRACT

A letter download query method may include a terminal sending a letter download query request packet to a satellite network device, where the letter download query request packet includes a service type field and a message ID field, the service type field indicates a service type of the letter download query request packet, and the message ID field indicates an ID of a letter successfully received by the terminal last time. The terminal receives a letter download query result packet from the satellite network device, where the letter download query result packet includes an original letter sending time field and a letter content field, the original letter sending time field indicates original sending time of letter content in the letter content field, and the letter content field indicates letter content from one or more target terminals to the terminal.

20 Claims, 17 Drawing Sheets

(58) Field of Classification Search
CPC ....... H04L 51/23; H04L 51/214; H04L 51/42; H04W 4/12
See application file for complete search history.

(56) References Cited

U.S. PATENT DOCUMENTS

| | | | | |
|---|---|---|---|---|
| 2013/0295890 | A1* | 11/2013 | Kim | H04W 4/18 455/414.1 |
| 2016/0142360 | A1* | 5/2016 | Hirano | H04L 51/23 709/206 |
| 2022/0004289 | A1* | 1/2022 | Srivastava | G06F 3/04895 |
| 2024/0054487 | A1* | 2/2024 | Jiang | G06Q 20/389 |

* cited by examiner

LETTER DOWNLOAD QUERY METHOD IN BeiDou COMMUNICATION SYSTEM, SYSTEM, AND RELATED APPARATUS

CROSS-REFERENCE TO RELATED APPLICATIONS

This is a National Stage of International Patent Application No. PCT/CN2022/110364 filed on Aug. 4, 2022, which claims priority to Chinese Patent Application No. 202110903843.2 filed on Aug. 6, 2021 and Chinese Patent Application No. 202111212370.8 filed on Oct. 18, 2021. All of the aforementioned applications are hereby incorporated by reference in their entireties.

TECHNICAL FIELD

This application relates to the field of BeiDou communication technologies, and in particular, to a letter download query method in a BeiDou communication system, a system and a related apparatus.

BACKGROUND

A BeiDou satellite navigation system is an important infrastructure independently developed by China and integrates positioning, timing, and communication. A BeiDou short packet system sends short packet information through the BeiDou satellite system, and is especially suitable for communication in an area that mobile communication does not cover or cannot cover or an area in which a communication system is damaged, for example, an ocean, a desert, a grassland, or a no-man's land. When a terminal is in an environment in which communication is performed in the area that mobile communication does not cover or cannot cover or the area in which a communication system is damaged, the terminal cannot learn, in time through a cellular network or a wireless local area network (for example, wireless fidelity (wireless fidelity, Wi-Fi)), whether there is a letter sent to the terminal.

Therefore, when there is no cellular network or wireless local area network in the environment in which the terminal is located, how the terminal obtains a letter sent by a terminal in another cellular network to the terminal is an urgent problem to be resolved.

SUMMARY

Embodiments of this application provide a letter download query method in a BeiDou communication system, a system, and a related apparatus. According to the letter download query method in the BeiDou communication system provided in embodiments of this application, when there is no cellular network or wireless local area network in an environment in which a terminal is located, the terminal may still download a letter sent by another terminal to the terminal.

According to a first aspect, an embodiment of this application provides a letter download query method in a BeiDou communication system. The method may include: A first terminal sends a letter download query request packet to a BeiDou network device, where the letter download query request packet is used to download content of a letter sent by one or more second terminals to the first terminal, the letter download query request packet includes a message ID field, the message ID field indicates an ID of a first letter successfully received by the first terminal last time, and the ID of the first letter indicates the BeiDou network device to delete the first letter; and the first terminal receives a letter download query result packet sent by the BeiDou network device, where the letter download query result packet includes a letter content field and a letter ID field, the letter content field indicates content of a second letter sent by the one or more second terminals to the first terminal, the letter ID field indicates an ID of the second letter, the ID of the second letter and the ID of the first letter are arranged in sequence, and the ID of the second letter is arranged after the ID of the first letter.

In this way, when there is no cellular network or wireless local area network in an environment in which the first terminal is located, the terminal may still download a letter sent by another terminal to the first terminal.

With reference to the first aspect, in a possible implementation, the letter download query request packet further includes a service type field, and when the service type field is a first value, the service type field indicates that the letter download query request packet is used to download content of a second letter sent by a second terminal in a trustlist to the first terminal; when the service type field is a second value, the service type field indicates that the letter download query request packet is used to download content of a second letter sent by a second terminal that is not in a trustlist to the first terminal; or when the service type field is a third value, the service type field indicates that the letter download query request packet is used to download content of second letters sent by all second terminals to the first terminal. The trustlist is set in the first terminal, and the trustlist is used to store an identifier of a second terminal associated with the first terminal and a sequence number of the second terminal associated with the first terminal.

In this way, the first terminal may specify a specific service type of the letter download query request packet by using the service type field. After receiving the letter download query request packet, the BeiDou network device may also learn the service type of the letter download query request packet by using the service type field.

With reference to the first aspect, in a possible implementation, when the service type field is the first value, the letter download query request packet further includes a first sender ID field, and the first sender ID field indicates a sequence number of the second terminal in the trustlist; or when the service type field is the second value, the letter download query request packet further includes a first sender ID field, and the first sender ID field indicates an identifier of the second terminal that is not in the trustlist.

In this way, after receiving the letter download query request packet, the BeiDou network device may determine, based on the identifier in the sender ID field, a specific terminal that sends a letter that needs to be downloaded by the first terminal to the first terminal.

With reference to the first aspect, in a possible implementation, the letter download query request packet further includes a receipt indicator field, and the receipt indicator field may indicate whether a receiving device (for example, the BeiDou network device) of the letter download query request packet needs to return an application layer receipt to the first terminal. The application layer receipt may indicate whether the receiving device successfully receives the letter download query request packet. A length of the receipt indicator field may be 1 bit. When the receipt indicator field is a value D1 (for example, 0), the receipt indicator field may indicate that the receiving device of the letter download query request packet does not need to return the application layer receipt to the first terminal. When the receipt indicator field is a value D2 (for example 1), the receipt indicator field may indicate that the receiving device of the letter download query request packet needs to return the application layer receipt to the first terminal.

With reference to the first aspect, in a possible implementation, the letter download query request packet further includes an encryption indicator field, and the encryption indicator field may indicate whether the letter download query request packet is encrypted.

Further, in a possible implementation, a length of the encryption indicator field may be 2 bits.

With reference to the first aspect, in a possible implementation, the letter download query request packet further includes a compression indicator field, and the compression indicator field may indicate whether the letter download query request packet is compressed.

Further, in a possible implementation, a length of the compression indicator field may be 2 bits.

With reference to the first aspect, in a possible implementation, the letter download query request packet further includes an application layer authentication code field, and the application layer authentication code field may be used for application layer authentication.

Further, in a possible implementation, a length of the application layer authentication code field may be 16 bits.

With reference to the first aspect, in a possible implementation, the letter download query result packet further includes a trustlist indicator field and a second sender ID field; and when the trustlist indicator field is a fourth value, the trustlist indicator field indicates that the second sender ID field is a mobile phone number of the second terminal that is not in the trustlist; or when the trustlist indicator field is a fifth value, the trustlist indicator field indicates that the second sender ID field is a sequence number of the second terminal in the trustlist.

In this way, after receiving the letter download query result packet, the first terminal knows based on the trustlist indicator field, how to parse the second sender ID field in the letter download query result packet. The first terminal may determine, based on the second sender ID field, which second terminal sends the letter to the first terminal.

With reference to the first aspect, in a possible implementation, the letter download query result packet further includes a message type indicator field; and when the message type indicator field is a sixth value, the message type indicator field indicates that the letter download query result packet indicates a quantity of second letters sent by the one or more second terminals to the first terminal; or when the message type indicator field is a seventh value, the message type indicator field indicates that the letter download query result packet indicates the content of the second letter sent by the one or more second terminals to the first terminal.

In this way, after receiving the letter download query result packet, the first terminal may determine a type of the letter download query result packet based on the message type indicator field in the letter download query result packet. Therefore, the first terminal can correctly parse the letter download query result packet.

With reference to the first aspect, in a possible implementation, the letter download query result packet further includes a letter download completion indicator field; and when the service type field is the first value or the second value, the letter download completion indicator field indicates whether there is still a letter sent by the second terminal to the first terminal after the BeiDou network device sends the second letter; or when the service type field is the third value, the letter download completion indicator field indicates whether there are still letters sent by all the second terminals to the first terminal after the BeiDou network device sends the second letter.

In this way, the first terminal may determine, based on the letter download completion indicator field, whether there is a subsequent to-be-downloaded letter.

With reference to the first aspect, in a possible implementation, the letter download query result packet further includes an original message sending time field, and the original message sending time field indicates original sending time of the second letter.

In this way, the first terminal may determine the original sending time of the letter based on the original message sending time field.

With reference to the first aspect, in a possible implementation, the letter download query result packet further includes a location information indicator field; and when the location indicator field is an eighth value, the location information indicator field indicates that there is no location information field in a subsequent field; or when the location indicator field is a ninth value, the location information indicator field indicates that there is a location information field in a subsequent field.

In this way, the first terminal may correctly parse a subsequent field in the letter download query result packet based on the location information indicator field.

With reference to the first aspect, in a possible implementation, when the location information indicator field is the ninth value, the letter download query result packet further includes the location information field, and the location information field indicates location information of a second terminal indicated by a sender ID field.

In this way, a user of the first terminal finds a user of the second terminal as soon as possible based on the location information sent by the second terminal. Alternatively, when the first terminal is not far away from the second terminal, but a location of the second terminal is covered by a cellular network, and a location of the first terminal is not covered by a cellular network, the first terminal may find, as soon as possible based on the location information sent by the second terminal, an area covered by the cellular network. In this way, the first terminal may also contact the second terminal as soon as possible.

With reference to the first aspect, in a possible implementation, the letter download query result packet further includes a data format indicator field, and the data format indicator field indicates a format of the content of the second letter.

In this way, the first terminal may correctly parse the content of the second letter based on the data format indicator field.

With reference to the first aspect, in a possible implementation, the letter download query result packet further includes an encryption indicator field, and the encryption indicator field may indicate whether the letter download query result packet is encrypted.

Further, in a possible implementation, a length of the encryption indicator field may be 2 bits.

With reference to the first aspect, in a possible implementation, the letter download query result packet further includes a compression indicator field, and the compression indicator field may indicate whether the letter download query result packet is compressed.

Further, in a possible implementation, a length of the compression indicator field may be 2 bits.

With reference to the first aspect, in a possible implementation, the letter download query result packet further includes an application layer authentication code field, and the application layer authentication code field may be used for application layer authentication.

Further, in a possible implementation, a length of the application layer authentication code field may be 16 bits.

With reference to the first aspect, in a possible implementation, before the first terminal sends the letter download query request packet to the BeiDou network device, the method may further include: The first terminal detects a first operation, and generates the letter download query request packet based on the first operation.

With reference to the first aspect, in a possible implementation, that a first terminal sends a letter download query request packet to a BeiDou network device includes: The first terminal delivers, at an application APP layer, the letter download query request packet to a message data convergence protocol MDCP layer of the first terminal as an MDCP service data unit SDU of the MDCP layer, after adding padding data and a redundancy length indicator field to the MDCP SDU, the first terminal segments the MDCP SDU into one or more MDCP protocol data units PDUs, where the one or more MDCP PDUs include a first MDCP PDU; the first terminal delivers the first MDCP PDU to a satellite link control SLC layer as an SLC SDU of the SLC layer; the first terminal segments the SLC SDU into one or more SLC PDUs; and the first terminal sends the one or more SLC PDUs to the BeiDou network device.

With reference to the first aspect, in a possible implementation, that the first terminal receives a letter download query result packet sent by the BeiDou network device includes: The first terminal receives P SLC PDUs sent by the BeiDou network device, where P is a positive integer; the first terminal splices the P SLC PDUs into Q SLC SDUs at the SLC layer, where Q is a positive integer, and Q is less than or equal to P; the first terminal uploads the Q SLC SDUs to the MDCP layer as Q MDCP PDUs of the MDCP layer; the first terminal splices the Q MDCP PDUs into an MDCP SDU at the MDCP layer; and after removing padding data and a redundancy length indicator field from the MDCP SDU at the MDCP layer, the first terminal uploads the MDCP SDU to the APP layer as the letter download query result packet.

With reference to the first aspect, in a possible implementation, after the first terminal receives the letter download query result packet sent by the BeiDou network device, the method may further include: The first terminal parses the content that is of the second letter sent by the one or more second terminals to the first terminal and that is in the letter content field in the letter download query result packet; and the first terminal displays the content of the second letter on a display.

According to a second aspect, an embodiment of this application provides a letter download query method in a BeiDou communication system. The method may include: A BeiDou network device receives a letter download query request packet sent by a first terminal, where the letter download query request packet is used to download content of a letter sent by one or more second terminals to the first terminal, the letter download query request packet includes a message ID field, the message ID field indicates an ID of a first letter successfully received by the first terminal last time, and the ID of the first letter indicates the BeiDou network device to delete the first letter; the BeiDou network device generates a letter download query result packet based on the letter download query request packet where the letter download query result packet includes a letter content field and a letter ID field, the letter content field indicates content of a second letter sent by the one or more second terminals to the first terminal, the letter ID field indicates an ID of the second letter, the ID of the second letter and the ID of the first letter are arranged in sequence, and the ID of the second letter is arranged after the ID of the first letter; and the BeiDou network device sends the letter download query result packet to the first terminal.

In this way, when there is no cellular network or wireless local area network in an environment in which the first terminal is located, the terminal may still download a letter sent by another terminal to the first terminal.

With reference to the second aspect, in a possible implementation, the letter download query request packet further includes a service type field; and when the service type field is a first value, the service type field indicates that the letter download query request packet is used to download content of a second letter sent by a second terminal in a trustlist to the first terminal; when the service type field is a second value, the service type field indicates that the letter download query request packet is used to download content of a second letter sent by a second terminal that is not in a trustlist to the first terminal; or when the service type field is a third value, the service type field indicates that the letter download query request packet is used to download content of second letters sent by all second terminals to the first terminal. The trustlist is set in the first terminal, and the trustlist is used to store an identifier of a second terminal associated with the first terminal and a sequence number of the second terminal associated with the first terminal.

In this way, the first terminal may specify a specific service type of the letter download query request packet by using the service type field. After receiving the letter download query request packet, the BeiDou network device may also learn the service type of the letter download query request packet by using the service type field.

With reference to the second aspect, in a possible implementation, when the service type field is the first value, the letter download query request packet further includes a first sender ID field, and the first sender ID field indicates a sequence number of the second terminal in the trustlist; or when the service type field is the second value, the letter download query request packet further includes a first sender ID field, and the first sender ID field indicates an identifier of the second terminal that is not in the trustlist.

In this way, after receiving the letter download query request packet, the BeiDou network device may determine, based on the identifier in the sender ID field, a specific terminal that sends a letter that needs to be downloaded by the first terminal to the first terminal.

With reference to the second aspect, in a possible implementation, the letter download query request packet further includes a receipt indicator field, and the receipt indicator field may indicate whether a receiving device (for example, the BeiDou network device) of the letter download query request packet needs to return an application layer receipt to the first terminal. The application layer receipt may indicate whether the receiving device successfully receives the letter download query request packet. A length of the receipt indicator field may be 1 bit. When the receipt indicator field is a value D1 (for example, 0), the receipt indicator field may indicate that the receiving device of the letter download query request packet does not need to return the application layer receipt to the first terminal. When the receipt indicator field is a value D2 (for example, 1), the receipt indicator field may indicate that the receiving device of the letter download query request packet needs to return the application layer receipt to the first terminal.

With reference to the second aspect, in a possible implementation, the letter download query request packet further includes an encryption indicator field, and the encryption indicator field may indicate whether the letter download query request packet is encrypted.

Further, in a possible implementation, a length of the encryption indicator field may be 2 bits.

With reference to the second aspect, in a possible implementation, the letter download query request packet further includes a compression indicator field, and the compression indicator field may indicate whether the letter download query request packet is compressed.

Further, in a possible implementation, a length of the compression indicator field may be 2 bits.

With reference to the second aspect, in a possible implementation, the letter download query request packet further includes an application layer authentication code field, and the application layer authentication code field may be used for application layer authentication.

Further, in a possible implementation, a length of the application layer authentication code field may be 16 bits.

With reference to the second aspect, in a possible implementation, the letter download query result packet further includes a trustlist indicator field and a second sender ID field; and when the trustlist indicator field is a fourth value, the trustlist indicator field indicates that the second sender ID field is a mobile phone number of the second terminal that is not in the trustlist; or when the trustlist indicator field is a fifth value, the trustlist indicator field indicates that the second sender ID field is a sequence number of the second terminal in the trustlist.

In this way, after receiving the letter download query result packet, the first terminal knows, based on the trustlist indicator field, how to parse the second sender ID field in the letter download query result packet. The first terminal may determine, based on the second sender ID field, which second terminal sends the letter to the first terminal.

With reference to the second aspect, in a possible implementation, the letter download query result packet further includes a message type indicator field; and when the message type indicator field is a sixth value, the message type indicator field indicates that the letter download query result packet indicates a quantity of second letters sent by the one or more second terminals to the first terminal; or when the message type indicator field is a seventh value, the message type indicator field indicates that the letter download query result packet indicates the content of the second letter sent by the one or more second terminals to the first terminal.

In this way, after receiving the letter download query result packet, the first terminal may determine a type of the letter download query result packet based on the message type indicator field in the letter download query result packet. Therefore, the first terminal can correctly parse the letter download query result packet.

With reference to the second aspect, in a possible implementation, the letter download query result packet further includes a letter download completion indicator field; and when the service type field is the first value or the second value, the letter download completion indicator field indicates whether there is still a letter sent by the second terminal to the first terminal after the BeiDou network device sends the second letter; or when the service type field is the third value, the letter download completion indicator field indicates whether there are still letters sent by all the second terminals to the first terminal after the BeiDou network device sends the second letter.

In this way, the first terminal may determine, based on the letter download completion indicator field, whether there is a subsequent to-be-downloaded letter.

With reference to the second aspect, in a possible implementation, the letter download query result packet further includes an original message sending time field, and the original message sending time field indicates original sending time of the second letter.

In this way, the first terminal may determine the original sending time of the letter based on the original message sending time field.

With reference to the second aspect, in a possible implementation, the letter download query result packet further includes a location information indicator field; and when the location indicator field is an eighth value, the location information indicator field indicates that there is no location information field in a subsequent field; or when the location indicator field is a ninth value, the location information indicator field indicates that there is a location information field in a subsequent field.

In this way, the first terminal may correctly parse a subsequent field in the letter download query result packet based on the location information indicator field.

With reference to the second aspect, in a possible implementation, when the location information indicator field is the ninth value, the letter download query result packet further includes the location information field, and the location information field indicates location information of a second terminal indicated by a sender ID field.

In this way, a user of the first terminal finds a user of the second terminal as soon as possible based on the location information sent by the second terminal. Alternatively, when the first terminal is not far away from the second terminal, but a location of the second terminal is covered by a cellular network, and a location of the first terminal is not covered by a cellular network, the first terminal may find, as soon as possible based on the location information sent by the second terminal, an area covered by the cellular network. In this way, the first terminal may also contact the second terminal as soon as possible.

With reference to the second aspect, in a possible implementation, the letter download query result packet further includes a data format indicator field, and the data format indicator field indicates a format of the content of the second letter.

In this way, the first terminal may correctly parse the content of the second letter based on the data format indicator field.

With reference to the second aspect, in a possible implementation, the letter download query result packet further includes an encryption indicator field, and the encryption indicator field may indicate whether the letter download query result packet is encrypted.

Further, in a possible implementation, a length of the encryption indicator field may be 2 bits.

With reference to the second aspect, in a possible implementation, the letter download query result packet further includes a compression indicator field, and the compression indicator field may indicate whether the letter download query result packet is compressed.

Further, in a possible implementation, a length of the compression indicator field may be 2 bits.

With reference to the second aspect, in a possible implementation, the letter download query result packet further includes an application layer authentication code field, and the application layer authentication code field may be used for application layer authentication.

Further, in a possible implementation, a length of the application layer authentication code field may be 16 bits.

With reference to the second aspect, in a possible implementation, that a BeiDou network device receives a letter download query request packet sent by a first terminal includes: The BeiDou network device receives X SLC PDUs sent by the first terminal, where X is a positive integer; the BeiDou network device splices the X SLC PDUs into Y SLC SDUs at an SLC layer, where Y is a positive integer, and Y is less than or equal to X; the BeiDou network device uploads the Y SLC SDUs to an MDCP layer as Y MDCP PDUs of the MDCP layer; the BeiDou network device splices the Y MDCP PDUs into an MDCP SDU at the MDCP layer; and after removing padding data and a redundancy length indicator field from the MDCP SDU at the MDCP layer, the BeiDou network device uploads the MDCP SDU to an APP layer as the letter download query request packet.

With reference to the second aspect, in a possible implementation, that the BeiDou network device generates a letter download query result packet based on the letter download query request packet includes. The BeiDou network device queries, based on the letter download query request packet after sending time of the first letter, a short message service center for the content of the second letter sent by the one or more second terminals to the first terminal; and the BeiDou network device generates the letter download query result packet based on the content of the second letter.

With reference to the second aspect, in a possible implementation, that the BeiDou network device sends the letter download query result packet to the first terminal includes: The BeiDou network device delivers, at the application APP layer, the letter download query result packet to the message data convergence protocol MDCP layer of the BeiDou network device as an MDCP service data unit SDU of the MDCP layer; after adding padding data and a redundancy length indicator field to the MDCP SDU, the BeiDou network device segments the MDCP SDU into one or more MDCP protocol data units PDUs, where the one or more MDCP PDUs include a second MDCP PDU; the first terminal delivers the second MDCP PDU to the satellite link control SLC layer as an SLC SDU of the SLC layer; the BeiDou network device segments the SLC SDU into one or more SLC PDUs; and the BeiDou network device sends the one or more SLC PDUs to the first terminal.

According to a third aspect, a BeiDou communication system is provided, and the system may include a terminal and a BeiDou network device.

A first terminal is configured to send a letter download query request packet to the BeiDou network device, where the letter download query request packet is used to download content of a letter sent by one or more second terminals to the first terminal, the letter download query request packet includes a message ID field, the message ID field indicates an ID of a first letter successfully received by the first terminal last time, and the ID of the first letter indicates the BeiDou network device to delete the first letter.

The BeiDou network device is configured to receive the letter download query request packet sent by the first terminal.

The BeiDou network device is configured to generate a letter download query result packet based on the letter download query request packet, where the letter download query result packet includes a letter content field and a letter ID field, the letter content field indicates content of a second letter sent by the one or more second terminals to the first terminal after sending time of the first letter, the letter ID field indicates an ID of the second letter, the ID of the second letter and the ID of the first letter are arranged in sequence, and the ID of the second letter is arranged after the ID of the first letter.

The BeiDou network device is configured to send the letter download query result packet to the first terminal.

The first terminal is configured to receive the letter download query result packet sent by the BeiDou network device.

In this way, when there is no cellular network or wireless local area network in an environment in which the first terminal is located, the terminal may still download a letter sent by another terminal to the first terminal.

With reference to the third aspect, in a possible implementation, the letter download query request packet further includes a service type field; and when the service type field is a first value, the service type field indicates that the letter download query request packet is used to download content of a second letter sent by a second terminal in a trustlist to the first terminal; when the service type field is a second value, the service type field indicates that the letter download query request packet is used to download content of a second letter sent by a second terminal that is not in a trustlist to the first terminal; or when the service type field is a third value, the service type field indicates that the letter download query request packet is used to download content of second letters sent by all second terminals to the first terminal. The trustlist is set in the first terminal, and the trustlist is used to store an identifier of a second terminal associated with the first terminal and a sequence number of the second terminal associated with the first terminal.

In this way, the first terminal may specify a specific service type of the letter download query request packet by using the service type field. After receiving the letter download query request packet, the BeiDou network device may also learn the service type of the letter download query request packet by using the service type field.

With reference to the third aspect, in a possible implementation, when the service type field is the first value, the letter download query request packet further includes a first sender ID field, and the first sender ID field indicates a sequence number of the second terminal in the trustlist; or when the service type field is the second value, the letter download query request packet further includes a first sender ID field, and the first sender ID field indicates an identifier of the second terminal that is not in the trustlist.

In this way, after receiving the letter download query request packet, the BeiDou network device may determine, based on the identifier in the sender ID field, a specific terminal that sends a letter that needs to be downloaded by the first terminal to the first terminal.

With reference to the third aspect, in a possible implementation, the letter download query request packet further includes a receipt indicator field, and the receipt indicator field may indicate whether a receiving device (for example, the BeiDou network device) of the letter download query request packet needs to return an application layer receipt to the first terminal. The application layer receipt may indicate whether the receiving device successfully receives the letter download query request packet. A length of the receipt indicator field may be 1 bit. When the receipt indicator field is a value D1 (for example, 0), the receipt indicator field may indicate that the receiving device of the letter download query request packet does not need to return the application layer receipt to the first terminal. When the receipt indicator field is a value D2 (for example, 1), the receipt indicator field may indicate that the receiving device of the letter download query request packet needs to return the application layer receipt to the first terminal.

With reference to the third aspect, in a possible implementation, the letter download query request packet further includes an encryption indicator field, and the encryption indicator field may indicate whether the letter download query request packet is encrypted.

Further, in a possible implementation, a length of the encryption indicator field may be 2 bits.

With reference to the third aspect, in a possible implementation, the letter download query request packet further includes a compression indicator field, and the compression indicator field may indicate whether the letter download query request packet is compressed.

Further, in a possible implementation, a length of the compression indicator field may be 2 bits.

With reference to the third aspect, in a possible implementation, the letter download query request packet further includes an application layer authentication code field, and the application layer authentication code field may be used for application layer authentication.

Further, in a possible implementation, a length of the application layer authentication code field may be 16 bits.

With reference to the third aspect, in a possible implementation, the letter download query result packet further includes a trustlist indicator field and a second sender ID field; and when the trustlist indicator field is a fourth value, the trustlist indicator field indicates that the second sender ID field is a mobile phone number of the second terminal that is not in the trustlist; or when the trustlist indicator field is a fifth value, the trustlist indicator field indicates that the second sender ID field is a sequence number of the second terminal in the trustlist.

In this way, after receiving the letter download query result packet, the first terminal knows, based on the trustlist indicator field, how to parse the second sender ID field in the letter download query result packet. The first terminal may determine, based on the second sender ID field, which second terminal sends the letter to the first terminal.

With reference to the third aspect, in a possible implementation, the letter download query result packet further includes a message type indicator field; and when the message type indicator field is a sixth value, the message type indicator field indicates that the letter download query result packet indicates a quantity of second letters sent by the one or more second terminals to the first terminal; or when the message type indicator field is a seventh value, the message type indicator field indicates that the letter download query result packet indicates the content of the second letter sent by the one or more second terminals to the first terminal.

In this way, after receiving the letter download query result packet, the first terminal may determine a type of the letter download query result packet based on the message type indicator field in the letter download query result packet. Therefore, the first terminal can correctly parse the letter download query result packet.

With reference to the third aspect, in a possible implementation, the letter download query result packet further includes a letter download completion indicator field; and when the service type field is the first value or the second value, the letter download completion indicator field indicates whether there is still a letter sent by the second terminal to the first terminal after the BeiDou network device sends the second letter; or when the service type field is the third value, the letter download completion indicator field indicates whether there are still letters sent by all the second terminals to the first terminal after the BeiDou network device sends the second letter.

In this way, the first terminal may determine, based on the letter download completion indicator field, whether there is a subsequent to-be-downloaded letter.

With reference to the third aspect, in a possible implementation, the letter download query result packet further includes an original message sending time field, and the original message sending time field indicates original sending time of the second letter.

In this way, the first terminal may determine the original sending time of the letter based on the original message sending time field.

With reference to the third aspect, in a possible implementation, the letter download query result packet further includes a location information indicator field; and when the location indicator field is an eighth value, the location information indicator field indicates that there is no location information field in a subsequent field; or when the location indicator field is a ninth value, the location information indicator field indicates that there is a location information field in a subsequent field.

In this way, the first terminal may correctly parse a subsequent field in the letter download query result packet based on the location information indicator field.

With reference to the third aspect, in a possible implementation, when the location information indicator field is the ninth value, the letter download query result packet further includes the location information field, and the location information field indicates location information of a second terminal indicated by a sender ID field.

In this way, a user of the first terminal finds a user of the second terminal as soon as possible based on the location information sent by the second terminal. Alternatively, when the first terminal is not far away from the second terminal, but a location of the second terminal is covered by a cellular network, and a location of the first terminal is not covered by a cellular network, the first terminal may find, as soon as possible based on the location information sent by the second terminal, an area covered by the cellular network. In this way, the first terminal may also contact the second terminal as soon as possible.

With reference to the third aspect, in a possible implementation, the letter download query result packet further includes a data format indicator field, and the data format indicator field indicates a format of the content of the second letter.

In this way, the first terminal may correctly parse the content of the second letter based on the data format indicator field.

With reference to the third aspect, in a possible implementation, the letter download query result packet further includes an encryption indicator field, and the encryption indicator field may indicate whether the letter download query result packet is encrypted.

Further, in a possible implementation, a length of the encryption indicator field may be 2 bits.

With reference to the third aspect, in a possible implementation, the letter download query result packet further includes a compression indicator field, and the compression indicator field may indicate whether the letter download query result packet is compressed.

Further, in a possible implementation, a length of the compression indicator field may be 2 bits.

With reference to the third aspect, in a possible implementation, the letter download query result packet further includes an application layer authentication code field, and the application layer authentication code field may be used for application layer authentication.

Further, in a possible implementation, a length of the application layer authentication code field may be 16 bits.

With reference to the third aspect, in a possible implementation, the first terminal is further configured to: detect a first operation, and generate the letter download query request packet based on the first operation.

With reference to the third aspect, in a possible implementation, the first terminal is specifically configured to: deliver, at an application APP layer, the letter download query request packet to a message data convergence protocol MDCP layer of the first terminal as an MDCP service data unit SDU of the MDCP layer; after adding padding data and a redundancy length indicator field to the MDCP SDU, segment the MDCP SDU into one or more MDCP protocol data units PDUs, where the one or more MDCP PDUs include a first MDCP PDU; deliver the first MDCP PDU to a satellite link control SLC layer as an SLC SDU of the SLC layer; segment the SLC SDU into one or more SLC PDUs; and send the one or more SLC PDUs to the BeiDou network device.

With reference to the third aspect, in a possible implementation, the first terminal may be specifically configured to: receive P SLC PDUs sent by the BeiDou network device, where Pis a positive integer; splice the P SLC PDUs into Q SLC SDUs at the SLC layer, where Q is a positive integer, and Q is less than or equal to P; upload the Q SLC SDUs to the MDCP layer as Q MDCP PDUs of the MDCP layer; splice the Q MDCP PDUs into an MDCP SDU at the MDCP layer; and after removing padding data and a redundancy length indicator field from the MDCP SDU at the MDCP layer, upload the MDCP SDU to the APP layer as the letter download query result packet.

With reference to the third aspect, in a possible implementation, the first terminal may be further configured to: parse the content that is of the second letter sent by the one or more second terminals to the first terminal and that is in the letter content field in the letter download query result packet; and display the content of the second letter on a display:

With reference to the third aspect, in a possible implementation, the BeiDou network device may be configured to: receive X SLC PDUs sent by the first terminal, where X is a positive integer; splice the X SLC PDUs into Y SLC SDUs at an SLC layer, where Y is a positive integer, and Y is less than or equal to X; upload the Y SLC SDUs to an MDCP layer as Y MDCP PDUs of the MDCP layer; splice the Y MDCP PDUs into an MDCP SDU at the MDCP layer; and after removing padding data and a redundancy length indicator field from the MDCP SDU at the MDCP layer, upload the MDCP SDU to an APP layer as the letter download query request packet.

With reference to the third aspect, in a possible implementation, the BeiDou network device may be configured to: query, based on the letter download query request packet after sending time of the first letter, a short message service center for the content of the second letter sent by the one or more second terminals to the first terminal; and generate the letter download query result packet based on the content of the second letter.

With reference to the third aspect, in a possible implementation, the BeiDou network device may be configured to: deliver, at the application APP layer, the letter download query result packet to the message data convergence protocol MDCP layer of the BeiDou network device as an MDCP service data unit SDU of the MDCP layer; after adding padding data and a redundancy length indicator field to the MDCP SDU, segment the MDCP SDU into one or more MDCP protocol data units PDUs, where the one or more MDCP PDUs include a second MDCP PDU; deliver the second MDCP PDU to the satellite link control SLC layer as an SLC SDU of the SLC layer; segment the SLC SDU into one or more SLC PDUs; and send the one or more SLC PDUs to the first terminal.

With reference to the third aspect, in a possible implementation, the terminal may further perform the method in any possible implementation of the first aspect.

According to a fourth aspect, this application provides a communication apparatus, including one or more processors, one or more memories, and a transceiver. The transceiver and the one or more memories are coupled to the one or more processors. The one or more memories are configured to store computer program code. The computer program code includes computer instructions. When the one or more processors execute the computer instructions, the communication apparatus is enabled to perform the method in any one possible implementation of the first aspect.

The communication apparatus may be a terminal or a device in another product form.

According to a fifth aspect, this application provides a communication apparatus, including one or more processors, one or more memories, and a transceiver. The transceiver and the one or more memories are coupled to the one or more processors. The one or more memories are configured to store computer program code. The computer program code includes computer instructions. When the one or more processors execute the computer instructions, the communication apparatus is enabled to perform the method in any possible implementation of the second aspect.

The communication apparatus may be a BeiDou network device, or any network element or a combination of a plurality of network elements in a BeiDou network device.

According to a sixth aspect, this application provides a computer storage medium, including computer instructions. When the computer instructions are run on a computer, the computer is enabled to perform the method in any possible implementation of the first aspect.

According to a seventh aspect, this application provides a computer storage medium, including computer instructions. When the computer instructions are run on a computer, the computer is enabled to perform the method in any possible implementation of the second aspect.

According to an eighth aspect, this application provides a computer program product. When the computer program product runs on a computer, the computer is enabled to perform the method in any possible implementation of the first aspect.

According to a ninth aspect, this application provides a computer program product. When the computer program product runs on a computer, the computer is enabled to perform the method in any possible implementation of the second aspect.

According to a tenth aspect, this application provides a chip or a chip system, used in a terminal and including a processing circuit and an interface circuit. The interface circuit is configured to receive code instructions and transmit the code instructions to the processing circuit, and the processing circuit is configured to run the code instructions to perform the method in any possible implementation of the first aspect.

DESCRIPTION OF EMBODIMENTS

Terms used in the following embodiments of this application are merely intended to describe specific embodiments, but are not intended to limit this application. As used in the specification of this application and the appended claims, singular expressions "a". "an", "the", "the foregoing". "such a", and "this" are also intended to include plural expressions unless otherwise clearly indicated in the context. It should also be understood that, the term "and/or" used in this application indicates and includes any or all possible combinations of one or more associated listed items.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more.

The following describes a BeiDou communication system 10 according to an embodiment of this application.

Figure 1:
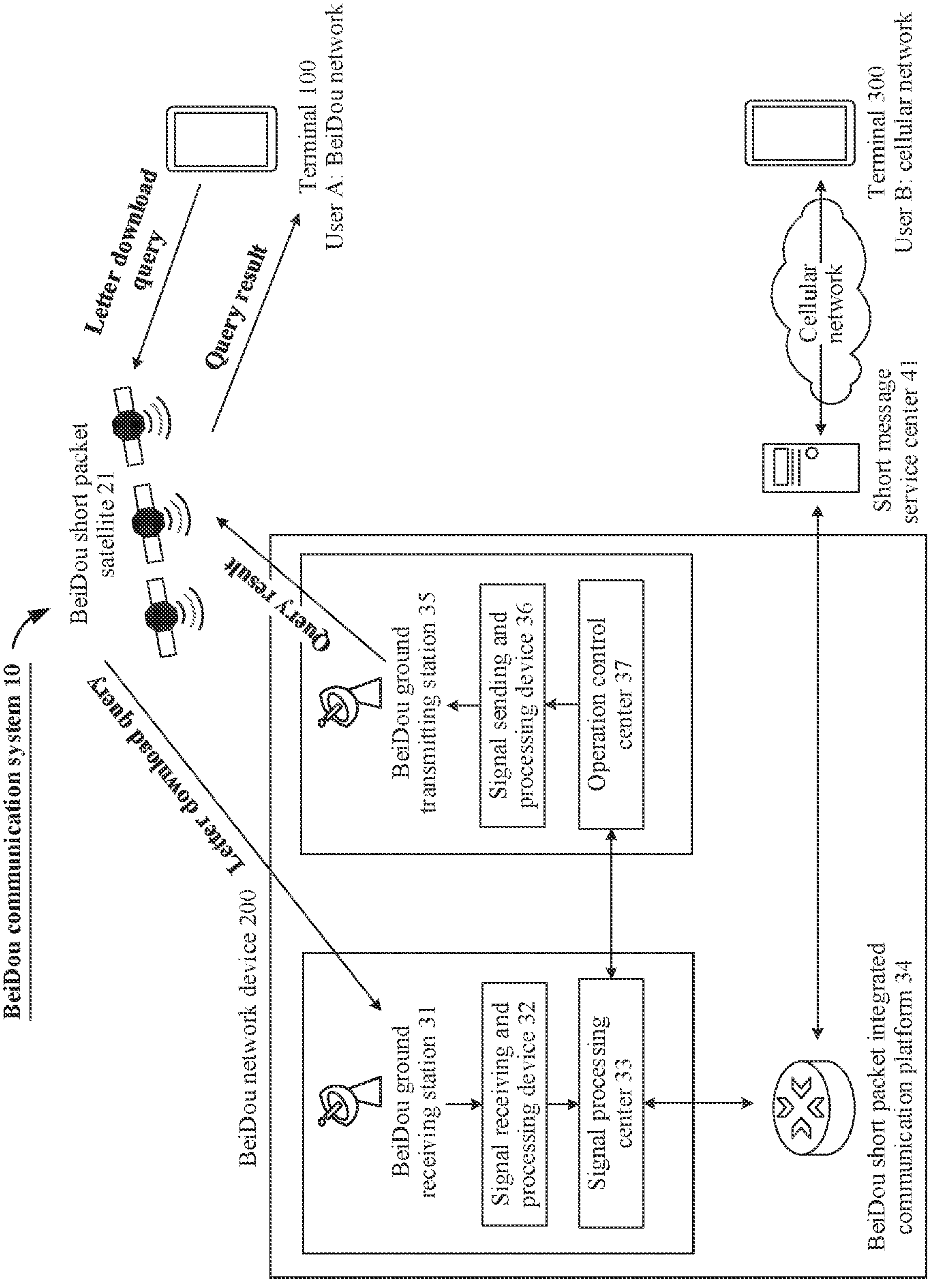
FIG. 1 is a schematic diagram of an architecture of a BeiDou communication system 10 according to an embodiment of this application.

FIG. 1 is a schematic diagram of an architecture of the BeiDou communication system 10 according to an embodiment of this application.

As shown in FIG. 1, in the BeiDou communication system 10, the BeiDou communication system 10 may include a terminal 100, a BeiDou short packet satellite 21, a BeiDou network device 200, and a short message service center (short message service center, SMSC) 41.

The terminal 100 is in a BeiDou network. In other words, a BeiDou communication module in the terminal 100 is enabled, and the terminal 100 does not camp on a cellular network. The terminal 100 may query, through the BeiDou network device 200, a letter sent to the terminal 100 by one or more terminals (for example, a terminal 300 shown in FIG. 1) camping on the cellular network.

Specifically, the terminal 100 may send a letter download query request to the BeiDou network device 200, where the letter download query request is used to query, from the BeiDou network device 200, a letter sent by another terminal to the terminal 100, and download the letter. The BeiDou network device 200 may query, based on the letter download query request, the short message service center 41 for the letter sent by the another terminal to the terminal 100. Then, the BeiDou network device 200 may return a query result to the terminal 100, that is, specific letter content or no letter.

The BeiDou network device 200 may include a BeiDou ground receiving station 31, a signal receiving and processing device 32, a signal processing center 33, a BeiDou ground transmitting station 35, a signal sending and processing device 36, an operation control center 37, and a BeiDou short packet integrated communication platform 34.

In some embodiments, the signal processing center 33 and the operation control center 37 may be referred to as a BeiDou central station. In some other embodiments, the signal receiving and processing device, the signal processing center 33, the signal sending and processing device 36, and the operation control center 37 may be referred to as a BeiDou central station.

For example, the BeiDou ground receiving station 31 may receive the letter download query request sent by the terminal 100 and forwarded by the BeiDou short packet satellite 21. The BeiDou ground receiving station 31 may send the letter download query request to the signal receiving and processing device 32, and then the signal receiving and processing device 32 may send the packet to the signal processing center 33. The signal processing center 33 and the BeiDou short packet integrated communication platform 34 may parse, according to a protocol, the letter download query request forwarded by the BeiDou short packet satellite 21, and forward parsed content of the letter download query request to the short message service center (SMSC) 41. The short message service center 41 may search, based on the content of the letter request, for a letter sent by another target terminal to the terminal 100.

In some examples, the terminal 100 may further send data to the terminal 300 through the BeiDou network device 200.

The BeiDou network device 200 may send data to the terminal 100 through the BeiDou short packet satellite 21. For example, the terminal 100 queries, through the BeiDou network, a letter sent by another terminal to the terminal 100, and the BeiDou network device 200 may return a letter download query result to the terminal 100. Specifically, the operation control center 37 may send the letter download query result to the signal sending and processing device 36, and then the signal sending and processing device 36 may send the letter download query result to the BeiDou ground transmitting station 35. The BeiDou ground transmitting station 35 sends the letter download query result to the BeiDou short packet satellite 21, and the BeiDou short packet satellite 21 relays and sends the letter download query result to the terminal 100. The letter download query result in the operation control center 37 may alternatively be obtained from the signal processing center 33.

Herein, the BeiDou ground transmitting station 35 and the BeiDou ground receiving station 31 may include one or more devices having a sending function and one or more devices having a receiving function, or may be one or more devices having a sending function and a receiving function. This is not limited herein.

In this way, even if the terminal 100 is located in the BeiDou network and does not camp on the cellular network, for example, the terminal 100 is located in an area without cellular network coverage, the terminal 100 may still query whether a terminal in the cellular network sends a letter to the terminal 100, and may obtain content of a letter sent by another terminal in the cellular network to the terminal 100.

In this embodiment of this application, data sent to the terminal 100, for example, a message, a short message, an SMS message, or an email, is referred to as a letter. Specifically, the letter may refer to a short message sent by another terminal (for example, the terminal 300 shown in FIG. 1) to a user A (for example, the terminal 100 shown in FIG. 1) in a network-free state (in other words, no cellular network is camped on or no Wi-Fi is connected to) and received by the user A. The letter download query means that the user sends a letter download query message to the BeiDou network device 200, to obtain content of a letter sent by a target terminal in the cellular network to the terminal 100. The BeiDou short packet integrated communication platform 34 in the BeiDou network device 200 receives the letter download query message. The letter download query message carries query information, and the query information indicates number information of a short message sender that the user needs to query. The letter download query result refers to content of a letter returned by the BeiDou network device 200 and received by the terminal 100 or none (in other words, the target terminal does not send a letter to the terminal 100). The letter result is specific content of the letter in a letterbox. For example, the user of the terminal 100 queries whether a parent has a letter sent to the user, and a returned letter download query result is content (for example, "Are you safely home?") of the letter sent by the parent of the user.

Figure 2:
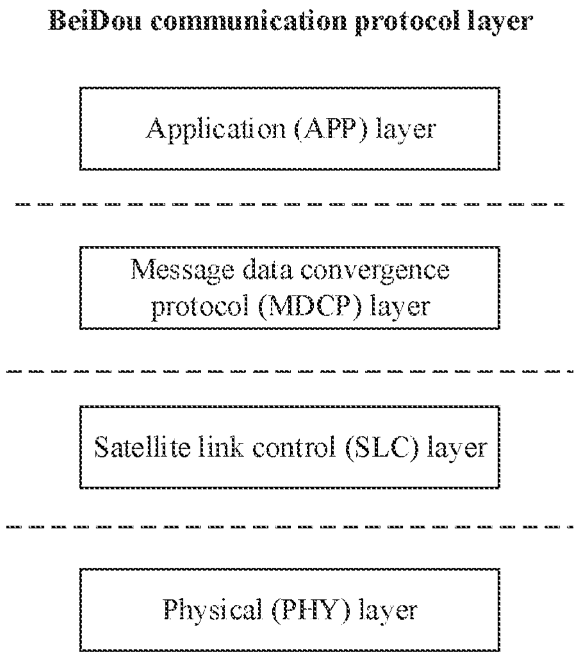
FIG. 2 is a schematic diagram of a BeiDou communication protocol layer according to an embodiment of this application.

FIG. 2 is a schematic diagram of a BeiDou communication protocol layer of the BeiDou communication system 10 according to an embodiment of this application.

As shown in FIG. 2, the BeiDou communication protocol layer may include an application (application layer protocol, APP) layer, a message data convergence protocol (message data convergence protocol. MDCP) layer, a satellite link control (satellite link control protocol, SLC) layer, and a physical (physical layer protocol, PHY) layer.

The BeiDou ground receiving station 31 and the BeiDou ground transmitting station 35 may be used for a data processing function of the BeiDou network device 200 at the PHY layer.

The signal receiving and processing device 32, the signal sending and processing device 36, the signal processing center 33, and the operation control center 37 may be used for a data processing function of the BeiDou network device 200 at the SLC layer and the MDCP layer. The BeiDou short packet integrated communication platform 34 may be used for a data processing function at the APP layer.

Currently, only a dedicated terminal in a network-free state can receive a short message (letter) forwarded by a BeiDou satellite. A specific process is as follows: When the dedicated terminal captures and traces a BeiDou signal, the dedicated terminal actively initiates a power-on report. After receiving the message, if there are buffered messages (referred to as letters below) of the user, a short packet receiving and sending processing system station directly delivers all the letters of the user. Based on a receipt of the user (feedback information of a letter receiving status), the BeiDou network device 200 determines whether to delete buffered letters. Herein, a dedicated server built in a BeiDou system performs communication management on the buffered letters. No cellular operator network element directly participates in the management, and an application scope is limited.

Currently, a mass civil terminal letterbox mechanism for a BeiDou satellite short packet is still blank. In embodiments of this application, a data transmission protocol in the BeiDou communication system is newly designed, and mainly includes a letter download query part.

In this embodiment of this application, sending, by the terminal 100, data to the BeiDou network device 200 may be referred to as inbound; and the data sent by the terminal 100 to the BeiDou network device 200 may be referred to as inbound data. Sending, by the BeiDou network device 200, data to the terminal 100 may be referred to as outbound, and the data sent by the BeiDou network device 200 to the terminal 100 may be referred to as outbound data.

The following describes a process in which the terminal 100 encapsulates a letter download query request when the terminal 100 sends the letter download query request to the BeiDou network device 200, and a process in which the BeiDou network device 200 parses the letter download query request when the BeiDou network device 200 receives the letter download query request.

The following describes a protocol encapsulation architecture of the inbound data of the BeiDou communication system 10 according to an embodiment of this application.

Figure 3A:
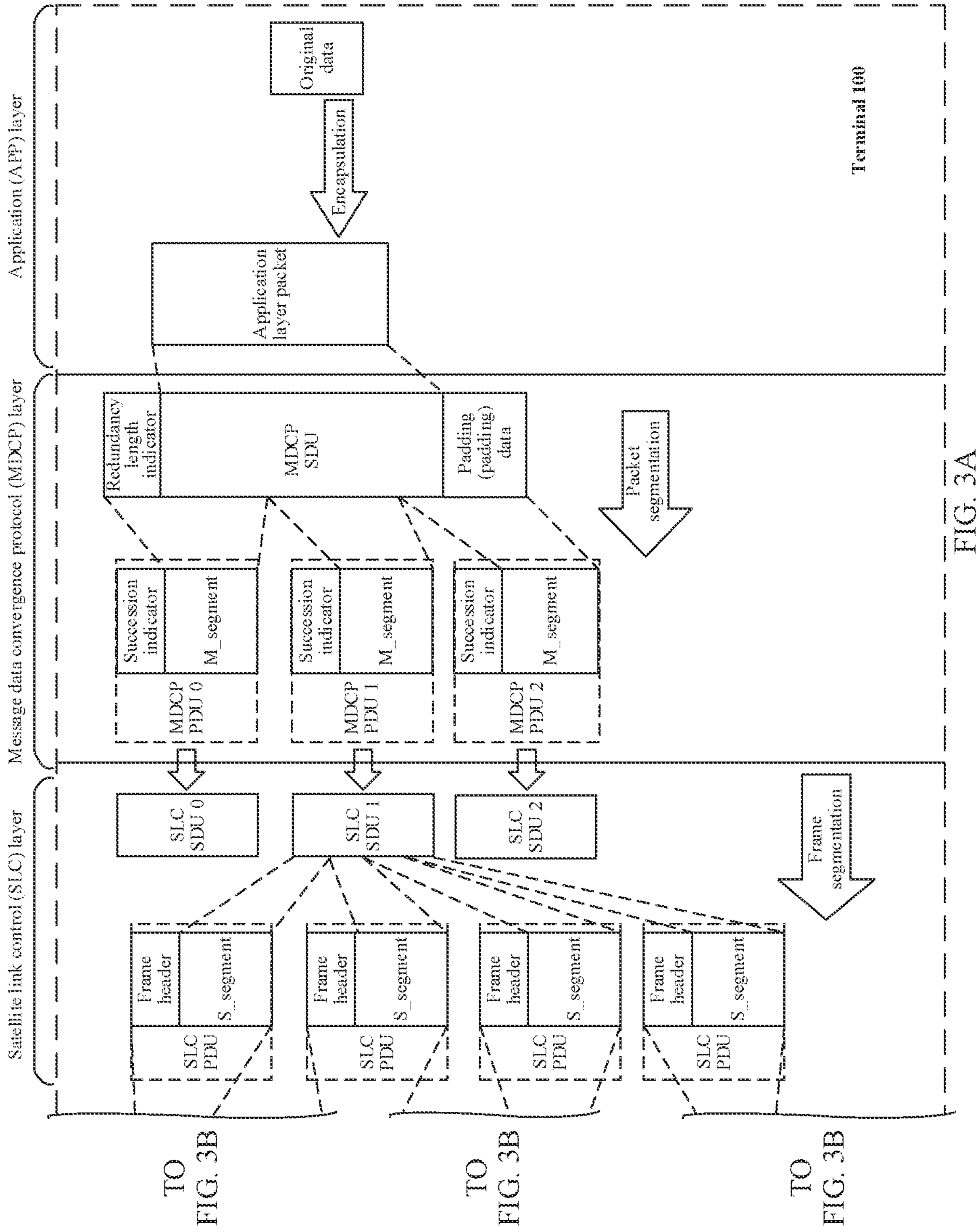
FIG. 3A and FIG. 3B are a schematic diagram of a protocol encapsulation architecture of inbound data of a BeiDou communication system 10 according to an embodiment of this application.
Figure 3B:
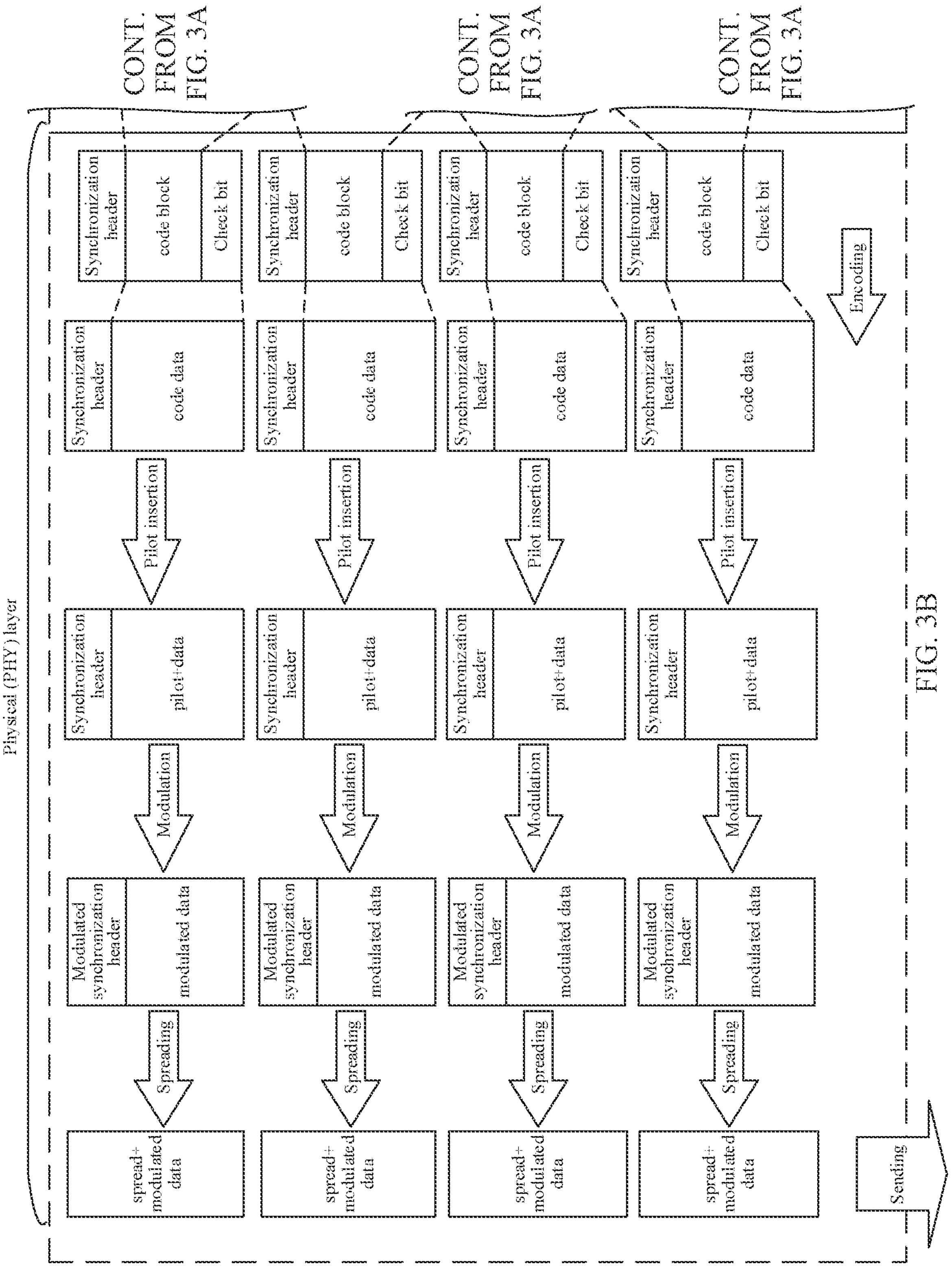

FIG. 3A and FIG. 3B are a schematic diagram of the protocol encapsulation architecture of the inbound data of the BeiDou communication system 10 according to an embodiment of this application.

As shown in FIG. 3A and FIG. 3B, a BeiDou packet transmission protocol layer of the terminal 100 may be divided into an application (application layer protocol, APP) layer, a message data convergence protocol (message data convergence protocol, MDCP) layer, a satellite link control (satellite link control protocol, SLC) layer, and a physical (physical layer protocol. PHY) laver.

When the terminal 100 sends data to the BeiDou network device 200, a working procedure of a BeiDou packet transmission protocol on the terminal 100 may be as follows:

At the APP layer, the terminal 100 may encapsulate the original data (for example, a letter download query request) into an application layer packet, and then the terminal 100 may send the application layer packet to the MDCP layer through an inter-layer interface. A format of the application layer packet is specifically described below, and details are not described herein again.

At the MDCP layer, the terminal 100 may obtain, through the inter-layer interface, the application layer packet delivered by the APP layer, and use the application layer packet as an MDCP service data unit (service data unit, SDU). At the MDCP layer, the terminal 100 may add padding (padding) data to a tail of the MDCP SDU, so that the MDCP SDU is of a specified length; and add a redundancy length indicator field to a header of the MDCP SDU. The redundancy length indicator field may indicate a length of the padding data. The terminal 100 may segment the MDCP SDU to which the padding data and the redundancy length indicator field are added into one or more pieces of MDCP segment data (M_segment) with a fixed length, and add a succession indicator field to a header of each piece of MDCP segment data, to obtain an MDCP protocol data unit (protocol data unit, PDU). In other words, the MDCP PDU includes the M_segment and the succession indicator field. The succession indicator field may indicate that the current MDCP PDU is a start MDCP PDU, an intermediate MDCP PDU, or a last MDCP PDU in a plurality of MDCP PDUs that are sent consecutively, or an MDCP PDU that is sent separately.

At the SLC layer, the terminal 100 may obtain, through an inter-layer interface, an MDCP PDU delivered by the MDCP layer, and use the MDCP PDU as an SLC SDU. At the SLC layer, the terminal 100 may segment the SLC SDU into one or more (a maximum of four) pieces of SLC segment data (S_segment) with a fixed length, and add frame header information to a header of each piece of S_segment, to obtain an SLC PDU. The frame header information includes a service data unit alternated indicator (service data unit alternated indicator, SAI) field, a total frame quantity field, and a frame sequence number field.

The SAI field may indicate whether the SLC PDU is an SLC SDU that has not been sent.

The total frame quantity field may indicate a total quantity of SLC PDUs included in the SLC SDU to which the SLC PDU belongs.

The frame sequence number field may indicate a sequence number of the SLC PDU in the SLC SDU to which the SLC PDU belongs.

At the PHY layer, the terminal 100 may obtain, through an inter-layer interface, an SLC PDU delivered by the SLC layer, use the SLC PDU as a code block (code block) of the PHY layer, add a synchronization header to a header of the code block, and add a check bit field to a tail of the code block. In the BeiDou communication system 10, a cyclic redundancy check (cyclic redundancy check, CRC) may be used to check the code block. Therefore, the check bit field may include a CRC code. The terminal 100 may perform encoding (for example, polar encoding) on the code block and the check bit field, to obtain code data (code data), and then insert a pilot into the code data, to obtain pilot code data (pilot+data). Then, the terminal 100 sequentially modulates the synchronization header and the pilot code data by using bottom-layer hardware to obtain modulated data (modulated data) The terminal 100 may spread the modulated data, to obtain spread modulated data (spread+modulated data). The terminal 100 may send the spread modulated data to the BeiDou short packet satellite 21, and the BeiDou short packet satellite 21 relays and forwards the data to the BeiDou network device 200.

The following describes a protocol parsing architecture of the inbound data of the BeiDou communication system 10 according to an embodiment of this application.

Figure 4A:
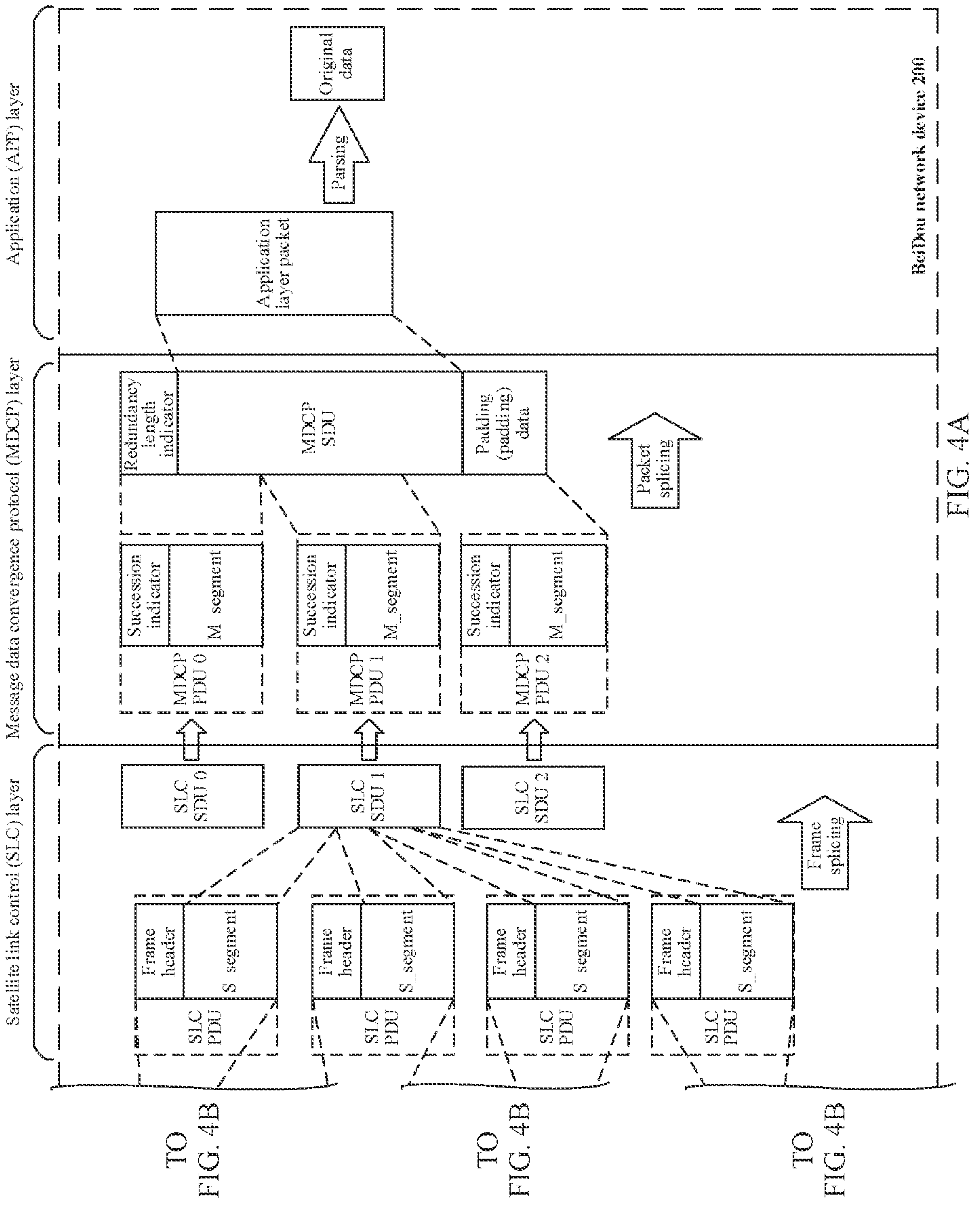
FIG. 4A and FIG. 4B are a schematic diagram of a protocol parsing architecture of inbound data of a BeiDou communication system 10 according to an embodiment of this application.
Figure 4B:
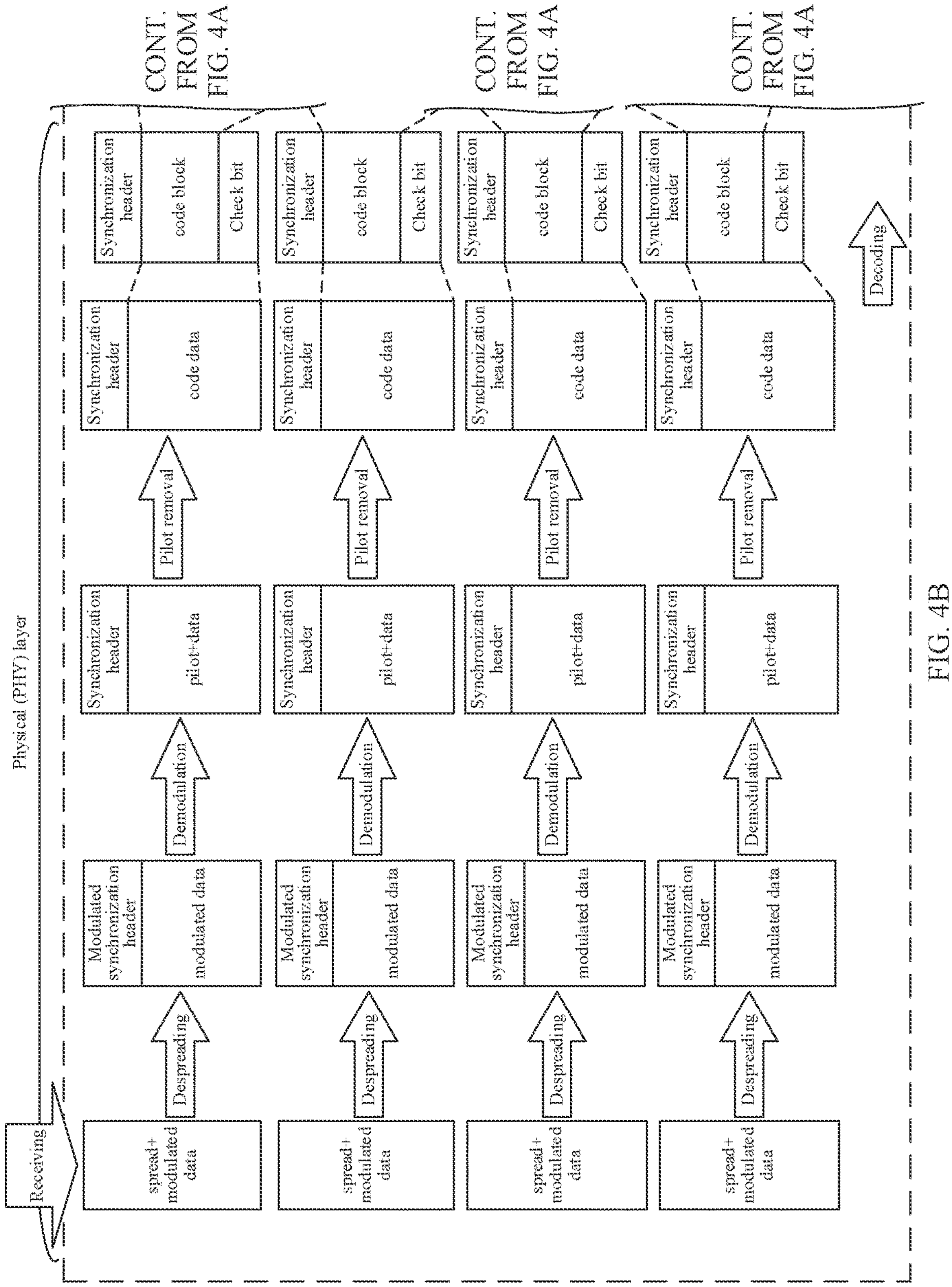

FIG. 4A and FIG. 4B are a schematic diagram of the protocol parsing architecture of the inbound data of the BeiDou communication system 10 according to an embodiment of this application.

As shown in FIG. 4A and FIG. 4B, a BeiDou short packet transmission protocol layer of the BeiDou network device 200 may be divided into an application (application layer protocol, APP) layer, a message data convergence protocol (message data convergence protocol. MDCP) layer, a satellite link control (satellite link control protocol. SLC) layer, and a physical (physical layer protocol. PHY) layer. The BeiDou network device 200 may include a BeiDou ground receiving station 31, a signal receiving and processing device 32, a signal processing center 33, a BeiDou ground transmitting station 35, a signal sending and processing device 36, an operation control center 37, and a BeiDou short packet integrated communication platform 34.

The BeiDou ground receiving station 31 and the BeiDou ground transmitting station 35 may be used for a data processing function of the BeiDou network device 200 at the PHY layer. The signal receiving and processing device 32, the signal sending and processing device 36, the signal processing center 33, and the operation control center 37 may be used for a data processing function of the BeiDou network device 200 at the SLC layer and the MDCP layer. The BeiDou short packet integrated communication platform 34 may be used for a data processing function at the APP layer.

When the BeiDou network device 200 receives data sent by the terminal 100, a working procedure of the BeiDou short packet transmission protocol layer of the BeiDou network device 200 may be as follows:

At the PHY layer, the BeiDou network device 200 may obtain modulated and spread pilot code data sent by the terminal 100. The BeiDou network device 200 may despread the received spread modulated data (spread+modulated data), to obtain modulated data (modulated data). Then, the BeiDou network device 200 may demodulate the modulated data to obtain pilot code data (pilot+data). Then, the BeiDou network device 200 removes pilot information from the pilot code data to obtain code data (code data). Then, the BeiDou network device 200 may decode the code data, and check integrity of a code block (code block) by using check data in a check bit field. If the code block is integrated, the BeiDou network device 200 may extract the code block (code block), deliver the code block to the SLC layer through an inter-layer interface, and use the code block as an SLC PDU of the SLC layer.

At the SLC layer, the BeiDou network device 200 may splice SLC PDUs belonging to a same SLC SDU into one SLC SDU based on frame header information of the SLC PDUs. The BeiDou network device 200 may deliver the SLC SDU to the MDCP layer through an inter-layer interface, and use the SLC SDU as an MDCP PDU of the MDCP layer.

At the MDCP layer, the BeiDou network device 200 may splice all MDCP PDUs belonging to a same MDCP SDU into one MDCP SDU. The BeiDou network device 200 may deliver the MDCP SDU to the APP layer through an inter-layer interface, and use the MDCP SDU as an application layer packet received by the APP layer.

At the APP layer, the BeiDou network device 200 may decrypt and decompress the application layer packet based on a packet header of the application layer packet, to obtain original data. The original data may be a letter download query request.

In this embodiment of this application, the foregoing protocol processing process is merely an example for description, and a specific protocol processing operation is not limited in this application.

After the BeiDou network device 200 receives the letter download query request sent by the terminal 100, the BeiDou network device 200 may return a letter download query result to the terminal 100. The following describes a process in which the BeiDou network device 200 encapsulates the letter download query result when the BeiDou network device 200 sends the letter download query result to the terminal 100, and a process in which the terminal 100 parses the letter download query result when the terminal 100 receives the letter download query result.

The following describes a protocol encapsulation architecture of the outbound data of the BeiDou communication system 10 according to an embodiment of this application.

Figure 5A:
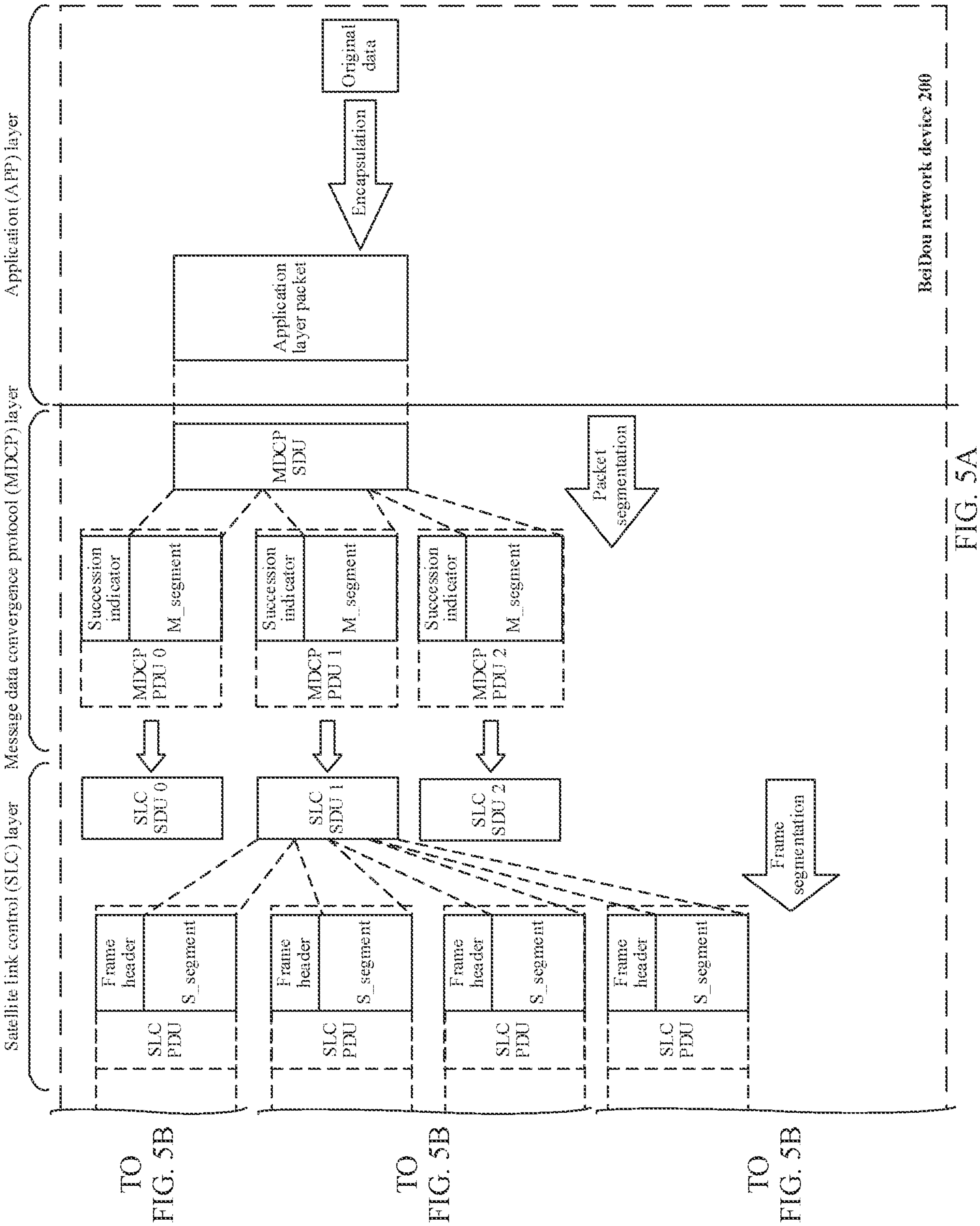
FIG. 5A and FIG. 5B are a schematic diagram of a protocol encapsulation architecture of outbound data of a BeiDou communication system 10 according to an embodiment of this application.
Figure 5B:
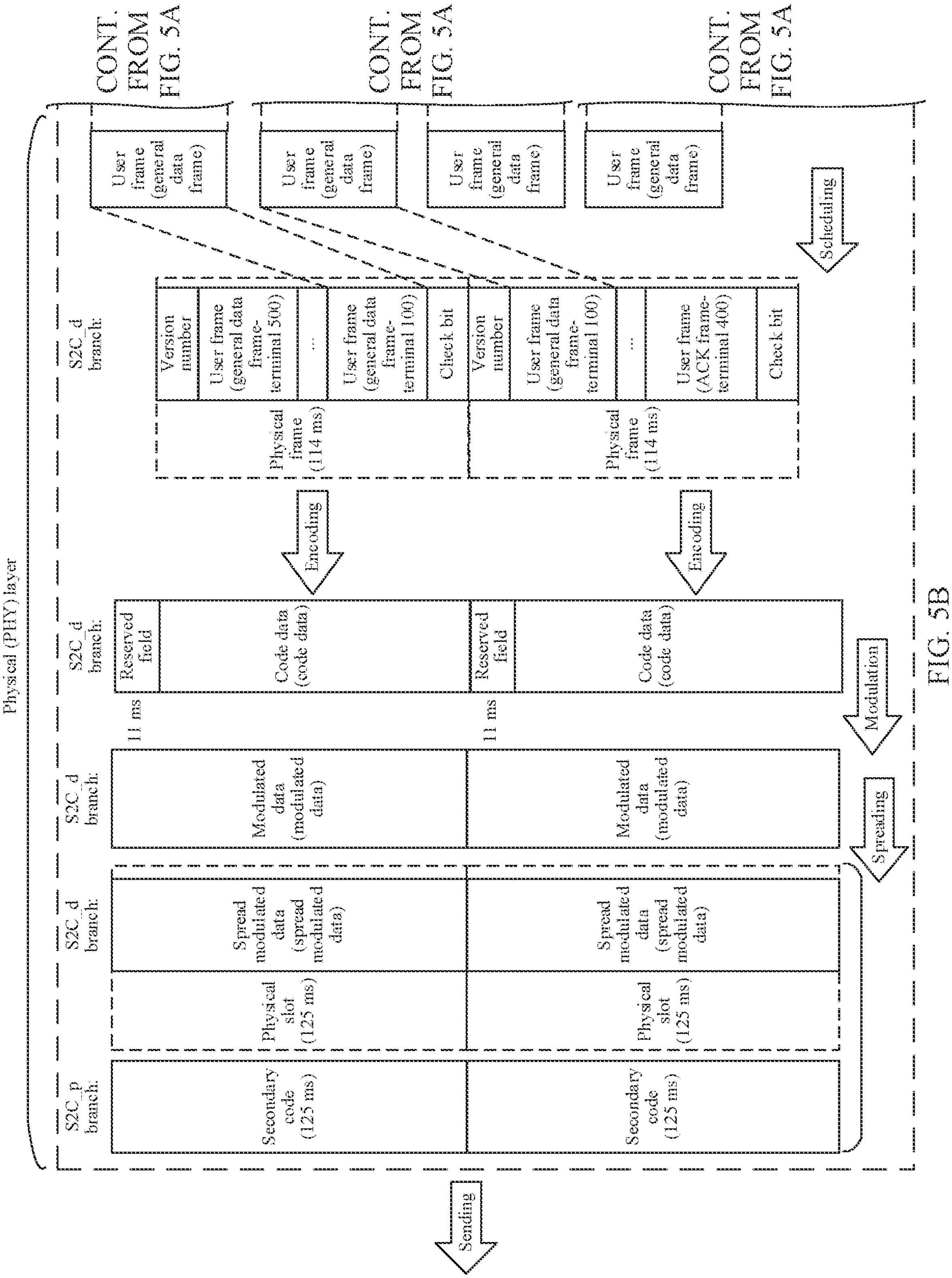

FIG. 5A and FIG. 5B are a schematic diagram of the protocol encapsulation architecture of the outbound data of the BeiDou communication system 10 according to an embodiment of this application.

As shown in FIG. 5A and FIG. 5B, a BeiDou short packet transmission protocol layer of the BeiDou network device 200 may be divided into an application (application layer protocol, APP) layer, a message data convergence protocol (message data convergence protocol, MDCP) layer, a satellite link control (satellite link control protocol, SLC) layer, and a physical (physical layer protocol, PHY) layer. The BeiDou network device 200 may include a BeiDou ground receiving station 31, a signal receiving and processing device 32, a signal processing center 33, a BeiDou ground transmitting station 35, a signal sending and processing device 36, an operation control center 37, and a BeiDou short packet integrated communication platform 34.

The BeiDou ground receiving station 31 and the BeiDou ground transmitting station 35 may be used for a data processing function of the BeiDou network device 200 at the PHY layer. The signal receiving and processing device 32, the signal sending and processing device 36, the signal processing center 33, and the operation control center 37 may be used for a data processing function of the BeiDou network device 200 at the SLC layer and the MDCP layer. The BeiDou short packet integrated communication platform 34 may be used for a data processing function at the APP layer.

When the BeiDou network device 200 sends data to the terminal 100, a working procedure of the BeiDou short packet transmission protocol in the BeiDou network device 200 may be as follows:

At the APP layer, the BeiDou network device 200 may encapsulate original data (for example, a letter download query result) into an application layer packet. Then, the BeiDou network device 200 may send the application layer packet to the MDCP layer through an inter-layer interface. A format of the application layer packet is specifically described below, and details are not described herein again.

Optionally, in a possible implementation, the BeiDou network device 200 segments the MDCP SDU into a plurality of MDCP PDUs at the MDCP layer, and the BeiDou network device 200 may transmit the plurality of MDCP PDUs to the SLC layer of the BeiDou network device 200.

At the MDCP layer, the BeiDou network device 200 may obtain, through the inter-layer interface, the application layer packet delivered by the APP layer, and use the application layer packet as an MDCP SDU. At the MDCP layer, the BeiDou network device 200 may segment the MDCP SDU into one or more pieces of MDCP segment data (M_segment) with a fixed length, and add a succession indicator field to a header of each piece of MDCP segment data, to obtain an MDCP PDU. In other words, the MDCP PDU includes the M_segment and the succession indicator field. The succession indicator field may indicate that the current MDCP PDU is a start MDCP PDU, an intermediate MDCP PDU, or a last MDCP PDU in a plurality of MDCP PDUs that are sent consecutively, or an MDCP PDU that is sent separately.

At the SLC layer, the BeiDou network device 200 may obtain, through an inter-layer interface, an MDCP PDU delivered by the MDCP layer, and use the MDCP PDU as an SLC SDU. At the SLC layer, the BeiDou network device 200 may segment the SLC SDU into one or more (a maximum of four) pieces of SLC segment data (S_segment) with a fixed length, and add frame header information to a header of each piece of S_segment, to obtain an SLC PDU.

At the PHY layer, the BeiDou network device 200 may obtain, through an inter-layer interface, the SLC PDU delivered by the SLC layer. The BeiDou network device 200 may obtain SLC PDUs of one or more users from the SLC layer. The BeiDou network device 200 may splice SLC PDUs of a plurality of users and add a frame header (for example, a version number) of a physical frame to form a code block (code block) of the PHY layer, add a check bit (for example, a cyclic redundancy check (cyclic redundancy check. CRC) code) to a tail of the code block, and perform encoding (for example, polar encoding) on the code block and the CRC code. A coded physical frame and a reserved segment may form code data of a data branch (S2C_d branch) of a fixed-length physical slot. The BeiDou network device 200 may separately place a plurality of SLC PDUs of one user into different physical frames. Then, the BeiDou network device 200 uses the code data of the S2C_d branch and pilot information of a pilot branch (S2C_p branch) to form pilot code data, namely, outbound data. The BeiDou network device 200 may send the outbound data to the BeiDou short packet satellite 21, and the BeiDou short packet satellite 21 relays and forwards the outbound data to the terminal 100.

It may be understood that the pilot information of the S2C_p branch is related to a satellite beam. When a satellite beam number is known information, the pilot information of the S2C_p branch is also known and does not need to be decoded. The code data of the S2C_d branch needs to be decoded.

The following describes a protocol parsing architecture of the outbound data of the BeiDou communication system 10 according to an embodiment of this application.

Figure 6A:
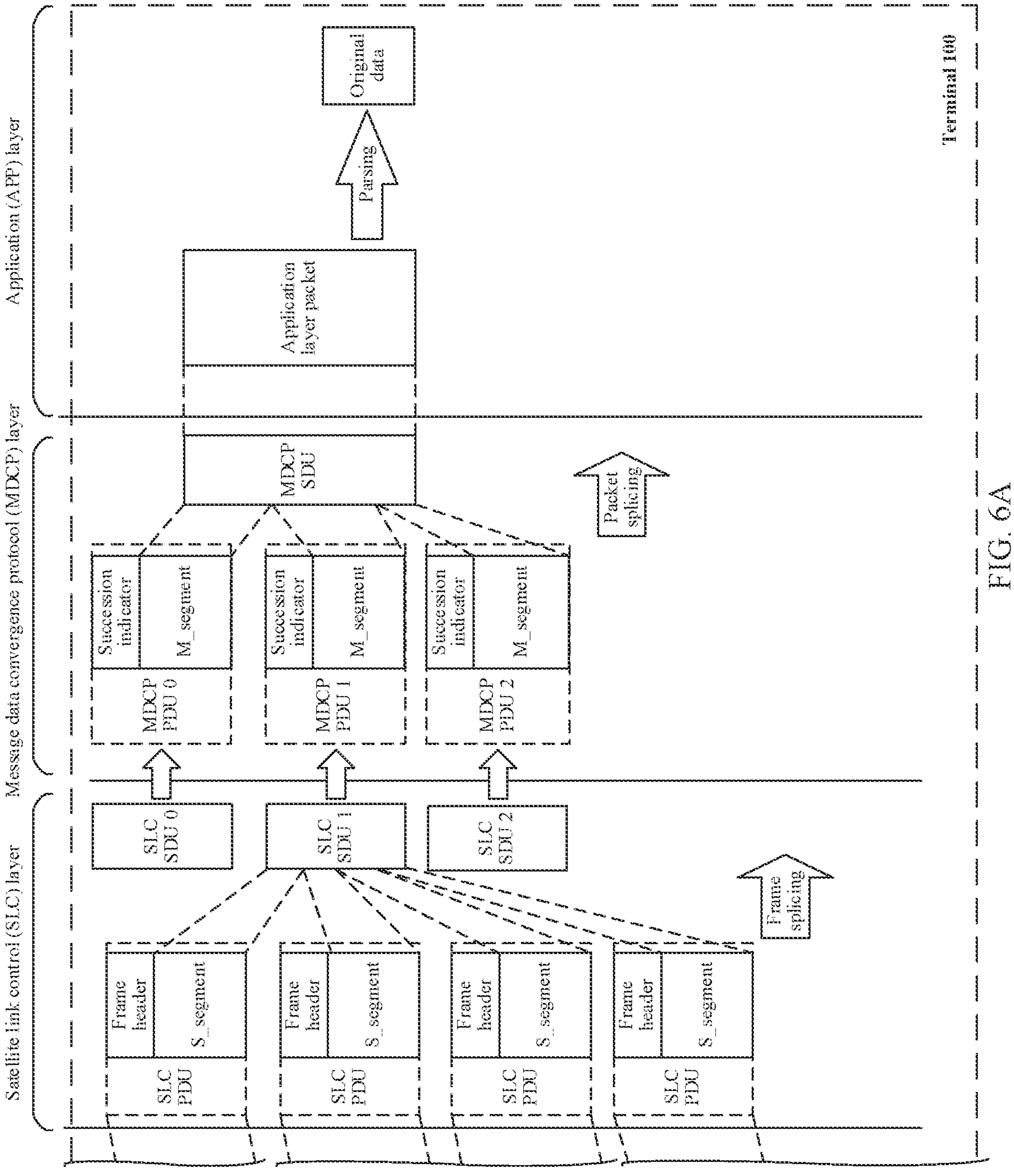
FIG. 6A and FIG. 6B are a schematic diagram of a protocol parsing architecture of outbound data of a BeiDou communication system 10 according to an embodiment of this application.
Figure 6B:
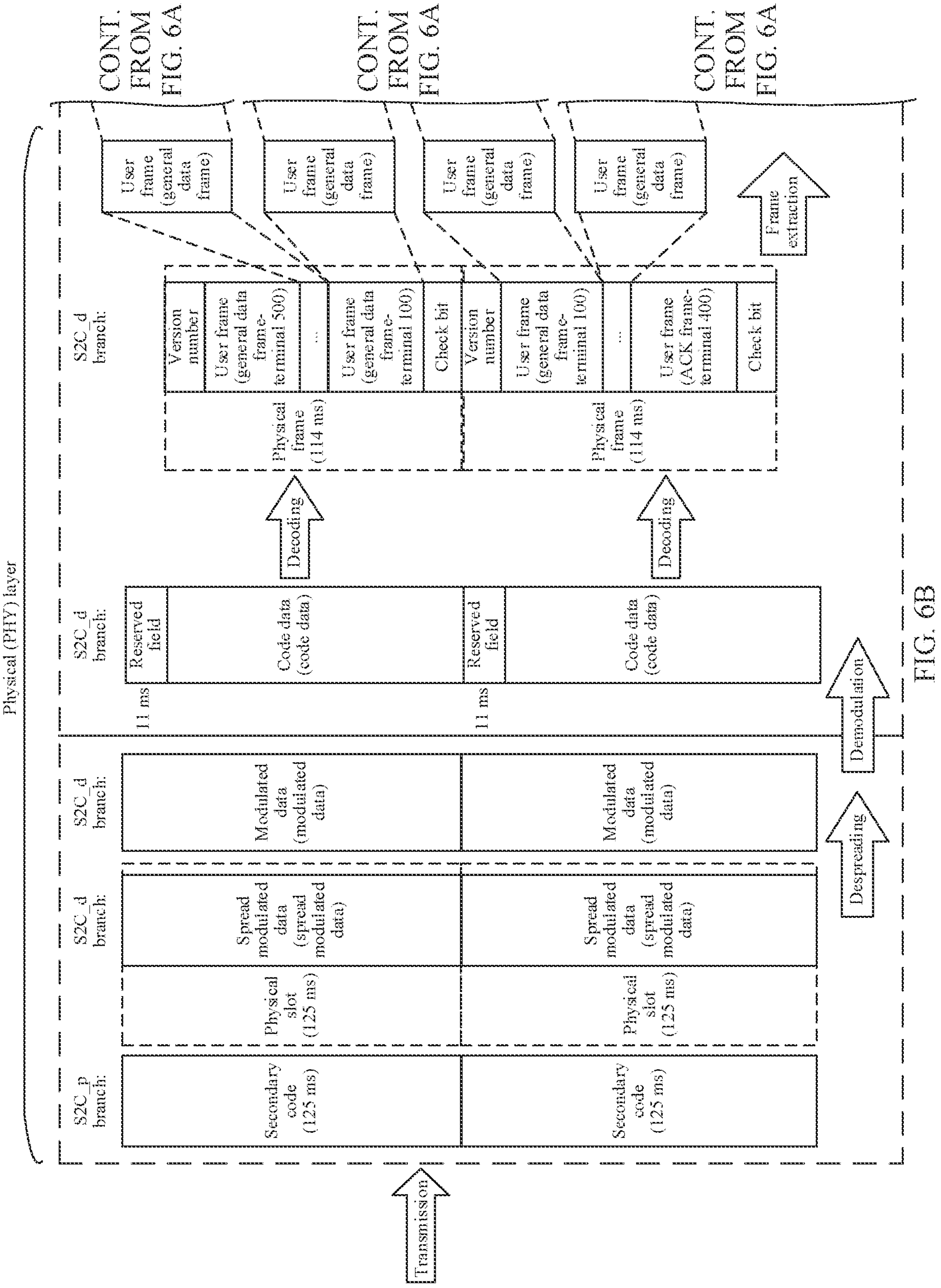

FIG. 6A and FIG. 6B are a schematic diagram of the protocol parsing architecture of the outbound data of the BeiDou communication system 10 according to an embodiment of this application.

As shown in FIG. 6A and FIG. 6B, a BeiDou short packet transmission protocol layer of the terminal 100 may be divided into an application (application layer protocol, APP) layer, a message data convergence protocol (message data convergence protocol, MDCP) layer, a satellite link control (satellite link control protocol, SLC) layer, and a physical (physical layer protocol, PHY) layer.

When the terminal 100 receives data sent by the BeiDou network device, a working procedure of the BeiDou short packet transmission protocol layer of the terminal 100 may be as follows:

At the PHY layer, the terminal 100 may obtain modulated and spread pilot code data sent by the BeiDou network device 200. The terminal 100 may despread the received spread modulated data (spread+modulated data), to obtain modulated data (modulated data). Then, the terminal 100 may demodulate the modulated data to obtain pilot code data (pilot+data). Then, the terminal 100 may remove pilot information from the pilot code data to obtain code data (code data). Then, the terminal 100 may decode the code data, and check integrity of a code block (code block) by using check data in a check bit field. If the code block is integrated, the terminal 100 may extract the code block (code block), deliver the code block to the SLC layer through an inter-layer interface, and use the code block as an SLC PDU of the SLC layer.

Herein, the pilot code data is the outbound data sent by the BeiDou network device 200, and the outbound data includes the code data of the S2C_d branch and the pilot information of the pilot branch (S2C_p branch).

At the SLC layer, the terminal 100 may splice SLC PDUs belonging to a same SLC SDU into one SLC SDU based on frame header information of the SLC PDUs. The terminal 100 may deliver the SLC SDU to the MDCP layer through an inter-layer interface, and use the SLC SDU as an MDCP PDU of the MDCP layer.

At the MDCP layer, the terminal 100 may splice all MDCP PDUs belonging to a same MDCP SDU into one MDCP SDU. The terminal 100 may deliver the MDCP SDU to the APP layer through an inter-layer interface, and use the MDCP SDU as an application layer packet received by the APP layer.

At the APP layer, the terminal 100 may decrypt and decompress the application layer packet based on a packet header of the application layer packet, to obtain original data.

In this embodiment of this application, the foregoing protocol processing process is merely an example for description, and a specific protocol processing operation is not limited in this application.

Embodiments of this application provide a letter download query method in a BeiDou communication system. The method may include. A terminal 100 may send a letter download query request packet to a BeiDou network device 200, where the letter download query request packet includes a service type field and a message ID field, the service type field indicates a service type of the letter download query request packet, and the message ID field indicates an ID of a letter successfully received by the terminal 100 last time. The terminal 100 receives a letter download query result packet sent by the BeiDou network device 200, where the letter download query result packet includes a data format indicator field and a letter file field, the data format indicator field is used by the terminal 100 to parse a letter text field, and the letter text field indicates content of a letter sent by one or more target terminals to the terminal 100. In this way, in a BeiDou network, a user may still obtain content of a letter sent by a terminal in a cellular network to the terminal 100.

In embodiments of this application, the terminal 100 may be referred to as a first terminal, and the target terminal may be referred to as a second terminal.

Figure 7:
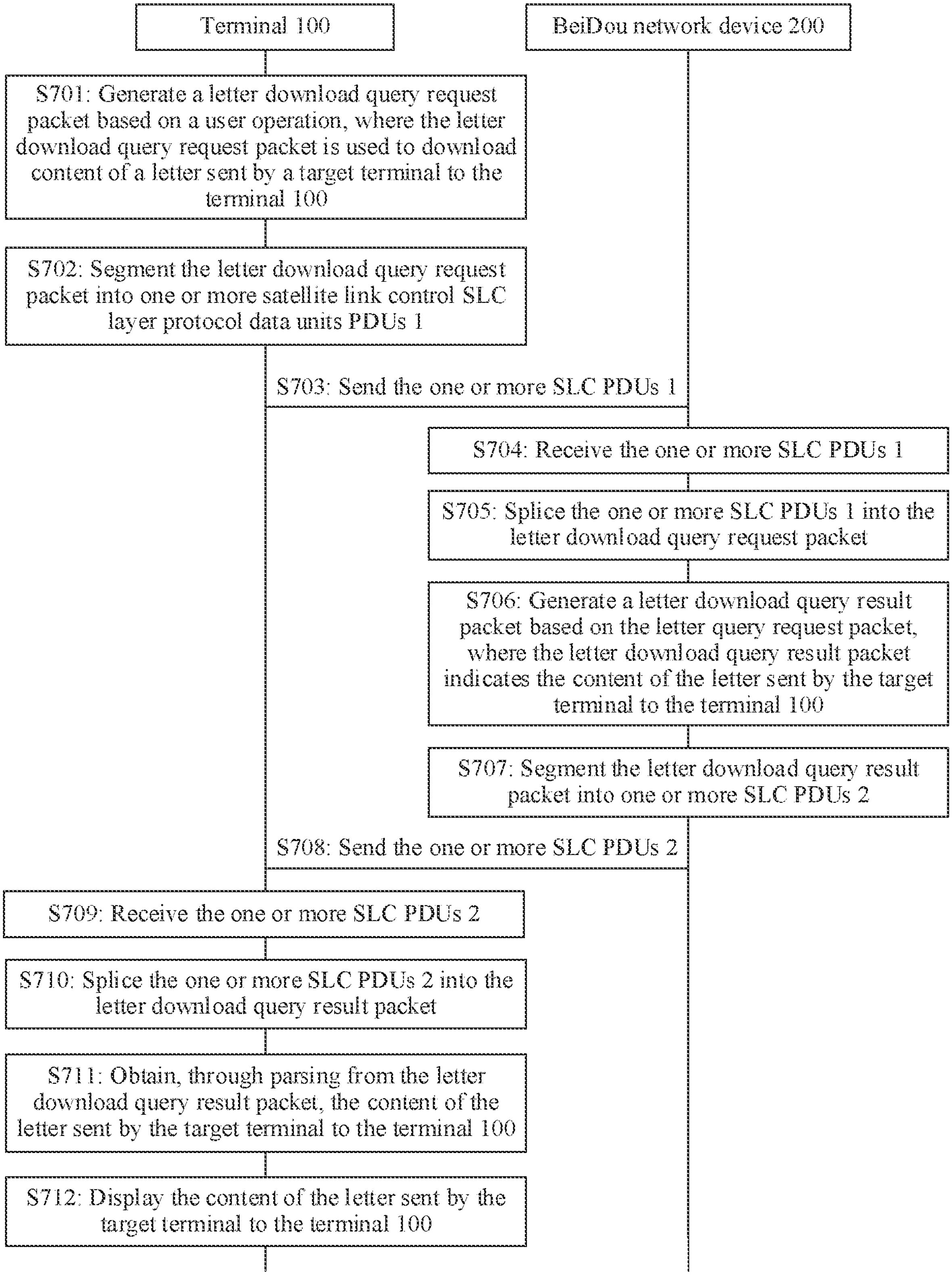
FIG. 7 is a schematic flowchart of a letter download query method in a BeiDou communication system according to an embodiment of this application.

FIG. 7 is an example of a schematic method flowchart of a letter download query method in a BeiDou communication system according to an embodiment of this application. As shown in FIG. 7, the letter download query method in the BeiDou communication system provided in this embodiment of this application may include the following steps.

S701: A terminal 100 generates a letter download query request packet based on a user operation, where the letter download query request packet is used to download content of a letter sent by one or more target terminals to the terminal 100.

The terminal 100 is in a BeiDou network. In other words, the terminal 100 is in a scenario in which there is no cellular network or wireless local area network, the terminal 100 does not camp on a cellular network, and a BeiDou communication module in the terminal 100 is enabled. The terminal 100 may communicate with a BeiDou network device 200 through the BeiDou communication module. The terminal 100 may obtain, through the BeiDou network, the content of the letter sent by the one or more target terminals to the terminal 100. An identifier of the one or more target terminals may exist in a trustlist configured for the terminal 100, or the identifier of the one or more target terminals may not exist in the trustlist configured for the terminal 100.

A trustlist may be configured for the terminal 100, and the trustlist includes identifiers of N terminals associated with the terminal 100 and sequence numbers of the identifiers in the trustlist. For example, the identifiers of the N terminals may be mobile phone numbers of the N terminals. Optionally, the trustlist configured for the terminal 100 may be stored in the terminal 100 and the BeiDou network device 200 (for example, a BeiDou short packet integrated communication platform 34). Optionally, the trustlist configured for the terminal 100 may be further stored in a server (for example, the short message service center 41 shown in FIG. 1) of an operator (for example. China Mobile. China Unicom, or China Telecom) corresponding to an identifier of the terminal 100. This is not limited in this embodiment of this application.

It may be understood that, in the trustlist, the sequence numbers of the identifiers of the N terminals may be adjusted.

In this embodiment of this application, the identifier of the terminal may be a mobile phone number, a login number, an international mobile equipment identity (international mobile equipment identity, IMEI), an international mobile subscriber identity (international mobile subscriber identity. IMSI), or a mobile subscriber international integrated services digital network number (mobile subscriber international integrated services digital network number, MSISDN) of the terminal. The following uses an example in which the identifier of the terminal is a mobile phone for description.

When a user of the terminal 100 wants to obtain content of a letter sent by a target terminal to the terminal 100, the user may tap a control used by the terminal 100 to obtain letter content (or download a letter). The terminal 100 may generate the letter download query request packet based on tapping, by the user, the control used by the terminal 100 to obtain letter content.

The terminal 100 may obtain content of a letter sent by one target terminal in the cellular network to the terminal 100, or may obtain content of letters sent by a plurality of target terminals in the cellular network to the terminal 100.

In a possible implementation, if an identifier (for example, a mobile phone number) of a target terminal A is in the trustlist, the user may select, on the terminal 100, content of a letter sent by the target terminal A to the terminal 100. For example, the user may enter, on the terminal 100, a sequence number of the target terminal A in the trustlist, or the user may enter, on the terminal 100, the mobile phone number of the target terminal A. Then, the user may tap, on the terminal 100, the control used to obtain letter content.

In this embodiment of this application, a target terminal whose identifier is in the trustlist may be referred to as a target terminal in the trustlist, and a target terminal whose identifier is not in the trustlist may be referred to as a target terminal that is not in the trustlist.

In a possible implementation, if an identifier (for example, a mobile phone number) of a target terminal B is not in the trustlist, the user may select, on the terminal 100, to query content of a letter sent by the target terminal B to the terminal 100. For example, the user may enter, on the terminal 100, the mobile phone number of the target terminal B. Then, the user may tap, on the terminal 100, the control used to obtain letter content.

Further, the terminal 100 may include a control 1, a control 2, and a control 3. The control 1 may be used to download content of a letter sent by the target terminal in the trustlist to the terminal 100. The control 2 is used to download content of a letter sent by a separate target terminal that is not in the trustlist to the terminal 100. The control 3 is used to download content of letters sent by all target terminals (including all target terminals that are not in the trustlist and all target terminals in the trustlist) to the terminal 100.

In a possible implementation, a format of the letter download query request packet may be shown in Table 1.

TABLE 1

| Letter download query request packet | | | | | | |
|---|---|---|---|---|---|---|
| Receipt indicator | Service type | Encryption indicator | Compression indicator | Application layer authentication code | Sender ID | Message ID |

As shown in Table 1, the letter download query request packet may include a receipt indicator field, a service type field, an encryption indicator field, a compression indicator field, an application layer authentication code field, a sender ID field, and a message ID field. It may be understood that, in this embodiment of this application, specific fields included in the letter download query request packet and a sorting sequence of the fields are not limited. For example, when the letter download query request packet does not require an application layer receipt by default, the letter download query request packet may not include the receipt indicator field.

Specific descriptions of each field in the letter download query request packet shown in Table 1 may be shown in the following Table 2. Table 2 shows an example of a length corresponding to each field in Table 1 and specific descriptions.

TABLE 2

| Field | | Length | Descriptions |
|---|---|---|---|
| Receipt indicator | | 1 bit | 0: indicating that the application layer receipt is not required<br>1: indicating that the application layer receipt is required |
| Service type | | 3 bits | 000: general packet service<br>001: letterbox service-letterbox overview query: querying a quantity of letters sent by the target terminal in the trustlist<br>010: letterbox service-letterbox overview query: querying a quantity of letters sent by all target terminals<br>011: letterbox service-letterbox overview query: querying a quantity of letters of a separate target terminal that is not in the trustlist<br>100: letterbox service-letter download: downloading only a letter sent by the target terminal in the trustlist<br>101: letterbox service-letter download: downloading letters sent by all target terminals<br>110: letterbox service-letter download: downloading a letter sent by the target terminal that is not in the trustlist<br>111: reserve (reserve, RSV) |
| Encryption indicator | | 2 bits | Indicating whether to encrypt |
| Compression indicator | | 2 bits | Indicating whether to compress |
| Application layer authentication code | | 16 bits | Used for application layer authentication |
| Sender ID | Trustlist bitmap (bitmap) | 10 bits | Each bit represents an identifier of a target terminal in the trustlist |
| | mobile phone number of the target terminal | 34 bits | Identifier of the target terminal that is not in the trustlist |
| Message ID | | 4 bits | ID of a letter that is successfully received last time |

As shown in Table 2, the receipt indicator field may indicate whether a receiving device (for example, the BeiDou network device 200) of the letter download query request packet needs to return an application layer receipt to the terminal 100. The application layer receipt indicates whether the receiving device successfully receives the letter download query request packet. A length of the receipt indicator field may be 1 bit. When the receipt indicator field is a value D1 (for example, 0), the receipt indicator field may indicate that the receiving device of the letter download query request packet does not need to return the application layer receipt to the terminal 100. When the receipt indicator field is a value D2 (for example, 1), the receipt indicator field may indicate that the receiving device of the letter download query request packet needs to return the application layer receipt to the terminal 100. It may be understood that the length of the receipt indicator field and a specific value of the receipt indicator field are not limited in this embodiment of this application.

As shown in Table 2, the service type field may indicate a service type of the letter download query request packet. In the BeiDou communication system, a service type of a packet may include a general packet, a letterbox service (including a letterbox overview query service and a letter download query service), and the like A length of the service type field may be 3 bits. It may be understood that a length of the service type field is not limited in this embodiment of this application. When there are more service types, a length of the service type field may be longer. In this embodiment of this application, an example in which the length of the service type field is 3 bits is used for description. When the service type field in the packet is 000, the service type field may indicate that the service type of the packet is the general packet. When the service type field in the packet is 001, the service type field may indicate that the service type of the packet may be the letterbox overview query service in the letterbox service, and the letterbox overview query request packet is used to query only the quantity of letters sent by the target terminal in the trustlist to the terminal 100. When the service type field is 010, the service type field may indicate that the service type of the packet is the letterbox overview query service in the letterbox service, and is specifically used to query the quantity of letters sent by all the target terminals (including all the target terminals that are not in the trustlist and all the target terminals in the trustlist) to the terminal 100. When the service type field in the packet is 011, the service type field may indicate that the service type of the packet is the letterbox overview query service in the letterbox service, and may be specifically used to query the quantity of letters sent by the separate target terminal that is not in the trustlist to the terminal 100. When the service type field in the packet is 100, the service type field may indicate that the service type of the packet is the letter download service in the letterbox service, and may be specifically used to obtain the content of the letter sent by the target terminal in the trustlist to the terminal 100. When the service type field in the packet is 101, the service type field may indicate that the service type of the packet is the letter download service in the letterbox service, and may be specifically used to obtain the letters sent by all the target terminals (including all the target terminals that are not in the trustlist and all the target terminals in the trustlist) to the terminal user. When the service type field in the packet is 110, the service type field may indicate that the service type of the packet is the letter download service in the letterbox service, and may be specifically used to obtain the letter sent by the separate target terminal that is not in the trustlist to the terminal 100. "111" is a reserved field.

In this embodiment of this application, specific definitions of the service type shown in Table 2 are used as an example. When the letter download query request packet is used to obtain the content of the letter sent by the target terminal in the trustlist to the terminal, the service type field in the letter download query request packet may be 100. When the letter download query request packet is used to download the content of the letters sent by all the target terminals to the terminal 100, the service type field in the letter download query request packet may be 101. When the letter download query request packet is used to download the content of the letter sent by the separate target terminal that is not in the trustlist to the terminal 100, the service type field in the letter download query request packet may be 110.

In a possible implementation, when the service type of the letter download query request packet is downloading the content of the letters sent by all the target terminals to the terminal 100, the letter download query request packet may not include the sender ID field.

As shown in Table 2, the encryption indicator field may indicate whether the letter download query request packet is encrypted. For example, a length of the encryption indicator field may be 2 bits. When the encryption indicator field is a value D3 (for example, 00), the encryption indicator field indicates that the letter download query request packet is not encrypted. It may be understood that the length of the encryption indicator field and a specific value of the encryption indicator field are not limited in this embodiment of this application.

As shown in Table 2, the compression indicator field may indicate whether the letter download query request packet is compressed. For example, a length of the compression indicator field may be 2 bits. When the encryption indicator field is a value D4 (for example, 00), the encryption indicator field indicates that the letter download query request packet is not compressed. It may be understood that the length of the compression indicator field and a specific value of the compression indicator field are not limited in this embodiment of this application.

As shown in Table 2, the application layer authentication code field may be used for application layer authentication. For example, a length of the application layer authentication code field may be 16 bits. It may be understood that a length of the application layer authentication code field is not limited in this embodiment of this application.

As shown in Table 2, the sender ID field may indicate an identifier that is to be obtained by the terminal 100 and that is of a target terminal of content of a letter sent to the terminal 100. If the target terminal is in the trustlist configured for the terminal 100, the sender ID field is a trustlist bitmap. If the target terminal is not in the trustlist configured for the terminal 100, the sender ID field is an identifier (for example, a mobile phone number) of the target terminal.

If the trustlist includes identifiers of N target terminals, a length of the trustlist bitmap may be N bits. For example, if the trustlist includes identifiers of 10 target terminals, a length of the trustlist bitmap may be 10 bits. In this embodiment of this application, N is an integer, and a specific value of N is not limited. The following uses an example in which N is equal to 10 for description.

For example, the trustlist configured for the terminal 100 may be shown in Table 3.

TABLE 3

| Trustlist | |
|---|---|
| Target terminal associated with the terminal 100 | Sequence number |
| Identifier of a target terminal 1 (dad, 13xxxxxxxx0) | 1 |
| Identifier of a target terminal 2 (mom, 13xxxxxxxx1) | 2 |
| Identifier of a target terminal 3 (grandpa, 13xxxxxxxx2) | 3 |
| Identifier of a target terminal 4 (grandma, 13xxxxxxxx3) | 4 |
| Identifier of a target terminal 5 (younger brother, 13xxxxxxxx4) | 5 |
| Identifier of a target terminal 6 (elder sister, 13xxxxxxxx5) | 6 |
| Identifier of a target terminal 7 (elder brother, 130xxxxxxx6) | 7 |
| Identifier of a target terminal 8 (Alice, 13xxxxxxxx7) | 8 |
| Identifier of a target terminal 9 (Jenny, 13xxxxxxxx8) | 9 |
| Identifier of a target terminal 10 (Flora, 13xxxxxxxx9) | 10 |

As shown in Table 3, the trustlist configured for the terminal 100 may include identifiers of 10 target terminals and sequence numbers respectively corresponding to the 10 target terminals. It may be understood that different users may set different trustlists. The trustlist shown in Table 3 is merely an example. An identifier and a sequence number of a specific terminal in the trustlist are not limited in this embodiment of this application.

The trustlist shown in Table 3 is used as an example, and the trustlist may be shown in Table 4 or Table 5.

trustlist may occupy the bit 6 in the 10 bits. The identifier of the target terminal whose sequence number is 5 in the trustlist may occupy the bit 5 in the 10 bits. The identifier of the target terminal whose sequence number is 6 in the trustlist may occupy the bit 4 in the 10 bits. The identifier of the target terminal whose sequence number is 7 in the trustlist may occupy the bit 3 in the 10 bits. The identifier of the target terminal whose sequence number is 8 in the trustlist may occupy the bit 2 in the 10 bits. The identifier of the target terminal whose sequence number is 9 in the trustlist may occupy the bit 1 in the 10 bits. For example, if the user wants to obtain content of a letter sent by the target terminal whose sequence number is 1 in the trustlist to the terminal 100, the trustlist bitmap filled by the terminal 100 in the sender ID field may be “1000000000”.

Optionally, in a possible implementation, as shown in Table 5, the identifier of the target terminal whose sequence number is 10 in the trustlist may occupy an MSB in the 10 bits, namely, the bit 9. Then, the identifier of the target terminal whose sequence number is 1 in the trustlist may occupy an LSB in the 10 bits, namely, the bit 0. The identifier of the target terminal whose sequence number is 9 in the trustlist may occupy the bit 8 in the 10 bits. The identifier of the target terminal whose sequence number is 8 in the trustlist may occupy the bit 7 in the 10 bits. The identifier of the target terminal whose sequence number is 7

TABLE 4

| Trustlist bitmap | | | | | | | | | |
|---|---|---|---|---|---|---|---|---|---|
| Bit 9 (MSB) | Bit 8 | Bit 7 | Bit 6 | Bit 5 | Bit 4 | Bit 3 | Bit 2 | Bit 1 | Bit 0 (LSB) |
| Identifier of the target terminal 1 in the trustlist | Identifier of the target terminal 2 in the trustlist | Identifier of the target terminal 3 in the trustlist | Identifier of the target terminal 4 in the trustlist | Identifier of the target terminal 5 in the trustlist | Identifier of the target terminal 6 in the trustlist | Identifier of the target terminal 7 in the trustlist | Identifier of the target terminal 8 in the trustlist | Identifier of the target terminal 9 in the trustlist | Identifier of the target terminal 10 in the trustlist |

TABLE 5

| Trustlist bitmap | | | | | | | | | |
|---|---|---|---|---|---|---|---|---|---|
| Bit 9 (MSB) | Bit 8 | Bit 7 | Bit 6 | Bit 5 | Bit 4 | Bit 3 | Bit 2 | Bit 1 | Bit 0 (LSB) |
| Target terminal 10 in the trustlist | Identifier of the target terminal 9 in the trustlist | Identifier of the target terminal 8 in the trustlist | Identifier of the target terminal 7 in the trustlist | Identifier of the target terminal 6 in the trustlist | Identifier of the target terminal 5 in the trustlist | Identifier of the target terminal 4 in the trustlist | Identifier of the target terminal 3 in the trustlist | Identifier of the target terminal 2 in the trustlist | Identifier of the target terminal 1 in the trustlist |

As shown in Table 4, the trustlist bitmap may occupy 10 bits, and an identifier of each target terminal in the trustlist occupies 1 bit. In a possible implementation, the identifier of the target terminal whose sequence number is 1 in the trustlist may occupy a most significant bit (most significant bit, MSB) in 10 bits, namely, the bit 9. Then, the identifier of the target terminal whose sequence number is 10 in the trustlist may occupy a least significant bit (least significant bit, LSB) in the 10 bits, namely, the bit 0. The identifier of the target terminal whose sequence number is 2 in the trustlist may occupy the bit 8 in the 10 bits. The identifier of the target terminal whose sequence number is 3 in the trustlist may occupy the bit 7 in the 10 bits. The identifier of the target terminal whose sequence number is 4 in the in the trustlist may occupy the bit 6 in the 10 bits. The identifier of the target terminal whose sequence number is 6 in the trustlist may occupy the bit 5 in the 10 bits. The identifier of the target terminal whose sequence number is 5 in the trustlist may occupy the bit 4 in the 10 bits. The identifier of the target terminal whose sequence number is 4 in the trustlist may occupy the bit 3 in the 10 bits. The identifier of the target terminal whose sequence number is 3 in the trustlist may occupy the bit 2 in the 10 bits. The identifier of the target terminal whose sequence number is 2 in the trustlist may occupy the bit 1 in the 10 bits. For example, if the user wants to obtain content of a letter sent by the target terminal whose sequence number is 1 in the trustlist to the terminal 100, the trustlist bitmap filled by the terminal 100 in the sender ID field may be “0000000001”.

If the user queries content of a letter sent by a target terminal that is not in the trustlist to the terminal 100, the sender ID field includes a mobile phone number of the target terminal. A length of the sender ID field may be 44 bits or 34 bits, which is not limited herein. For example, the user of the terminal 100 wants to query content of a letter sent by a target terminal whose mobile phone number is "158xxxxxxxx" to the terminal 100. If the target terminal is not in the trustlist of the terminal 100, the terminal 100 may encode the mobile phone number "158xXXXXXxx" of the target terminal into 44-bit binary data and fill the 44-bit binary data in the sender ID field. Alternatively, the terminal 100 may compress and encode the mobile phone number "158xxxxxxxx" of the target terminal into 34-bit binary data and fill the 34-bit binary data in the sender ID field.

As shown in Table 2, the message ID field may indicate an ID of a first letter that is successfully received by the terminal 100 last time. The first letter that is successfully received by the terminal 100 last time is a letter, in letters received by the terminal 100 before the user taps the control used to obtain letter content, that has a shortest interval between receiving time and time at which the control used to obtain letter content is tapped. The first letter is sent by the target terminal to the first terminal. Specifically, the target terminal first sends the first letter to the short message service center 41. Then, when the terminal 100 side initiates letter downloading, the BeiDou network device 200 may obtain the first letter from the short message service center 41 and send the first letter to the terminal 100.

Optionally, after the terminal 100 receives the first letter, the BeiDou network device 200 may receive a notification indicating that the terminal 100 successfully downloads the first letter. After receiving the notification indicating that the first letter is successfully downloaded, the BeiDou network device may notify the short message service center 41 to delete content of the first letter. The short message service center may reserve the ID and sending time of the first letter. The sending time of the first letter may refer to time at which the target terminal sends the first letter, namely, time at which the target terminal sends the first letter to the short message service center 41.

Optionally, if the terminal 100 sends the letter download query request packet to the BeiDou network device 200 for the first time, that is, the terminal 100 has not downloaded a letter before, the message ID field may be an initial value (for example, 0). When the message ID field is the initial value, it indicates that the letter download query request packet is used to download, starting from the first letter that is stored in the short message service center 41 and sent to the terminal 100, content of letters sent by one or more target terminals to the terminal 100.

It may be understood that the ID of the first letter is obtained by numbering the BeiDou network device 200 when the BeiDou network device 200 sends the first letter to the terminal 100.

S702: The terminal 100 segments the letter download query request packet into one or more satellite link control SLC layer protocol data units PDU 1.

Specifically, the terminal 100 may deliver the letter download query request packet to an MDCP layer through an inter-layer interface. The terminal 100 may segment the letter download query request packet into one or more MDCP PDUs at the MDCP layer. Then, the terminal 100 delivers the one or more MDCP PDUs to an SLC layer. The terminal 100 may segment each MDCP PDU into one or more SLC PDUs 1 at the SLC layer. At the SLC layer, the terminal 100 may fill the identifier (for example, a mobile phone number of the terminal 100) of the terminal 100 in a user ID field in a frame header of each SLC PDU 1. For details herein, refer to the descriptions of the inbound data encapsulation process in the BeiDou communication system 10 in FIG. 3A and FIG. 3B. Details are not described herein again.

It may be understood that a quantity of SLC PDUs 1 obtained by segmenting the letter download query request packet depends on a data length of the letter download query request packet and a maximum data bearing capacity of one SLC PDU 1. For example, when the data length of the letter download query request packet is a plurality of times the maximum data bearing capacity of one SLC PDU 1, the terminal 100 may segment the letter download query request packet into a plurality of SLC PDUs 1. When the data length of the letter download query request packet is equal to or less than the maximum data bearing capacity of one SLC PDU 1, the terminal 100 may segment the letter download query request packet into one SLC PDU 1. A specific quantity of SLC PDUs 1 obtained by the terminal 100 by segmenting the letter download query request packet is not limited in this embodiment of this application.

For example, in the letter download query request packet shown in Table 1, the receipt indicator field in the letter download query request packet may be 1 bit, the service type field may be 3 bits, the encryption indicator field may be 2 bits, the compression indicator field may be 2 bits, the application layer authentication code field may be 16 bits, the sender ID field may be 10 bits or 34 bits, and the message ID may be 4 bits. The data length of the letter download query request packet may be 38 bits or 62 bits. If the maximum data bearing capacity of one SLC PDU 1 in the terminal 100 is 128 bits, the letter download query request packet may be segmented into one SLC PDU 1.

S703: The terminal 100 sends the one or more SLC PDUs 1 to the BeiDou network device 200.

The terminal 100 may send the one or more SLC PDUs 1 to the BeiDou network device 200. Specifically, after sending one SLC PDU 1, the terminal 100 may send a second SLC PDU 1 to the BeiDou network device 200 after receiving, from the BeiDou network device 200, a response indicating that the SLC PDU 1 is successfully received. Optionally, the terminal 100 may alternatively sequentially send the one or more SLC PDUs 1 to the BeiDou network device 200, and after receiving all the SLC PDUs 1, the BeiDou network device 200 replies to the terminal 100 that the SLC PDUs 1 are successfully received.

S704: The BeiDou network device 200 receives the one or more SLC PDUs 1.

The BeiDou network device 200 may receive the one or more SLC PDUs 1.

In a possible implementation, after all the one or more SLC PDUs 1 are received, the BeiDou network device 200 replies to the terminal 100 that all the one or more SLC PDUs 1 are received. When the terminal 100 sends the one or more SLC PDUs 1, but the BeiDou network device 200 does not receive all the one or more SLC PDUs 1, the BeiDou network device 200 may send an acknowledgment information feedback (Acknowledgment. ACK) frame to the terminal 100. The ACK frame indicates that the BeiDou network device 200 does not receive all the SLC PDUs 1. The terminal 100 may send, to the BeiDou network device 200 again, an SLC PDU 1 that is not received by the BeiDou network device 200.

Further, the BeiDou network device 200 may obtain, through parsing at the SLC layer, the identifier (for example, the mobile phone number 138.xxxxxxxx) of the terminal 100 in the user ID field in the frame header of each SLC PDU 1.

S705: The BeiDou network device 200 splices the one or more SLC PDUs 1 into the letter download query request packet.

Specifically, the BeiDou network device 200 may splice the one or more SLC PDUs 1 into one or more SLC SDUs at an SLC layer. Then, the BeiDou network device 200 uploads the one or more SLC SDUs to an MDCP layer as one or more MDCP PDUs of the MDCP layer. Then, the BeiDou network device 200 may splice the one or more MDCP PDUs into an MDCP SDU at the MDCP layer. Then, the BeiDou network device 200 may upload the MDCP SDU to an APP layer as the letter download query request packet. For details herein, refer to the descriptions of the inbound data decapsulation process in the BeiDou communication system in FIG. 4A and FIG. 4B. Details are not described herein again.

S706: The BeiDou network device 200 generates a letter download query result packet based on the letter download query request packet, where the letter download query result packet indicates the content of the letter sent by the target terminal to the terminal 100.

The BeiDou network device 200 may query, based on the letter download query request packet, the short message service center 41 for the content of the letter sent to the terminal 100. The short message service center 41 may store the content of the letter sent by the target terminal to the terminal 100, or may not store the letter sent by the target terminal to the terminal 100 (in other words, the target terminal does not send a letter to the terminal 100). Then, the BeiDou network device 200 may generate the letter download query result packet based on a query result. The letter download query result packet indicates the content of the letter sent by the target terminal to the terminal 100 or indicate that the target terminal does not send a letter to the terminal 100.

Specifically, in a possible implementation, when the letter download query request packet indicates to query the content of the letters sent by all the target terminals to the terminal 100, the BeiDou network device 200 may obtain, through parsing based on the identifier (for example, the mobile phone number 138xxxxxxxx of the terminal 100) of the terminal 100 that is obtained through parsing from the SLC PDU 1 and the message ID field in the letter download query request packet, the ID (for example, "1") of the first letter received by the terminal 100 last time. The BeiDou network device 200 may obtain, based on the identifier of the terminal 100, the content of the letters sent by all the target terminals to the mobile phone number 138xxxxXXXX. When sending a letter to the terminal 100, the BeiDou network device 200 may number the letter (in this embodiment of this application, a number obtained by the BeiDou network device 200 by encoding the letter may be referred to as a letter ID). Specifically, the BeiDou network device 200 may sequentially number, starting from the ID of the first letter, letters sent to the terminal 100, to obtain an ID of each letter. For example, if the ID of the first letter is 1, an ID of a first letter sent by the BeiDou network device 200 to the terminal 100 this time is 2, and an ID of a second letter sent by the BeiDou network device 200 to the terminal 100 is 3.

Further, when the ID of the first letter indicated by the message ID field in the letter download query request packet sent by the terminal 100 and received by the BeiDou network device 200 is 1, the BeiDou network device 200 may learn, based on the ID of the first letter indicated by the message ID field, that the terminal 100 successfully receives the letter whose ID is 1. If the BeiDou network device 200 still stores the letter whose ID is 1, the BeiDou network device 200 may delete the letter whose ID is 1. In this way, the BeiDou network device 200 can be prevented from sending the letter whose ID is 1 to the terminal 100 again.

Optionally, in another possible implementation, when the letter download query request packet indicates to obtain the content of the letter sent by the target terminal in the trustlist to the terminal 100, the BeiDou network device 200 may obtain, through parsing, the identifier (for example, the mobile phone number 138xxxxxxxx of the terminal 100) of the terminal 100 from the SLC PDU 1. The BeiDou network device 200 may further obtain, through parsing from the trustlist bitmap in the sender ID field of the letter download query request packet, the identifier (for example, the mobile phone number "13xxxxxxxx0") of the target terminal in the trustlist, and obtain, through parsing from the message ID field, the ID (for example, "1") of the first letter received by the terminal 100 last time. The BeiDou network device 200 may obtain, based on the identifier of the terminal 100 and the identifier of the target terminal in the trustlist, content of a letter sent by the mobile phone number 13xxxxxxxx0 in the trustlist to the mobile phone number 138.xxxxxxxx. The BeiDou network device 200 numbers, based on the ID of the first letter, the letter sent by the mobile phone number 13xxxxxxxx0 in the trustlist to the mobile phone number 138xxxxxxxx, to obtain an ID of the letter. For example, if the ID of the first letter is 1, the ID of the letter sent by the mobile phone number 13xxxxxx0 to the mobile phone number 138xxxxxxxx may be 2.

Optionally, in another possible implementation, when the letter download query request packet indicates to obtain the content of the letter sent by the single target terminal that is not in the trustlist to the terminal 100, the BeiDou network device 200 may obtain, through parsing, the identifier (for example, the mobile phone number 138xxxxxxxx of the terminal 100) of the terminal 100 from the SLC PDU 1. The BeiDou network device 200 may further obtain, through parsing from the sender ID field of the letter download query request packet, the identifier (for example, the mobile phone number "158xxxxxxx0") of the target terminal that is not in the trustlist, and obtain, through parsing from the message ID field, the ID (for example, "1") of the letter received by the terminal 100 last time. The BeiDou network device 200 may obtain, from the short message service center 41 based on the identifier of the terminal 100 and the identifier of the target terminal in the trustlist, content of a letter sent by the mobile phone number 158xxxxxxx0 that is not in the trustlist to the mobile phone number 138xxxxxxxx after sending time of a letter whose ID is al. The BeiDou network device 200 numbers, based on the ID of the first letter, the letter sent by the mobile phone number 158xxxxxxx0) that is not in the trustlist to the mobile phone number 138xxxxxxxx, to obtain an ID of the letter. For example, if the ID of the first letter is 1, the ID of the letter sent by the mobile phone number 158xxxxxxx0 that is not in the trustlist to the mobile phone number 138xxxxxxxx may be 2.

It may be understood that the short message service center 41 may store content of letters sent by different terminals to the terminal 100. For example, formats of the content of the letters that are sent by different terminals to the terminal 100 and that are stored in the short message service center 41 may be shown in Table 6A.

TABLE 6A

| Receiver | | Sender | Letter sending time | Letter content |
|---|---|---|---|---|
| 138xxxxxxxx | Trustlist | 13xxxxxxxx0 | Sep. 1, 2021 08:00:00 | See you tomorrow |
| | | | Sep. 1, 2021 18:30:05 | Have dinner tomorrow |
| | | 13xxxxxxxx1 | Sep. 1, 2021 14:30:05 | Report a safe message when you get home |
| | | | Sep. 1, 2021 19:35:40 | Are you home? |
| | Non-trustlist | 158xxxxxxx0 | Sep. 2, 2021 19:00:00 | Where are you? |
| | | 158xxxxxxx1 | Sep. 2, 2021 19:05:10 | Call me when you see the SMS message |
| 136xxxxxxxx | Trustlist | 159xxxxxxx0 | Sep. 1, 2021 07:08:15 | I am going to have an art class tomorrow |
| | | 159xxxxxxx1 | Sep. 2, 2021 09:05:10 | Have you been in the classroom? |
| | Non-trustlist | 166xxxxxxx0 | Sep. 2, 2021 19:06:16 | Have you finished your homework? |
| | | 166xxxxxxx1 | Sep. 2, 2021 20:20:30 | Have lunch tomorrow |
| . . . | | . . . | . . . | . . . |

As shown in Table 6A, the short message service center 41 may store receivers of different mobile phone numbers and letter sending time, for example, a receiver being the mobile phone number 138xxxxxxxx (namely, the mobile phone number of the terminal 100 described above), a sender (for example, the mobile phone number 13xxxxxxxx0 or the mobile phone number 13xxxxxxxx1) in the trustlist corresponding to the mobile phone number 138xxxxxxxx, a sender (for example, the mobile phone number 158xxxxxxx0 or the mobile phone number 158xxxxxxx1) that is not in the trustlist, letter sending time, and letter content; or a receiver being the mobile phone number 136xxxxxxxx, a sender (for example, the mobile phone number 159xxxxxxx0 and the mobile phone number 159xxxxxxx1) in the trustlist corresponding to the mobile phone number 136xxxxxxxx, a sender (for example, the mobile phone number 166xxxxxxx0 and the mobile phone number 166xxxxxxx 1) that is not in the trustlist letter sending time, and letter content. The following uses an example in which the receiver is the mobile phone number "138xxxxxxxx" for specific description.

Specifically, as shown in Table 6A. 13xxxxxxxx0 is in the trustlist corresponding to the mobile phone number 138xxxxxxxx. The mobile phone number 13xxxxxxxx0 sends a letter to the mobile phone number 138xxxxxxxx at "Sep. 1, 2021 08:00:00", and content of the letter is "See you tomorrow". 13xxxxxxxx0 sends a letter to 138xxxxxxxx at "Sep. 1, 2021 18:30:05", and content of the letter is "Have a dinner tomorrow".

Specifically, as shown in Table 6A, 13xxxxxxxx1 is in the trustlist corresponding to the mobile phone number 138xxxxxxxx. The mobile phone number 13xxxxxxxx1 sends a letter to the mobile phone number 138xxxxxxxx at "Sep. 1, 2021 14:30:05", and content of the letter may be "Report a safe message when you get home". 13xxxxxxxx1 sends a letter to 138xxxxxxxx at "Sep. 1, 2021 19:35:40", and content of the letter may be "Are you home?".

Specifically, as shown in Table 6A, 158xxxxxxx0 is not in the trustlist corresponding to the mobile phone number 138xxxxxxxx. The mobile phone number 158xxxxxxx0 sends a letter to the mobile phone number 138xxxxxxxx at "Sep. 2, 2021 19:00:00", and content of the letter may be "Where are you?" 158xxxxxxx1 is not in the trustlist corresponding to the mobile phone number 138xxxxxxxx. The mobile phone number 158xxxxxxx1 sends a letter to the mobile phone number 138xxxxxxxx at "Sep. 2, 2021 19:05:10", and content of the letter may be "Call me when you see the SMS message".

It may be understood that Table 6A is merely an example, and the formats of the letters that are sent by different target terminals to the terminal 100 and that are stored in the short message service center 41 and specific content of the letters are not limited in this embodiment of this application.

Optionally, the short message service center 41 may not need to know trustlist information of the terminal 100. In other words, the short message service center 41 does not store the trustlist corresponding to the terminal 100, but buffers short messages sent by different terminals to the terminal 100. The short message service center 41 sends, to the BeiDou network device 200, content of a letter sent by only one or more target terminals, and the BeiDou network device 200 determines, based on a stored trustlist, whether the one or more target terminals are target terminals in the trustlist.

In a possible implementation, after receiving a letter sent to the terminal 100 and determining that the terminal 100 is in the BeiDou network, the short message service center 41 sends the letter sent to the terminal 100 to the BeiDou network device 200.

Optionally, in another possible implementation, when the BeiDou network device 200 receives the letter download query request packet of the terminal 100, the BeiDou network device 200 obtains, from the short message service center 41 based on the letter download query request packet, the letter sent to the terminal 100.

Further, in a possible implementation, the BeiDou network device 200 may store the letter sent to the terminal 100. The BeiDou network device 200 may store, in a form of a queue based on original sending time of letters, the letters sent to the terminal 100. The queue for storing letters may follow a first in first out principle. To be specific, if a same target terminal sends a plurality of letters to the terminal 100, the BeiDou network device 200 may first send, to the terminal 100, a letter whose original sending time is earlier. Then, the BeiDou network device 200 sends, to the terminal 100, a letter whose original sending time is later.

For example, formats of the content of the letters that are sent by different terminals to the terminal 100 and that are stored in the BeiDou network device 200 may be shown in Table 6B.

TABLE 6B

| Receiver | | Sender | Letter sending time | Letter content |
|---|---|---|---|---|
| 138xxxxxxxx (terminal 100) | Trustlist | 13xxxxxxxx0 (dad) | Sep. 1, 2021 08:00:00 | See you tomorrow |
| | | 13xxxxxxxx1 (mom) | Sep. 1, 2021 14:30:05 | Report a safe message when you get home |
| | | 13xxxxxxxx0 (dad) | Sep. 1, 2021 18:30:05 | Have dinner tomorrow |
| | | 13xxxxxxxx1 (mom) | Sep. 1, 2021 19:35:40 | Are you home? |
| | Non-trustlist | 158xxxxxxx0 (Xiaoming) | Sep. 2, 2021 19:00:00 | Where are you? |
| | | 158xxxxxxx1 (Lily) | Sep. 2, 2021 19:05:10 | Call me when you see the SMS message |

As shown in Table 6B, the BeiDou network device 200 stores the letters sent by different terminals to the terminal 100. Specifically, the BeiDou network device 200 may store the letters of different terminals 100 in a form of a queue, and arrange the letters sent by different terminals to the terminal 100 in a sequence of letter sending time. The BeiDou network device 200 may further store an identifier (for example, a mobile phone number) of each sender that sends a letter to the terminal 100, whether the identifier of the sender is in the trustlist, letter sending time, letter content, and the like. The letters stored in the BeiDou network device 200 may comply with the first in first out principle. To be specific, when the terminal 100 downloads a letter sent by a single target terminal, the BeiDou network device 200 first sends a letter with earliest letter sending time in a plurality of letters sent by the single target terminal to the terminal 100. In addition, when the terminal downloads the letters sent by all the target terminals, the BeiDou network device 200 first sends, to the terminal 100, a letter with earliest letter sending time in the plurality of letters sent by all the target terminals.

In some scenarios, the user downloads, on the terminal 100, the letters sent by dad to the terminal 100. As shown in Table 6B, the two letters sent by dad to the terminal 100 are respectively a first letter and a third letter (namely, letters whose letter sending time is respectively Sep. 1, 2021 08:00:00 and Sep. 1, 2021 18:30:05) that are in the queue of letters that are stored in the BeiDou network device 200 and that are sent to the terminal 100. When the message ID field in the letter download query request packet sent by the terminal 100 to the BeiDou network device 200 indicates the letter whose ID is 1 and that is successfully received by the terminal 100 last time, the BeiDou network device 200 may set a letter ID of a letter whose letter sending time is Sep. 1, 2021 08:00:00 and that is sent by dad to 2, and set a letter ID of a letter whose letter sending time is Sep. 1, 2021 18:30:05 and that is sent by dad to 3. Then, the BeiDou network device 200 first sends the letter whose letter ID is 2 to the terminal 100. After the BeiDou network device 200 sends the letter whose letter ID is 2, if the BeiDou network device 200 receives a prompt message indicating that the terminal 100 successfully receives the letter whose letter ID is 2, the BeiDou network device 200 may delete the letter whose letter ID is 2, and then send the letter whose letter ID is 3 to the terminal 100. After the BeiDou network device 200 sends the letter whose letter ID is 3, if the BeiDou network device 200 receives a prompt message indicating that the terminal 100 successfully receives the letter whose letter ID is 3, the BeiDou network device 200 may delete the letter whose letter ID is 3. If the BeiDou network device 200 does not receive a prompt message indicating that the terminal 100 successfully receives the letter whose letter ID is 3, the BeiDou network device 200 may continue to store the letter whose letter ID is 3, and record the letter ID of the letter.

In a possible implementation, if the BeiDou network device 200 does not receive a prompt message indicating that the terminal 100 successfully receives the letter whose letter ID is 2, the BeiDou network device 200 may continue to store the letter whose letter ID is 2, and record the letter ID of the letter. In addition, the BeiDou network device 200 stops sending a letter to the terminal 100. In other words, the BeiDou network device 200 no longer sends the letter whose letter ID is 3 to the terminal 100.

In some scenarios, after the user downloads, on the terminal 100, the letters sent by dad to the terminal 100, the user downloads, on the terminal 100, the letters sent by mom to the terminal 100. In this case, the message ID field in the letter download query request packet sent by the terminal 100 to the BeiDou network device 200 indicates that the ID of the letter successfully received by the terminal 100 last time is 3. The BeiDou network device 200 may set a letter ID of a letter whose letter sending time is Sep. 1, 2021 08.00:00 and that is sent by mom to 4, and set a letter ID of a letter whose letter sending time is Sep. 1, 2021 19:35:40 and that is sent by mom to 5. Then, the BeiDou network device 200 first sends the letter whose letter ID is 4 to the terminal 100, and then sends the letter whose letter ID is 5 to the terminal 100.

In some scenarios, after the user downloads, on the terminal 100, the letters sent by dad to the terminal 100, the user downloads, on the terminal 100, letters sent by all the target terminals to the terminal 100. In this case, the message ID field in the letter download query request packet sent by the terminal 100 to the BeiDou network device 200 indicates that the ID of the letter successfully received by the terminal 100 last time is 3. If the BeiDou network device 200 determines that the BeiDou network device 200 stores the letter whose letter ID is 3, the BeiDou network device 200 may delete the letter whose letter ID is 3. Then, the BeiDou network device 200 sequentially sets IDs of other letters starting from an ID 4.

In this way, the BeiDou network device 200 can be prevented from repeatedly sending a same letter to the terminal 100.

In some scenarios, a quantity of letters that are stored in the BeiDou network device 200 and that are sent to the terminal 100 is M, and is greater than a first threshold. The first threshold is N. and M is greater than N. The BeiDou network device 200 may sequentially set letter IDs of a first letter to an $N^{th}$ letter starting from 1, where a letter ID of the first letter is 1, a letter ID of the second letter is 2 . . . and a letter of the $N^{th}$ letter is N. Then, the BeiDou network device 200 sequentially sets letter IDs of an $(N+1)^{th}$ letter to an $M^{th}$ letter starting from 1. When M is greater than N and less than or equal to 2N, a letter ID of the $(N+1)^{th}$ letter is 1, a letter ID of an $(N+2)^{th}$ letter is 2 . . . , a letter of an $N^{th}$ letter is M-N. For example, N is 16, and M is 17. In this case, the BeiDou network device 200 may sequentially set letter IDs of the first letter to a sixteenth letter starting from 1. In other words, the letter ID of the first letter is 1, and a letter ID of the sixteenth letter is 16. Then, the BeiDou network device 200 sequentially resets a letter ID of a seventeenth letter starting from 1. In other words, the letter ID of the seventeenth letter is 1. It may be understood that, when the BeiDou network device 200 sends the seventeenth letter, the BeiDou network device 200 has successfully sent the first 16 letters to the terminal 100, and the BeiDou network device 200 may delete the first 16 letters.

In a possible implementation, the short message service center 41 and/or the BeiDou network device 200 store only a letter within preset time. For example, if the BeiDou network device 200 stores only letters within three days, the BeiDou network device 200 deletes, after three days, letters sent three days ago. As shown in Table 6B, if the terminal 100 does not download, at "1)/4/2021 08:00:00", a letter whose letter sending time is "Sep. 1, 2021 08:00:00", the BeiDou network device 200 deletes, at "Sep. 4, 2021 08:00:00", the letter whose letter sending time is "Sep. 1, 2021 08:00:00". In this case, when the terminal 100 performs letter download query at "Sep. 4, 2021 08:00:00", the BeiDou network device does not send, to the terminal 100, letters sent by another terminal at "Sep. 1, 2021 08:00:00" and before "Sep. 1, 2021 08:00:00". In this way, a buffer size of the BeiDou network device can be reduced in time, and memory space of the BeiDou network device can be released in time.

After the BeiDou network device 200 finds, from the short message service center 41, the content of the letter that is sent by the target terminal to the terminal 100 and that is in the letter download query request packet, the BeiDou network device 200 may generate the letter download query result packet based on the content of the letter.

In a possible implementation, a format of the letter download query result packet may be shown in Table 7.

TABLE 7

| | |
|---|---|
| Letter download query result packet | Message type indicator<br>Letter download completion indicator<br>Encryption indicator<br>Compression indicator<br>Application layer authentication code<br>Trustlist indicator<br>Sender ID field<br>Original message sending time<br>Letter ID<br>Location information indicator<br>Location information<br>Data format field<br>Letter content |

As shown in Table 7, the letter download query result packet may include a message type indicator field, a letter download completion indicator field, an encryption indicator field, a compression indicator field, an application layer authentication code field, a trustlist indicator field, a sender ID field, an original message sending time field, a message ID field, a location information indicator field, a location information field, a data format field, and a letter content field. It may be understood that, in this embodiment of this application, specific fields included in the letter download query result packet and a sorting sequence of the fields are not limited. For example, if the BeiDou network device 200 does not encrypt the letter download query result packet, the letter download query result packet may not include the encryption indicator field.

Specific descriptions of each field in the letter download query result packet shown in Table 7 may be shown in the following Table 8. Table 8 shows an example of a length corresponding to each field in Table 7 and specific descriptions.

TABLE 8

| Field | | Length | Descriptions |
|---|---|---|---|
| Message type indicator | | 1 bit | 0: letterbox overview<br>1: letter |
| Letter download completion indicator | | 1 bit | 1: indicating that letter download is not completed and there is a subsequent letter<br>0: indicating that letter download is completed and there is no subsequent letter |
| Encryption indicator | | 2 bits | Indicating whether to encrypt |
| Compression indicator | | 2 bits | Indicating whether to compress |
| Application layer authentication code | | 16 bits | Used for application layer authentication |
| Trustlist indicator | | 1 bit | Indicating the terminal 100 to parse the sender ID field<br>0: indicating the terminal 100 to parse the sender ID field based on a 34-bit sender number<br>1: indicating the terminal 100 to parse the sender ID field based on the trustlist |
| Sender ID | Trustlist translation | 4 bits | When the trustlist information indicator is 1, the trustlist information indicator indicates an identifier of a terminal in the trustlist |
| | Sender number | 34 bits | When the trustlist information indicator is 0, the trustlist information indicator indicates an identifier of a single target terminal that is not in the trustlist |
| Original message sending time | | 7 bits | Original letter sending time |
| Letter ID | | 4 bits | Letter ID |
| Location information indicator | | 1 bit | 0: indicating the location information field is empty<br>1: indicating subsequent 47 bits are the location information field |

TABLE 8-continued

| Field | Length | Descriptions |
|---|---|---|
| Location information | 47 bits | Location information when the location information indicator is 1 |
| Data format indicator | 1 bit | Indicating a format of the letter content |
| Letter content | N bits | The letter content field indicates the content of the letter sent by the target terminal to the terminal 100<br>When the data format indicator field is 1, the message data field is a fixed text. and a length may be 5 bits<br>When the data format indicator field is 0. the letter content is text information, and a length may be N bits |

As shown in Table 8, the message type indicator field may indicate a specific type of the letter download query result packet in the letterbox service. A length of the message type indicator field may be 1 bit. For example, when the message type indicator field in the packet may be a value M1 (for example, 0), the message type indicator field may indicate that a specific service type of the packet is letterbox overview. When the message type indicator field in the packet may be a value M2 (for example, 1), the message type indicator field may indicate that a specific service type of the letter download query result packet is letter download. In this embodiment of this application, the message type indicator field in the letter download query result packet may be the value M2. It may be understood that a length and a specific value of the message type indicator field are not limited in this embodiment of this application.

As shown in Table 8, the letter download completion indicator field may indicate whether there is a letter to be sent to the terminal 100 subsequently. A length of the letter download completion indicator field may be 1 bit. When the letter download completion indicator field is a value M3 (for example, 1), the letter download completion indicator field may indicate that there is a letter to be sent to the terminal 100 subsequently. When the letter download completion indicator field is a value M4 (for example, 0), the letter download completion indicator field may indicate that there is no letter to be sent to the terminal 100 subsequently. It may be understood that a length and a specific value of the letter download completion indicator field are not limited in this embodiment of this application.

It may be understood that, when the terminal 100 queries the content of the letters sent by all the target terminals to the terminal 100, the BeiDou network device 200 may encapsulate content of each letter sent by each target terminal after the sending time of the first letter into a letter download query result packet. Then, the BeiDou network device 200 sequentially sends each letter download query result packet to the terminal 100. For example, a letter download completion indicator field in a first letter download query result packet sent by the BeiDou network device 200 is the value M3, a letter download completion indicator field in a second letter download query result packet is the value M3, a letter download completion indicator field in an $(N-1)^{th}$ letter download query result packet is the value M3, and a letter download completion indicator field in a last (namely, an $N^{th}$) letter download query result packet is the value M4.

As shown in Table 8, the encryption indicator field may indicate whether the letter download query request packet is encrypted. For example, a length of the encryption indicator field may be 2 bits. When the encryption indicator field is a value D3 (for example, 00), the encryption indicator field indicates that the letter download query request packet is not encrypted. It may be understood that the length of the encryption indicator field and a specific value of the encryption indicator field are not limited in this embodiment of this application.

As shown in Table 8, the compression indicator field may indicate whether the letter download query request packet is compressed. For example, a length of the compression indicator field may be 2 bits. When the encryption indicator field is a value D4 (for example, 00), the encryption indicator field indicates that the letter download query request packet is not compressed. It may be understood that the length of the compression indicator field and a specific value of the compression indicator field are not limited in this embodiment of this application.

As shown in Table 8, the application layer authentication code field may be used for application layer authentication. For example, a length of the application layer authentication code field may be 16 bits. It may be understood that a length of the application layer authentication code field is not limited in this embodiment of this application.

As shown in Table 8, the trustlist indicator field may indicate the terminal 100 to parse the sender ID field. A length of the trustlist indicator field may be 1 bit. When the trustlist indicator field is a value D5 (for example, 0), the trustlist indicator field indicates the terminal 100 to parse the sender ID field based on 34 bits. When the trustlist indicator field is a value D6 (for example, 1), the trustlist indicator field indicates the terminal 100 to parse the sender ID field based on the trustlist translation. It may be understood that a length of the trustlist indicator field and a specific value of the trustlist indicator field are not limited in this embodiment of this application.

As shown in Table 8, the sender ID field may indicate an identifier of a target terminal that sends a letter to the terminal 100. When the trustlist indicator field is the value D5 (for example, 0), the sender ID field may be a 34-bit identifier (for example, a mobile phone number) of the target terminal. When the trustlist indicator field is the value D6 (for example, 1), the sender ID field is a 4-bit trustlist translation field, and the trustlist translation field may be a sequence number of the target terminal in the trustlist. The terminal 100 may translate the sequence number in the trustlist into the identifier of the target terminal. It may be understood that, a length of the sender ID field and a specific value of the sender ID field are not limited in this embodiment of this application.

A detailed definition of the trustlist translation field may be shown in the following Table 9. Table 9 shows specific trustlist numbers corresponding to different values of the trustlist translation field.

TABLE 9

| Trustlist translation field | Sequence number in the trustlist | Identifier of a corresponding target terminal |
|---|---|---|
| 0000 | 1 | 13xxxxxxxx0 |
| 0001 | 2 | 13xxxxxxxx1 |
| . . . | . . . | . . . |
| 1010 | 10 | 13xxxxxxxx9 |

As shown in Table 5, an example in which there are 10 identifiers, in the trustlist, of target terminals associated with the terminal 100 is used for description. When the trustlist translation field is 0000, the trustlist translation field may indicate an identifier of a target terminal whose sequence number is "I" in the trustlist, and the identifier of the target terminal is specifically "13xxxxxxxx0". When the trustlist translation field is 0001, the trustlist translation field may indicate an identifier of a target terminal whose sequence number is "2" in the trustlist, and the identifier of the trustlist may be specifically "13xxxxxxxx1". When the trustlist translation field is 1010, the trustlist translation field may indicate an identifier of a target terminal whose sequence number is "10" in the trustlist, and the identifier of the target terminal may be specifically "13xxxxXXXX9".

As shown in Table 8, the original message sending time field may indicate the original sending time of the letter, namely, time at which the target terminal sends the letter. A detailed definition of the original message sending time field may be shown in Table 10.

TABLE 10

| Sequence number | Field name | Quantity of bits | Effective range | Unit | Descriptions |
|---|---|---|---|---|---|
| 1 | Original message sending time | 7 | 0 to 72 | Hour | Buffer duration of a letter in the BeiDou network device (hours): stored only for 3 days |

As shown in Table 10, a length of the original message sending time field may be 7 bits. Because the operator (namely, the short message service center 41) buffers only letters of three days, which are 72 hours in total, 7 bits are used to indicate time at which the letters have been buffered on the operator server. The terminal side may calculate time at which the letters arrive at the operator server based on the value, and display the time. It may be understood that, if time for which the operator can buffer the letter is longer than 72 hours, the length of the original message sending time field may be greater than 7 bits. The length of the original message sending time field is not limited in this embodiment of this application.

As shown in Table 8, the letter ID field may indicate an ID of a letter. A length of the letter ID field may be 4 bits. It may be understood that the length of the letter ID field is not limited in this embodiment of this application.

As shown in Table 8, the location information indicator field may indicate whether a subsequent field is location information. A length of the location information indicator field may be 1 bit. For example, when the location information indicator field is 0, the location information indicator field may indicate that the location information field is empty. In other words, there is no location information field subsequently. When the location information indicator field is 1, the location information indicator field may indicate that subsequent 47 bits are location information. It may be understood that a length and a specific value of the location information indicator field are not limited in this embodiment of this application.

As shown in Table 8, the location information field may indicate location information of the target terminal. When the location information indicator field is 0, the letter download query result packet may not include the location information field. When the location information indicator field is 1, 47 bits after the location information indicator field are the location information of the target terminal. A length of the location information field may be 47 bits. Specifically, the location information field may be longitude and latitude information of the target terminal. It may be understood that the length and a specific value of the location information field are not limited in this embodiment of this application.

A detailed definition of the location information field may be shown in the following Table 11.

TABLE 11

| Location information field | | | | | |
|---|---|---|---|---|---|
| Longitude | | | Latitude | | |
| Sign bit (1 bit) | | Longitude value (23 bits) | Sign bit (1 bit) | | Latitude value (22 bits) |
| 0: east longitude | 1: west longitude | 0 to 648000 (Unit: an angle and a second) | 0: north latitude | 1: south latitude | 0 to 324000 (Unit: an angle and a second) |

As shown in Table 11, the location information field may include a longitude field and a latitude field. A length of the longitude field may be 24 bits. A length of the latitude field may be 23 bits.

The longitude field may include a sign bit field and a longitude value field. A length of the sign bit field may be 1 bit, and a length of the longitude value field may be 23 bits. When the sign bit field is a value S1, the sign bit field indicates the east longitude. When the sign bit field is a value S2, the sign bit field indicates the west longitude. The value S1 is different from the value S2. Specifically, the value S1 may be 0, and the value S2 may be 1. Optionally, the value S1 may be 1, and the value S2 may be 0. The longitude value field indicates a longitude value ranging from 0 to 648000, in the unit of an angle and a second.

The latitude field may include a sign bit field and a latitude value field. A length of the sign bit field may be 1 bit, and a length of the latitude value field may be 22 bits. When the sign bit field is a value T1, the sign bit field indicates the north latitude. When the sign bit field is a value T2, the sign bit field indicates the south latitude. The value T1 is different from the value T2. Specifically, the value T1 may be 0, and the value T2 may be 1. Optionally, the value T1 may be 1, and the value T2 may be 0. The latitude value field indicates a longitude value ranging from 0 to 324000, in the unit of an angle and a second.

In this way, the target terminal may report a location of the target terminal to the terminal 100.

In some scenarios, the target terminal may also be in the BeiDou network. In other words, the target terminal does not camp on the cellular network. The target terminal reports the location of the target terminal to the terminal 100 through the BeiDou network device 200. In this way, the terminal 100 may obtain the location information of the target terminal. When the user of the target terminal is in a dangerous zone or lost, the user of the terminal 100 may search for and rescue the user of the target terminal based on the location information of the target terminal.

In some other scenarios, the target terminal may alternatively be in the cellular network, and the target terminal may send the location information of the target terminal to the terminal 100. The user of the terminal 100 finds the user of the target terminal as soon as possible based on the location information sent by the target terminal. Alternatively, when the terminal 100 is not far away from the target terminal, but a location of the target terminal is covered by the cellular network, and a location of the terminal 100 is not covered by the cellular network, the target terminal may send the location information to the terminal 100, and the terminal 100 may find, as soon as possible based on the location information sent by the target terminal, an area covered by the cellular network. In this way, the terminal 100 may also contact the target terminal as soon as possible.

As shown in Table 8, the data format field may indicate the terminal 100 to parse the letter content field. A length of the data format field may be 1 bit. When the data format field is a value M5 (for example, 1), the data format field may indicate the terminal 100 to parse the letter content field based on a fixed text. When the data format field is a value M6 (for example, 0), the data format field may indicate the terminal 100 to parse the letter content field based on a variable-length text. The length of the data format field and a specific value of the data format field are not limited in this embodiment of this application.

As shown in Table 8, the letter content field may indicate the content of the letter sent by the target terminal to the terminal 100. When the data format indicator field is the value M5 (for example, 1), the letter content field is a text with a fixed length (for example, 5 bits). When the data format indicator field is a value M6 (for example, 0), the message data field is a text with a variable length (for example N bits). It may be understood that a length of the letter content field is not limited in this embodiment of this application.

It may be understood that the target terminal may send the location information of the target terminal to the terminal 100 when sending the letter to the terminal 100.

Optionally, when the letter only sent by the target terminal to the terminal 100 includes only the location information of the target terminal, the letter download query result may include the location information indicator field and the location information field, and may not include the data format indicator field and the letter content field.

S707: The BeiDou network device 200 segments the letter download query result packet into one or more SLC PDUs 2.

Specifically, the BeiDou network device 200 may deliver the letter download query result packet to the MDCP layer through an inter-layer interface. The BeiDou network device 200 may segment the letter download query result packet into one or more MDCP PDUs at the MDCP layer. Then, the BeiDou network device 200 further delivers the one or more MDCP PDUs to the SLC layer as SLC SDUs of the SLC layer. The BeiDou network device 200 may segment each SLC SDU into one or more SLC PDUs 2 at the SLC layer. At the SLC layer, the BeiDou network device 200 may fill the identifier (for example, the mobile phone number of the terminal 100) of the terminal 100 in a user ID field in a frame header of each SLC PDU 2. For details herein, refer to the descriptions of the outbound data encapsulation process in the BeiDou communication system 10 in FIG. SA and FIG. 5B. Details are not described herein again.

It may be understood that a quantity of SLC PDUs 2 obtained by segmenting the letter download query result packet depends on a data length of the letter download query result packet and a maximum data bearing capacity of one SLC PDU 2. For example, when the data length of the letter download query result packet is a plurality of times the maximum data bearing capacity of one SLC PDU 2, the BeiDou network device 200 may segment the letter download query result packet into a plurality of SLC PDUs 2. When the data length of the letter download query result packet is equal to or less than the maximum data bearing capacity of one SLC PDU 2, the BeiDou network device 200 may segment the letter download query result packet into one SLC PDU 2. A specific quantity of SLC PDUs 2 obtained by the BeiDou network device 200 by segmenting the letter download query result packet is not limited in this embodiment of this application.

S708: The BeiDou network device 200 sends one or more SLC PDUs 2 to the terminal 100.

The BeiDou network device 200 may send the one or more SLC PDUs 2 to the terminal 100. Specifically, after sending one SLC PDU 2, the BeiDou network device 200 may send a second SLC PDU 2 to the terminal 100 after receiving, from the terminal 100, a response indicating that the SLC PDU 2 is successfully received. Optionally, the BeiDou network device 200 may alternatively sequentially send the one or more SLC PDUs 2 to the terminal 100. After receiving all the SLC PDUs 2, the terminal 100 replies to the BeiDou network device 200 that the SLC PDUs 2 are successfully received. Alternatively, the terminal 100 may not reply. This is not limited in this embodiment of this application.

S709: The terminal 100 receives the one or more SLC PDUs 2.

The terminal 100 may receive the one or more SLC PDUs 2.

In a possible implementation, after all the one or more SLC PDUs 1 are received, the terminal 100 replies to the BeiDou network device 200 that all the one or more SLC PDUs 2 are received.

When the letter download completion indicator field in the letter download query result packet indicates that there is a subsequent letter, the terminal 100 may receive the one or more SLC PDUs 2 in the letter download query result packet, and after receiving one SLC SDU, the terminal 100 may return ACK acknowledgment information to the BeiDou network device 200. After receiving ACK information corresponding to all the SLC SDUs, the BeiDou network device 200 may send a letter sending indication message to the application layer. After receiving the letter sending indication message, the application layer of the BeiDou network device 200 continues to send content of the letter. The BeiDou network device 200 may encapsulate the content of the letter into another letter download query result packet.

Optionally, when the letter download completion indicator field in the letter download query result packet indicates that there is a subsequent letter, after receiving the letter, the terminal 100 may receive a download indicator of the user, and the terminal 100 downloads the subsequent letter based on the download indicator.

For example, a data format of the letter sending indication message may be shown in Table 12.

TABLE 12

| Data format of the letter sending indication message | |
|---|---|
| Receiver number | ACK indicator |

As shown in Table 12, the letter sending indication message may include a receiver number field and an ACK indicator field. The receiver number field indicates a mobile phone number of a receiving device of a letter. In this embodiment of this application, the receiver number field may be the mobile phone number of the terminal 100. The ACK indicator field indicates whether the BeiDou network device 200 successfully sends a previous letter download query result packet. A length of the ACK indicator field may be 1 bit. For example, when the ACK indicator field is 0, the ACK indicator field may indicate that the BeiDou network device 200 fails to send the previous letter download query result packet. When the ACK indicator field is 1, the ACK indicator field may indicate that the BeiDou network device 200 successfully sends the previous letter download query result packet.

Further, the terminal 100 may obtain, through parsing at the SLC layer, the user ID field in the frame header of each SLC PDU 2. If the terminal 100 obtains, through parsing from the user ID field, the same identifier (for example, the mobile phone number 138xxxxxxxx) of the terminal 100, the terminal 100 uploads the one or more SLC PDUs 2 to the MDCP layer for further parsing. If the terminal 100 does not obtain, through parsing, the identifier of the terminal 100 from the user ID field, the terminal 100 may determine that the SLC PDUs 2 are not sent to the terminal 100, and the terminal 100 may discard the SLC PDUs 2.

S710: The terminal 100 splices the one or more SLC PDUs 2 into the letter download query result packet.

Specifically, the terminal 100 may splice the one or more SLC PDUs 2 into one or more SLC SDUs at the SLC layer. Then, the terminal 100 uploads the one or more SLC SDUs to the MDCP layer as one or more MDCP PDUs of the MDCP layer. Then, the terminal 100 may splice the one or more MDCP PDUs into an MDCP SDU at the MDCP layer. Then, the terminal 100 may upload the MDCP SDU to the APP layer as the letter download query result packet. For details herein, refer to the descriptions of the outbound data decapsulation process in the BeiDou communication system in FIG. 6A and FIG. 6B. Details are not described herein again.

S711: The terminal 100 obtains, through parsing from the letter download query result packet, the content of the letter sent by the target terminal to the terminal 100.

The terminal 100 may obtain, through parsing at the APP layer, the letter content field in the letter download query result packet, and obtain, from the letter content field, the content of the letter sent by the target terminal to the terminal 100.

S712: The terminal 100 displays the content of the letter sent by the target terminal to the terminal 100.

The terminal 100 may display, on a display, the content of the letter sent by the target terminal to the terminal 100. Alternatively, the terminal 100 broadcasts, through a voice, the content of the letter sent by the target terminal to the terminal 100. This is not limited in this embodiment of this application. It may be understood that, after the BeiDou network device 200 sends the letter download query result packet, a letter is subsequently sent to the terminal 100, and letter content of the next letter may be sent to the terminal according to step S706 to step S712.

Optionally, before letter download, the user of the terminal 100 may first perform a letterbox overview query. In other words, a quantity of letters sent by other terminals to the terminal 100 is queried. After the BeiDou network device 200 sends, to the terminal 100, the quantity of letters sent by other terminals to the terminal 100, the terminal 100 may select a to-be-downloaded letter and download the letter.

In this way, according to the letter download query method in the BeiDou communication system provided in this embodiment of this application, the terminal 100 in the BeiDou network may still query content of a letter sent by another terminal to the terminal 100 when the terminal 100 does not camp on the cellular network.

In this embodiment of this application, the sender ID field in the letter download query request packet may be referred to as a first sender ID field. The sender ID field in the letter download query result packet may be referred to as a second sender ID field.

Figure 8A:
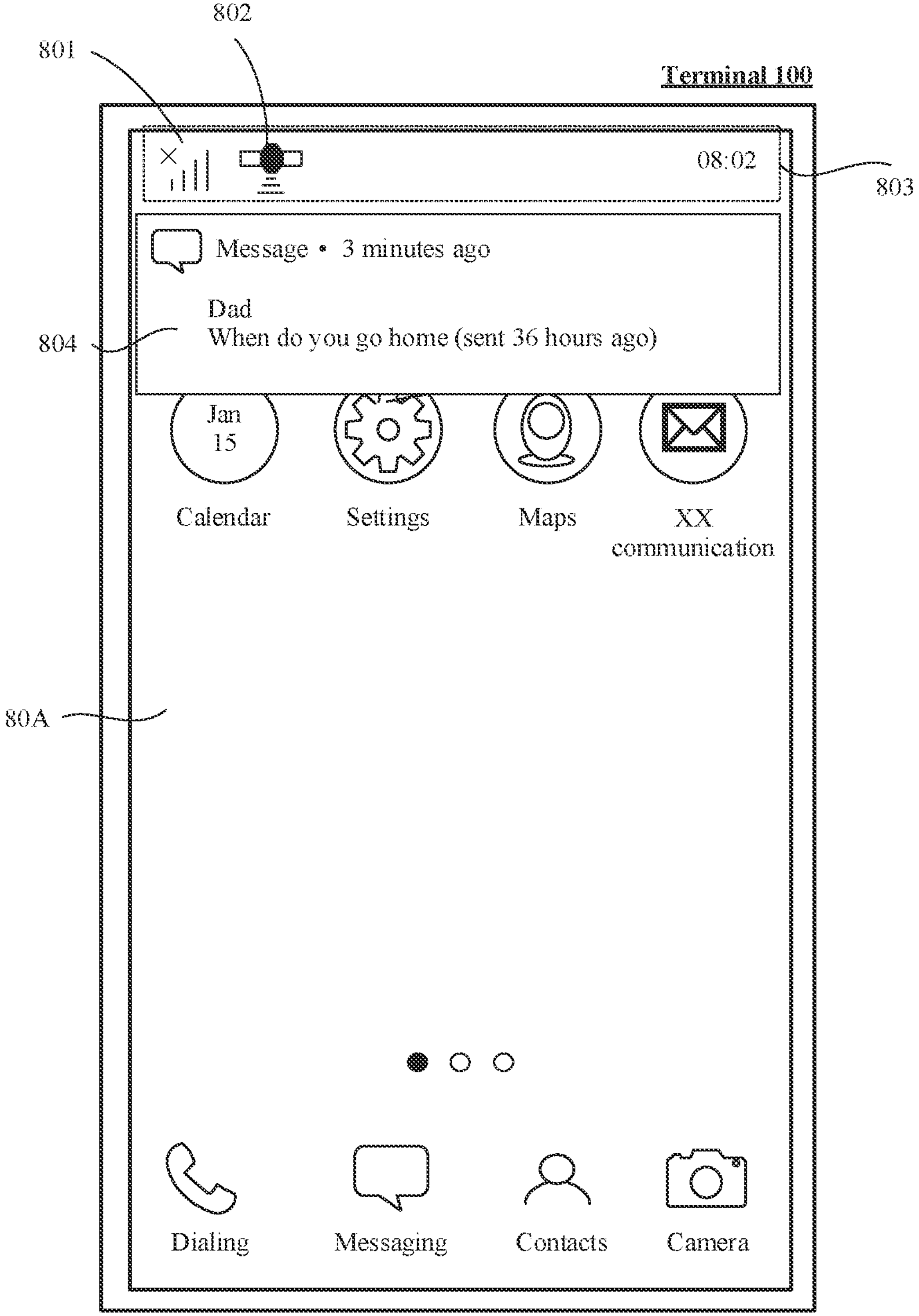
FIG. 8A is a schematic diagram of a user interface according to an embodiment of this application.
Figure 8B:
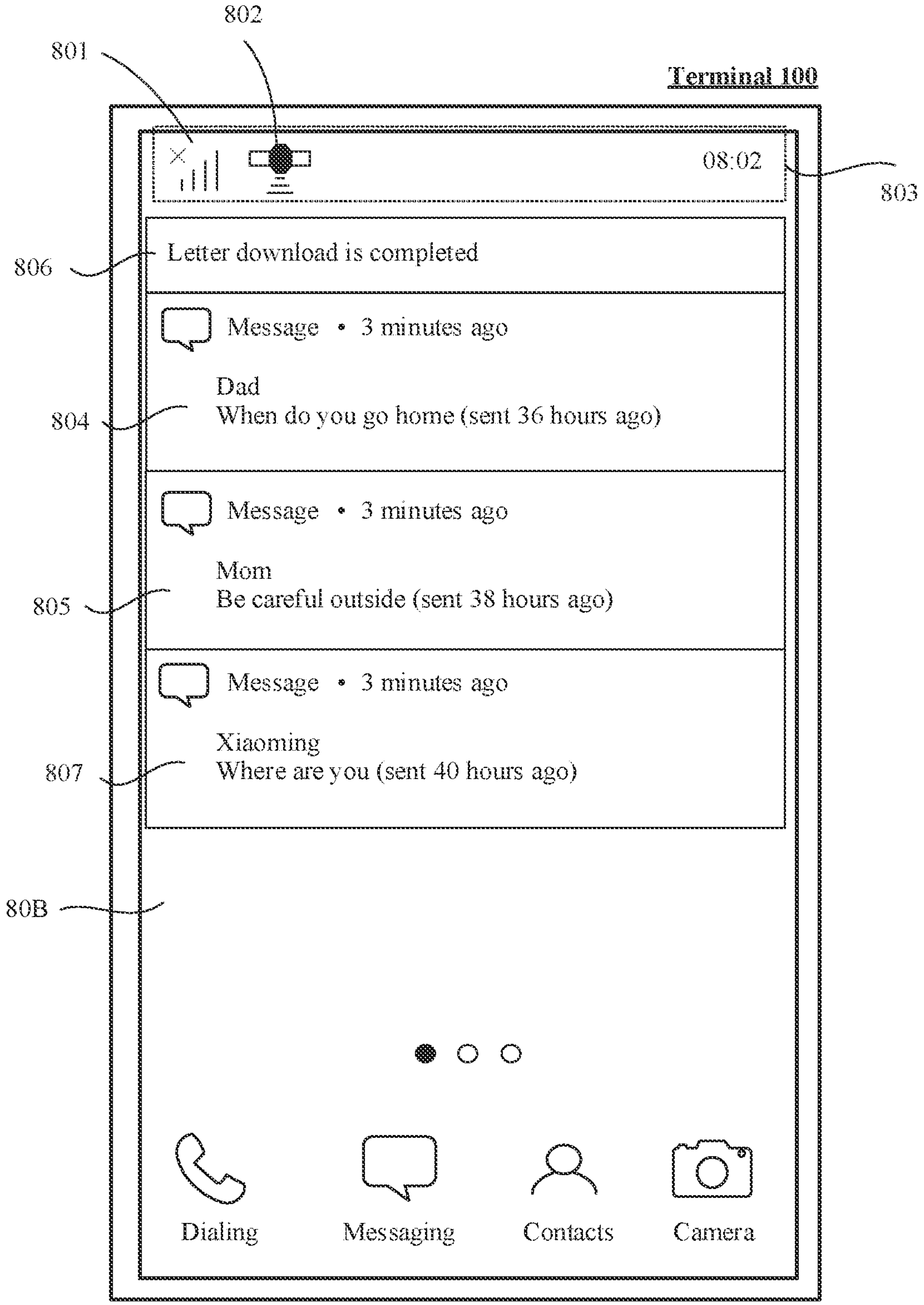
FIG. 8B is a schematic diagram of a user interface according to an embodiment of this application.
Figure 8C:
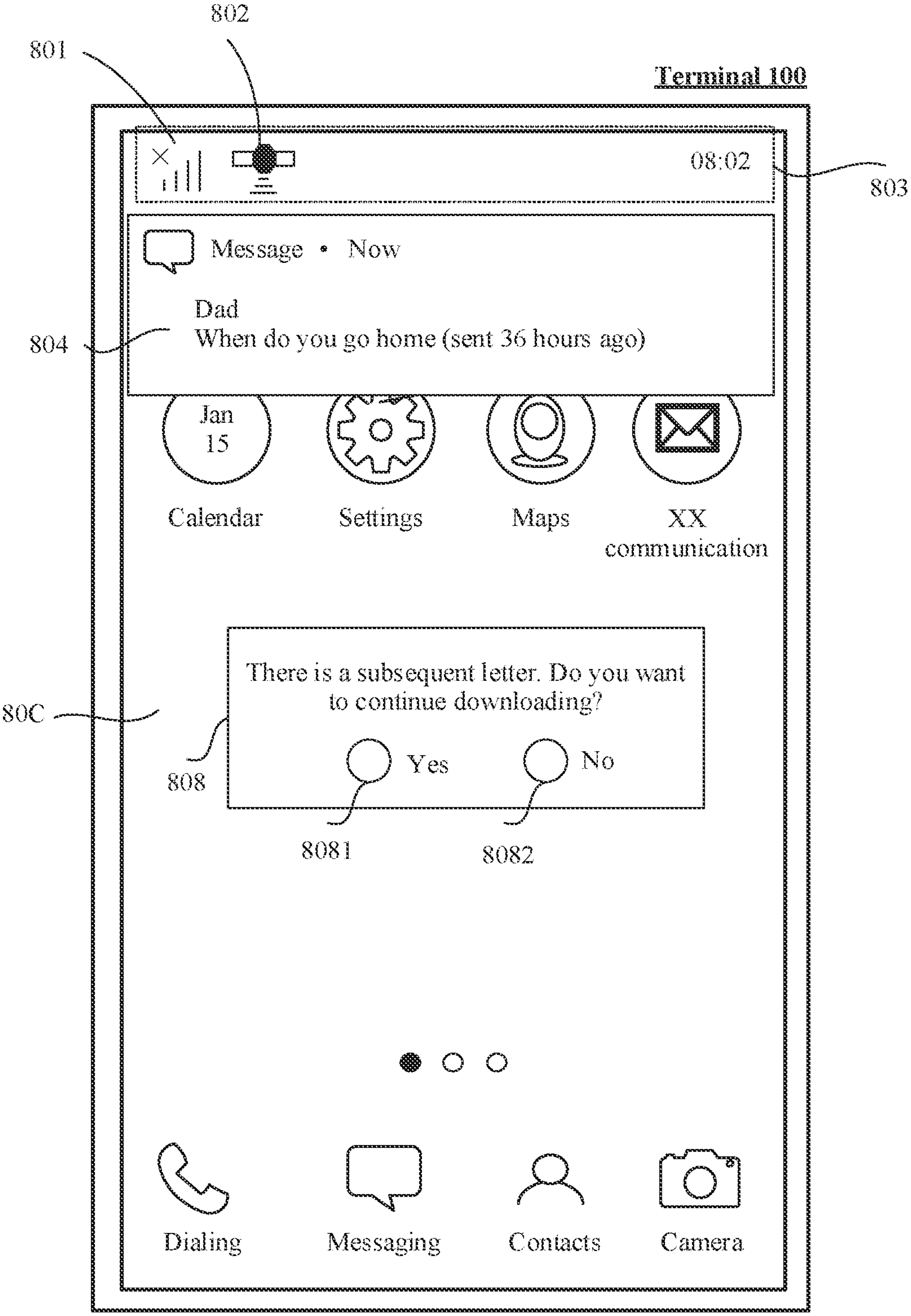
FIG. 8C is a schematic diagram of a user interface according to an embodiment of this application.

For example, content that is displayed by the terminal 100 on the display and that is of the letters sent by the target terminal in the trustlist, the target terminal that is not in the trustlist, and all the target terminals to the terminal 100 may be shown in FIG. 8A to FIG. 8C.

As shown in FIG. 8A, when the user downloads, on the terminal 100, content of a single target terminal (a target terminal in the trustlist or a target terminal that is not in the trustlist), for example, content of a letter sent by a terminal of dad to the terminal 100, the terminal 100 may display a user interface 80A. The user interface 80A may include a status bar 803 and a message notification box 804.

The status bar 803 may include a signal strength indicator 801 of a mobile communication signal (which may also be referred to as a cellular signal) and a BeiDou communication icon 802. The signal strength indicator 801 of the mobile communication signal (which may also be referred to as the cellular signal) indicates that the terminal 100 currently has no mobile communication signal, and the BeiDou communication icon 802 indicates that a BeiDou communication function of the terminal 100 is enabled.

The message notification box 804 is used to display the content of the letter sent by the target terminal to the terminal 100. The message notification box 804 may display letter receiving time, a letter sender, letter content, and original letter sending time. For example, the letter receiving time is "3 minutes ago", the letter sender is "Dad", the letter content is "When do you go home", and the original letter sending time is "36 hours ago".

It may be understood that when the user downloads, on the terminal 100, the content of the letter sent by the single target terminal (a target terminal in the trustlist or a target terminal that is not in the trustlist) to the terminal 100, the single target terminal may send one or more letters to the terminal 100. This is not limited in this embodiment of this application. If the single target terminal 100 sends a plurality of letters to the terminal 100, the terminal 100 may download content of the plurality of letters sent by the single target terminal to the terminal 100.

In a possible implementation, when the user downloads, on the terminal 100, the letters sent by all the target terminals to the terminal 100, the terminal 100 may download all the letters at a time, and display content of all the letters.

For example, as shown in FIG. 8B, when the user downloads, on the terminal 100, the letters sent by all the target terminals to the terminal 100 (for example, all letters are three letters), the terminal 100 may display a user interface 80B. The user interface 80B may include a status bar 803, a message notification box 804, a message notification box 805, a message notification box 806, and a message notification box 807.

For the status bar 803 and the message notification bar 804, refer to the descriptions in FIG. 8A. Details are not described herein again.

The message notification box 805 is used to display the content of the letter sent by the target terminal to the terminal 100. The message notification box 805 may display letter receiving time, a letter sender, letter content, and original letter sending time. For example, the letter receiving time is "3 minutes ago", the letter sender is "Mom", the letter content is "Be careful outside", and the original letter sending time is "38 hours ago".

The message notification box 807 is used to display the content of the letter sent by the target terminal to the terminal 100. The message notification box 807 may display letter receiving time, a letter sender, letter content, and original letter sending time. For example, the letter sending time is "3 minutes ago", the letter sender is "Xiaoming", the letter content is "Where are you", and the original letter sending time is "40 hours ago".

The message notification box 806 is used to prompt that letter download is completed.

The message notification box 806 may display prompt content, for example, "letter download is completed".

Optionally, in a possible implementation, when the user downloads, on the terminal 100, the letters sent by all the target terminals to the terminal 100, the terminal 100 may first download a letter, and then prompt the user whether to download a subsequent letter. If the user selects to perform downloading, the terminal 100 downloads a next letter; or if the user chooses not to perform downloading, the terminal 100 stops letter downloading.

For example, as shown in FIG. 8C, when the user downloads, on the terminal 100, the letters sent by all the target terminals to the terminal 100, the terminal 100 may display a user interface 80B. The user interface 80B may include a status bar 803, a message notification box 804, and a message prompt box 808.

For the status bar 803 and the message notification bar 804, refer to the descriptions in FIG. 8A. Details are not described herein again.

The message prompt box 808 is used to prompt the user whether to download a subsequent letter. As shown in FIG. 8C, the message prompt box 808 may include a control 8081 and a control 8082. If the user taps the control 8081, the terminal 100 may continue to download a next letter based on the user operation. If the user taps the control 8082, the terminal 100 may stop letter downloading based on the user operation.

Further, in a possible implementation, when the user downloads, on the terminal 100, the letters sent by all the target terminals to the terminal 100, and the BeiDou network device 200 finds, in the short message service center 41, that the quantity of letters sent to the terminal 100 is greater than the first threshold (for example, 16), the BeiDou network device 200 sends only letters of the first threshold quantity in the front to the terminal 100. When the terminal 100 downloads the letters sent by all the target terminals to the terminal 100 next time, the BeiDou network device 200 sends a letter after the letters of the first threshold to the terminal 100.

The following describes an example terminal 100 provided in embodiments of this application.

Figure 8D:
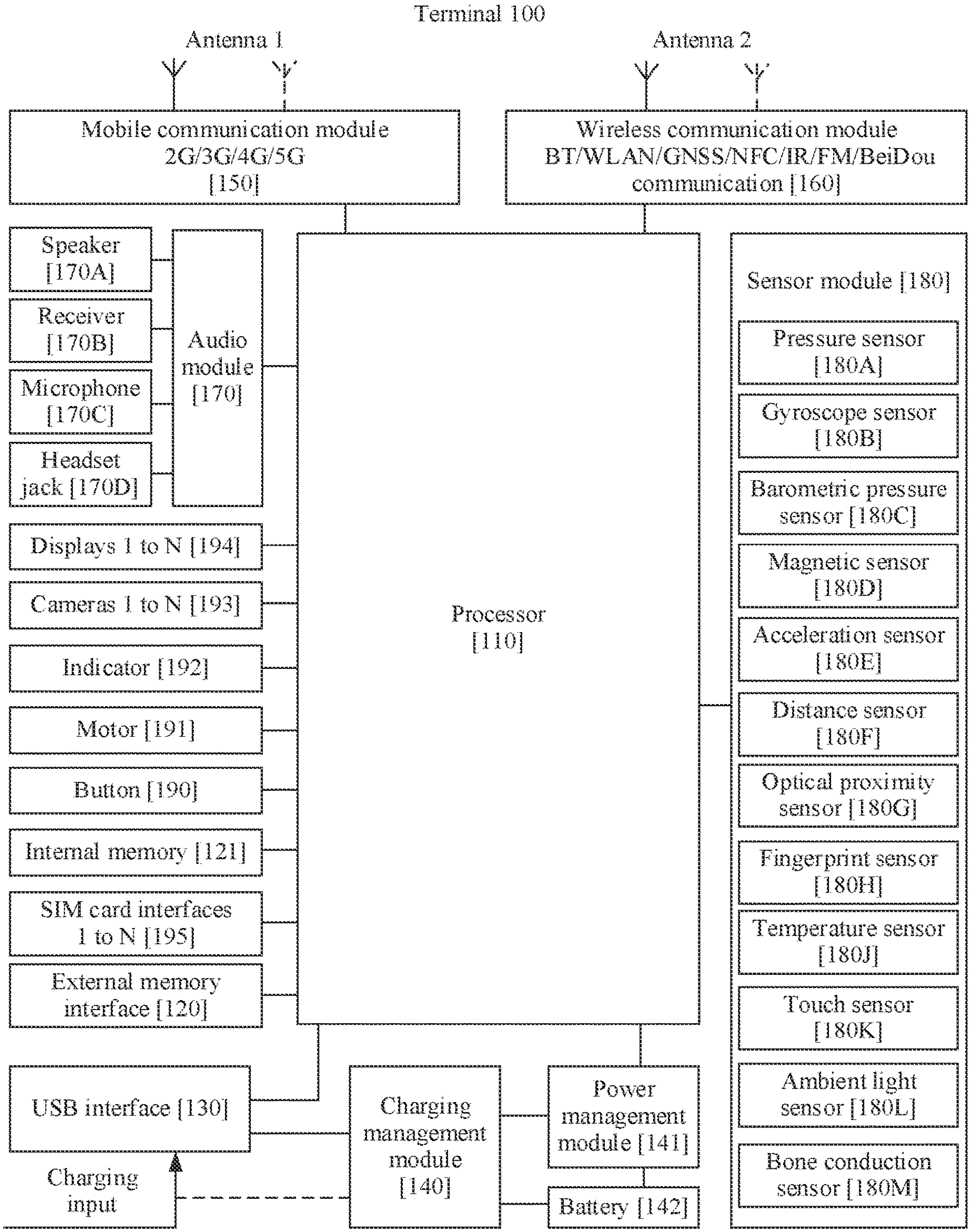
FIG. 8D is a schematic diagram of a structure of a terminal according to an embodiment of this application.

FIG. 8D is a schematic diagram of a structure of a terminal 100 according to an embodiment of this application.

The following uses the terminal 100 as an example to specifically describe this embodiment. It should be understood that the terminal 100 may have more or fewer components than those shown in the figure, or may combine two or more components, or may have different component configurations. Various components shown in the figure may be implemented in hardware including one or more signal processing and/or application-specific integrated circuits, software, or a combination of hardware and software.

The terminal 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module. SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the terminal 100. In some other embodiments of this application, the terminal 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor. ISP), a controller, a memory, a video codec, a digital signal processor (digital signal processor. DSP), a baseband processor, a neural-network processing unit (neural-network processing unit, NPU), and/or the like. Different processing units may be independent components, or may be integrated into one or more processors.

The controller may be a nerve center and a command center of the terminal 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit. I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter. UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line. SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is configured to perform asynchronous communication. The bus may be a two-way communication bus, and converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface to implement a shooting function of the terminal 100. The processor 110 communicates with the display 194 through the DSI interface to implement a display function of the terminal 100.

The GPIO interface may be configured by software. The GPIO interface may be configured as a control signal or a data signal. In some embodiments, the GPIO interface may be configured to connect the processor 110 to the camera 193, the display 194, the wireless communication module 160, the audio module 170, the sensor module 180, and the like. The GPIO interface may alternatively be configured as an I2C interface, an I2S interface, a UART interface, an MIPI interface, or the like.

The SIM interface may be configured to communicate with the SIM card interface 195, to implement a function of transmitting data to an SIM card or reading data in an SIM card.

The USB interface 130 is an interface that conforms to a USB standard specification, and may be specifically a mini USB interface, a micro USB interface, a USB type-C interface, or the like. The USB interface 130 may be configured to connect to the charger to charge the terminal 100, or may be configured to transmit data between the terminal 100 and a peripheral device, or may be configured to connect to a headset, to play an audio through the headset. The interface may be further configured to connect to another terminal, for example, an AR device.

It may be understood that an interface connection relationship between the modules that is shown in this embodiment of the present invention is merely an example for description, and does not constitute a limitation on the structure of the terminal 100. In some other embodiments of this application, the terminal 100 may alternatively use an interface connection manner different from that in the foregoing embodiment, or use a combination of a plurality of interface connection manners.

The charging management module 140 is configured to receive a charging input from a charger. The charger may be a wireless charger or a wired charger.

The power management module 141 is configured to connect the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communication module 160, and the like.

A wireless communication function of the terminal 100 may be implemented through the antenna 1, the antenna 2, the mobile communication module 150, the wireless communication module 160, a modem processor, a baseband processor, and the like.

The antenna 1 and the antenna 2 are configured to transmit and receive an electromagnetic wave signal. Each antenna in the terminal 100 may be configured to cover one or more communication frequency bands. Different antennas may be further multiplexed to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution including 2G/3G/4G/5G applied to the terminal 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some function modules of the mobile communication module 150 may be disposed in the processor 110. In some embodiments, at least some function modules of the mobile communication module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same component as the mobile communication module 150 or another functional module.

The wireless communication module 160 may provide a solution, applied to the terminal 100, to wireless communication including a wireless local area network (wireless local area network, WLAN) (for example, a wireless fidelity (wireless fidelity, Wi-Fi) network). Bluetooth (Bluetooth, BT), a global navigation satellite system (global navigation satellite system, GNSS), a BeiDou communication module, frequency modulation (frequency modulation, FM), near field communication (near field communication, NFC), an infrared (infrared, IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

The BeiDou communication module may be configured to communicate with the BeiDou network device 200. The BeiDou communication module may support short packet transmission with the BeiDou network device 200.

In some embodiments, the antenna 1 of the terminal 100 is coupled to the mobile communication module 150, and the antenna 2 is coupled to the wireless communication module 160, so that the terminal 100 can communicate with the network and other devices through a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system GPS), a global navigation satellite system (global navigation satellite system, GLONASS), a BeiDou navigation satellite system (BeiDou navigation satellite system. BDS), a quasi-zenith satellite system (quasi-zenith satellite system, QZSS), and/or a satellite based augmentation system (satellite based augmentation system, SBAS).

The terminal 100 implements a display function through the GPU, the display 194, the application processor, and the like. The GPU is a microprocessor for image processing, and connects the display 194 to the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light emitting diode, AMOLED), a flexible light-emitting diode (flexible light-emitting diode, FLED), a mini-LED, a micro-LED, a micro-OLED, a quantum dot light-emitting diode (quantum dot light emitting diode, QLED), or the like. In some embodiments, the terminal 100 may include one or N displays 194, where N is a positive integer greater than 1.

The terminal 100 may implement a shooting function through the ISP, the camera 193, the video codec, the GPU, the display 194, the application processor, and the like.

The ISP is configured to process data fed back by the camera 193. For example, during shooting, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and color of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal 100 may include one or N cameras 193, where N is a positive integer greater than 1.

The digital signal processor is configured to process a digital signal, and may process another digital signal in addition to the digital image signal. For example, when the terminal 100 selects a frequency, the digital signal processor is configured to perform Fourier transformation on frequency energy.

The video codec is configured to compress or decompress a digital video. The terminal 100 may support one or more video codecs. Therefore, the terminal 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. Applications such as intelligent cognition of the terminal 100 may be implemented through the NPU, for example, image recognition, facial recognition, speech recognition, and text understanding.

The internal memory 121 may include one or more random access memories (random access memory, RAM) and one or more non-volatile memories (non-volatile memory, NVM).

The random access memory may include a static random access memory (static random access memory. SRAM), a dynamic random access memory (dynamic random access memory, DRAM), a synchronous dynamic random access memory (synchronous dynamic random access memory, SDRAM), a double data rate synchronous dynamic random access memory. (double data rate synchronous dynamic random access memory, DDR SDRAM, for example, a 5th generation DDR SDRAM is usually referred to as a DDR5 SDRAM), and the like.

The non-volatile memory may include a magnetic disk storage device and a flash memory (flash memory).

The flash memory may be classified into an NOR flash, an NAND flash, a 3D NAND flash, and the like according to an operation principle; may be classified into a single-level cell (single-level cell, SLC), a multi-level cell (multi-level cell. MLC), a triple-level cell (triple-level cell. TLC), a quad-level cell (quad-level cell, QLC), and the like based on a quantity of electric potential levels of a cell; or may be classified into a universal flash storage (English: universal flash storage, UFS), an embedded multimedia card (embedded multimedia Card, eMMC), and the like according to storage specifications.

The random access memory may be directly read and written by the processor 110, may be configured to store an executable program (for example, machine instructions) of an operating system or another running program may be further configured to store data of a user and an application, and the like.

The non-volatile memory may also store an executable program, data of a user and an application, and the like, and may be loaded to the random access memory in advance for the processor 110 to directly perform reading and writing.

The terminal 100 may implement an audio function, such as music playing or recording, through the audio module 170, the speaker 170A, the receiver 170B, the microphone 170C, the earphone interface 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The terminal 100 may be configured to listen to music or answer a hands-free call through the speaker 170A.

The receiver 170B, also referred to as an "earpiece", is configured to convert an electrical audio signal into a sound signal. When a call is answered or voice information is received by using the terminal 100, the receiver 170B may be put close to a human ear to receive a voice.

The microphone 170C, also referred to as a "mike" or a "mic", is configured to convert a sound signal into an electrical signal. When making a call or sending voice information, the user may make a sound near the microphone 170C through the mouth of the user, to input a sound signal to the microphone 170C. At least one microphone 170C may be disposed in the terminal 100. In some other embodiments, two microphones 170C may be disposed in the terminal 100, to collect a sound signal and implement a noise reduction function. In some other embodiments, three, four, or more microphones 170C may alternatively be disposed in the terminal 100, to collect a sound signal and reduce noise. The microphones may further identify a sound source, to implement a directional recording function, and the like.

The headset jack 170D is configured to connect to a wired headset. The headset jack 170D may be the USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 100 determines pressure intensity based on a change in the capacitance. When a touch operation is performed on the display 194, the terminal 100 detects intensity of the touch operation by using the pressure sensor 180A. The terminal 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on a Messaging application icon, an instruction for viewing an SMS message is performed. When a touch operation whose touch operation intensity is greater than or equal to the first pressure threshold is performed on the Messaging application icon, an instruction for creating a new SMS message is performed.

The gyroscope sensor 180B may be configured to determine a motion gesture of the terminal 100. In some embodiments, an angular velocity of the terminal 100 around three axes (namely, axes x, y, and z) may be determined by using the gyroscope sensor 180B. The gyroscope sensor 180B may be configured to perform image stabilization during shooting. For example, when a shutter is pressed, the gyroscope sensor 180B detects an angle at which the terminal 100 jitters, calculates, based on the angle, a distance for which a lens module needs to compensate, and allows a lens to cancel the jitter of the terminal 100 through reverse motion, to implement the image stabilization. The gyroscope sensor 180B may also be used in a navigation scenario and a somatic game scenario.

The barometric pressure sensor 180C is configured to measure barometric pressure. In some embodiments, the terminal 100 calculates an altitude based on a barometric pressure value measured by the barometric pressure sensor 180C, to assist in positioning and navigation.

The magnetic sensor 180D includes a Hall effect sensor. The terminal 100 may detect opening and closing of a flip cover by using the magnetic sensor 180D. In some embodiments, when the terminal 100 is a clamshell phone, the terminal 100 may detect opening and closing of a flip cover by using the magnetic sensor 180D. Further, a feature such as automatic unlocking upon opening of the flip cover is set based on a detected opening or closing state of the flip cover.

The acceleration sensor 180E may detect values of accelerations of the terminal 100 in various directions (usually on three axes). A magnitude and a direction of gravity may be detected when the terminal 100 is still. The acceleration sensor may be further configured to identify a posture of the terminal, and is applied to an application such as switching between a landscape mode and a portrait mode or a pedometer.

The distance sensor 180F is configured to measure a distance. The terminal 100 may measure a distance in an infrared manner or a laser manner. In some embodiments, in a shooting scenario, the terminal 100 may measure a distance by using the distance sensor 180F to implement quick focusing.

The optical proximity sensor 180G may include, for example, a light-emitting diode (LED) and an optical detector, for example, a photodiode. The light emitting diode may be an infrared light emitting diode. The terminal 100 transmits infrared light by using the light-emitting diode. The terminal 100 detects infrared reflected light from a nearby object by using the photodiode. When sufficient reflected light is detected, it may be determined that there is an object near the terminal 100. When insufficient reflected light is detected, the terminal 100 may determine that there is no object near the terminal 100. The terminal 100 may detect, by using the optical proximity sensor 180G, that the terminal 100 held by the user is close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The terminal 100 may adaptively adjust brightness of the display 194 based on the sensed ambient light brightness. The ambient light sensor 180L may also be configured to automatically adjust white balance during shooting. The ambient light sensor 180L may further cooperate with the optical proximity sensor 180G to detect whether the terminal 100 is in a pocket, to avoid an accidental touch.

The fingerprint sensor 180H is configured to collect a fingerprint. The terminal 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the terminal 100 executes a temperature processing policy by using the temperature detected by the temperature sensor 180J. For example, when the temperature reported by the temperature sensor 180J exceeds a threshold, the terminal 100 lowers performance of a processor located near the temperature sensor 180J, to reduce power consumption for thermal protection. In some other embodiments, when the temperature is lower than another threshold, the terminal 100 heats the battery 142 to avoid abnormal shutdown of the terminal 100 due to a low temperature. In some other embodiments, when the temperature is lower than still another threshold, the terminal 100 boosts an output voltage of the battery 142 to avoid abnormal shutdown caused by a low temperature.

The touch sensor 180K is also referred to as a "touch panel". The touch sensor 180K may be disposed on the display 194. The touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided through the display 194. In some other embodiments, the touch sensor 180K may alternatively be disposed on a surface of the terminal 100 at a location different from that of the display 194.

The button 190 includes a power button, a volume button, and the like. The button 190 may be a mechanical button or a touch button. The terminal 100 may receive a button input, and generate a button signal input related to user setting and function control of the terminal 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time prompt, information receiving, an alarm clock, and a game) may also correspond to different vibration feedback effects. The touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the terminal 100. The terminal 100 may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or of different types. The SIM card interface 195 may be compatible with different types of SIM cards. The SIM card interface 195 may also be compatible with an external storage card. The terminal 100 interacts with a network through the SIM card, to implement functions such as calling and data communication.

The foregoing content describes in detail the methods provided in this application. To better implement the foregoing solutions in embodiments of this application, embodiments of this application further provide corresponding apparatuses or devices.

In embodiments of this application, division of functional modules may be performed on the terminal 100 and the BeiDou network device 200 based on the foregoing method examples. For example, each function module may be obtained through division in correspondence to each function, or at least two functions may be integrated into one processing module. The integrated module may be implemented in a form of hardware, or may be implemented in a form of a software functional module. It should be noted that, in embodiments of this application, module division is an example, and is merely a logical function division. In an actual implementation, another division manner may be used.

The following describes in detail the communication apparatuses in embodiments of this application with reference to FIG. 9 to FIG. 12.

Figure 9:
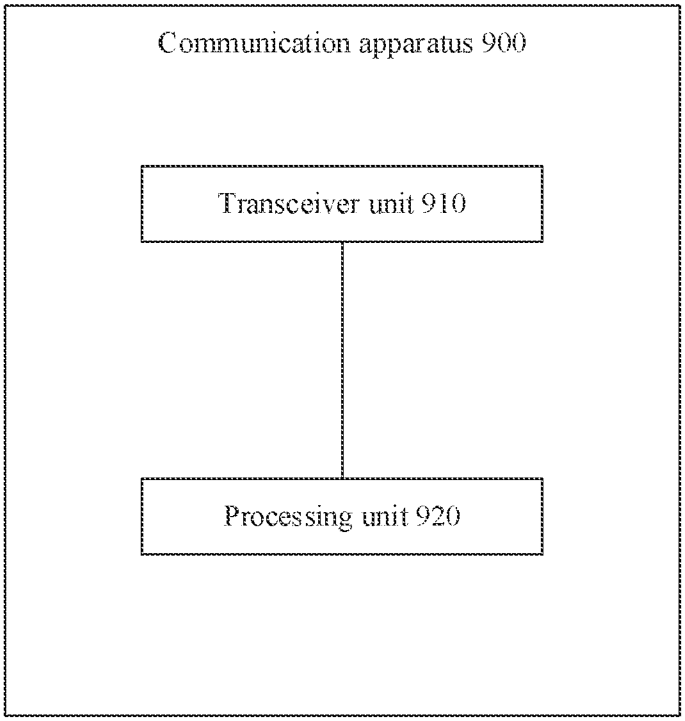
FIG. 9 is a schematic diagram of a structure of a communication apparatus according to an embodiment of this application.

When an integrated unit is used, refer to FIG. 9. FIG. 9 is a schematic diagram of a structure of a communication apparatus 900 according to an embodiment of this application. The communication apparatus 900 may be the terminal 100 in the foregoing embodiments. Optionally, the communication apparatus 900 may be a chip/chip system, for example, a BeiDou communication chip. As shown in FIG. 9, the communication apparatus 900 may include a transceiver unit 910 and a processing unit 920.

In a design, the transceiver unit 910 may be configured to send a letter download query request packet to the BeiDou network device 200.

Optionally, the transceiver unit 910 may be further configured to receive a letter download query result packet.

The processing unit 920 may be configured to deliver the letter download query request packet to an MDCP layer, and segment the letter download query request packet into one or more MDCP PDUs at the MDCP layer.

Optionally, the processing unit 920 may be further configured to deliver the one or more MDCP PDUs to an SLC layer, and segment each MDCP PDU into one or more SLC PDUs 1 at the SLC layer.

Optionally the transceiver unit 910 may be further configured to perform functional steps that are related to sending and receiving and that are performed by the terminal 100 in the method embodiments shown in FIG. 7.

Optionally, the processing unit 920 may be further configured to perform functional steps that are related to protocol parsing and encapsulation and operation determining and that are performed by the terminal 100 in the method embodiments shown in FIG. 7.

It should be understood that the communication apparatus 900 in this design may correspondingly perform the method steps performed by the terminal 100 in the foregoing embodiments. For brevity, details are not described herein again.

Figure 10:
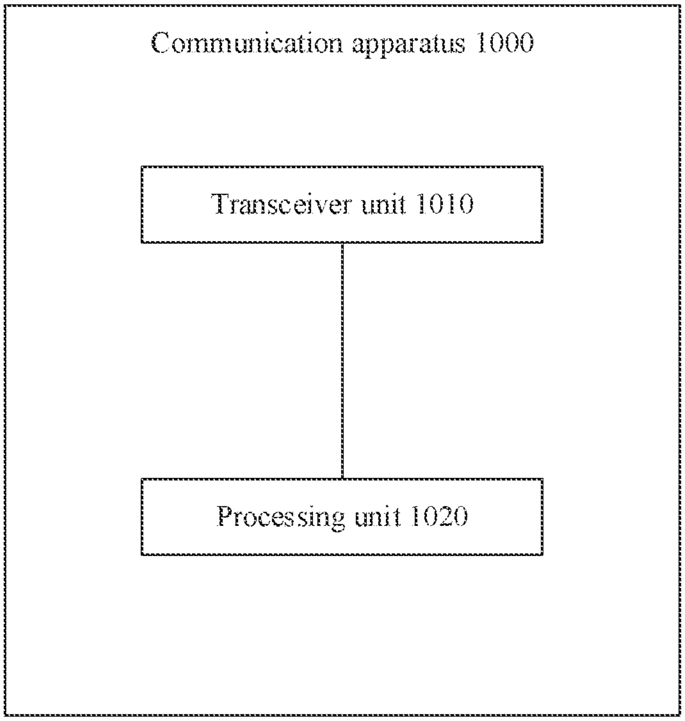
FIG. 10 is a schematic diagram of a structure of another communication apparatus according to an embodiment of this application.

When an integrated unit is used, refer to FIG. 10. FIG. 10 is a schematic diagram of a structure of a communication apparatus 1000 according to an embodiment of this application. The communication apparatus 1000 may be the BeiDou network device 200 in the foregoing embodiments. Optionally, the communication apparatus 1000 may be a specific network element in the BeiDou network device 200, for example, one network element or a combination of a plurality of network elements in the BeiDou ground receiving station 31, the BeiDou ground transmitting station 35, the signal receiving and processing device 32, the signal processing center 33, the signal sending and processing device 36, the operation control center 37, and the BeiDou short packet integrated communication platform 34. As shown in FIG. 10, the communication apparatus 1000 may include a transceiver unit 1010 and a processing unit 1020.

In a design, the transceiver unit 1010 may be configured to receive a letter download query request packet.

The transceiver unit 1010 may be further configured to send a letter download query result packet.

The processing unit 1020 may be configured to splice one or more SLC PDUs 1 into the letter download query request packet.

The processing unit 1020 may be further configured to splice the one or more SLC PDUs 1 into one or more SLC SDUs at an SLC layer, upload the one or more SLC SDUs to an MDCP layer as one or more MDCP PDUs at the MDCP layer, splice the one or more MDCP PDUs into an MDCP SDU at the MDCP layer, and then upload the MDCP SDU to an APP layer as the letter download query request packet.

Optionally, the transceiver unit 1010 may be further configured to perform functional steps that are related to sending and receiving and that are performed by the BeiDou network device 200 in the method embodiments shown in FIG. 7.

Optionally, the processing unit 1020 may be further configured to perform functional steps that are related to protocol parsing and encapsulation and operation determining and that are performed by the BeiDou network device 200 in the method embodiments shown in FIG. 7.

It should be understood that the communication apparatus 1000 in this design may correspondingly perform the method steps performed by the BeiDou network device 200 in the foregoing embodiments. For brevity, details are not described herein again.

The foregoing describes the terminal 100 and the BeiDou network device 200 in embodiments of this application. It should be understood that any product having a function of the terminal 100 in FIG. 9 and any product having a function of the BeiDou network device 200 in FIG. 10 fall within the protection scope of embodiments of this application.

In a possible product form, the terminal 100 in embodiments of this application may be implemented by using a general bus architecture.

Figure 11:
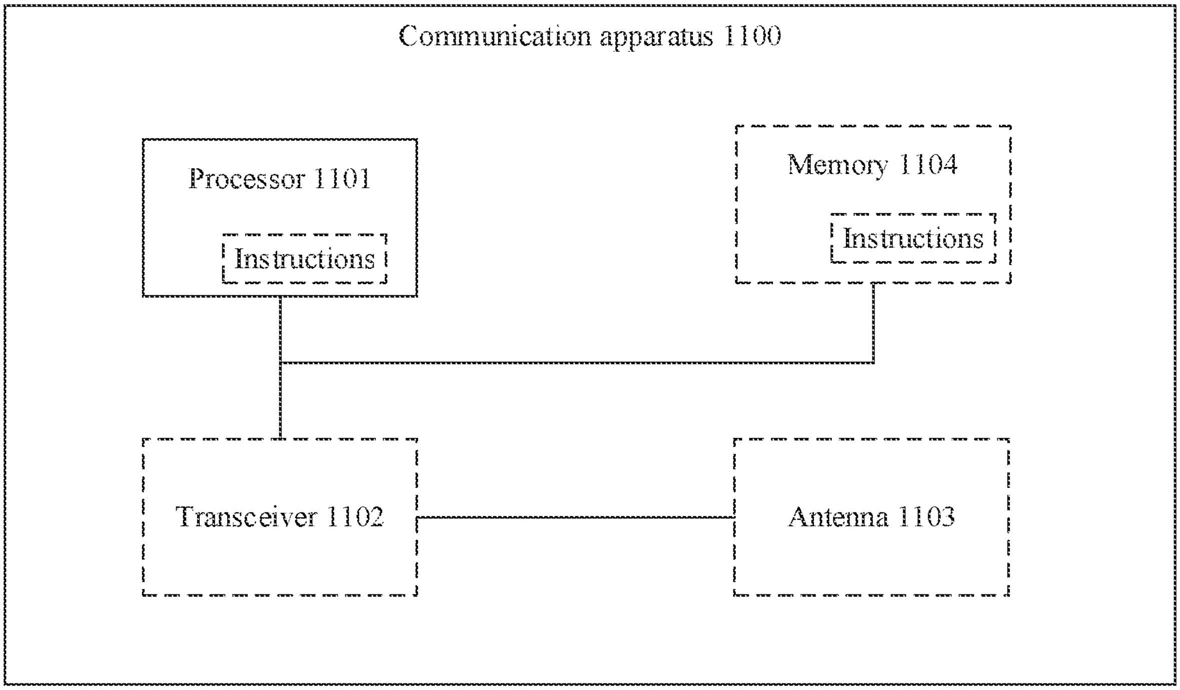
FIG. 11 is a schematic diagram of a structure of another communication apparatus according to an embodiment of this application.

FIG. 11 is a schematic diagram of a structure of a communication apparatus 1100 according to an embodiment of this application. The communication apparatus 1100 may be the terminal 100 or an apparatus in the terminal 100. As shown in FIG. 11, the communication apparatus 1100 includes a processor 1101 and a transceiver 1102 that is internally connected to and communicates with the processor. The processor 1101 is a general-purpose processor, a dedicated processor, or the like. For example, the processor may be a baseband processor or a central processing unit in satellite communication. The baseband processor in satellite communication may be configured to process a satellite communication protocol and satellite communication data, and the central processing unit may be configured to control a communication apparatus (for example, a baseband chip, a terminal, or a terminal chip) to execute a computer program, to process data of the computer program. The transceiver 1102 may be referred to as a transceiver unit, a transceiver machine, a transceiver circuit, or the like, and is configured to implement a transceiver function. The transceiver 1102 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function. Optionally, the communication apparatus 1100 may further include an antenna 1103 and/or a radio frequency unit (not shown in the figure). The antenna 1103 and/or the radio frequency unit may be located inside the communication apparatus 1100, or may be separated from the communication apparatus 1100. In other words, the antenna 1103 and/or the radio frequency unit may be deployed remotely or in a distributed manner.

Optionally, the communication apparatus 1100 may include one or more memories 1104. The memory may store instructions. The instructions may be a computer program. The computer program may be run on the communication apparatus 1100, so that the communication apparatus 1100 performs the method described in the foregoing method embodiments Optionally, the memory 1104 may further store data. The communication apparatus 1100 and the memory 1104 may be separately disposed, or may be integrated.

The processor 1101, the transceiver 1102, and the memory 1104 may be connected through a communication bus.

In a design, the communication apparatus 1100 may be configured to perform functions of the terminal 100 in the foregoing embodiments. The processor 1101 may be configured to perform functional steps that are related to protocol parsing and encapsulation and operation determining and that are performed by the terminal 100 in the embodiments shown in FIG. 3A and FIG. 3B, FIG. 5A and FIG. 5B, and FIG. 7, and/or another process of the technology described in this specification. The transceiver 1102 may be configured to perform functional steps that are related to protocol parsing and encapsulation and operation determining and that are performed by the terminal 100 in the embodiments shown in FIG. 3A and FIG. 3B. FIG. 5A and FIG. 5B, and FIG. 7, and/or another process of the technology described in this specification.

In any one of the foregoing designs, the processor 1101 may include a transceiver configured to implement sending and receiving functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1101 may store instructions. The instructions may be a computer program. The computer program is run on the processor 1101, so that the communication apparatus 1100 performs the method steps performed by the terminal 100 in the foregoing method embodiments. The computer program may be fixed in the processor 1101, and in this case, the processor 1101 may be implemented by hardware.

In an implementation, the communication apparatus 1100 may include a circuit, and the circuit may implement the sending, receiving, or communication function in the foregoing method embodiments. The processor and the transceiver that are described in this application may be implemented on an integrated circuit (integrated circuit. IC), an analog IC, a radio frequency integrated circuit RFIC, a mixed-signal IC, an application specific integrated circuit (application-specific integrated circuit, ASIC), a printed circuit board (printed circuit board, PCB), a terminal, or the like. The processor and the transceiver may alternatively be manufactured by using various IC technologies, for example, a complementary metal oxide semiconductor (complementary metal oxide semiconductor, CMOS), an N-type metal oxide semiconductor (nMetal-oxide-semiconductor, NMOS), a P-channel metal oxide semiconductor (positive channel metal oxide semiconductor, PMOS), a bipolar junction transistor (bipolar junction transistor. BJT), a bipolar CMOS (BiCMOS), silicon germanium (SiGe), and gallium arsenide (GaAs).

A scope of the communication apparatus described in this application is not limited thereto, and the structure of the communication apparatus may not be limited in FIG. 11. The communication apparatus 1100 may be an independent device or may be a part of a large device. For example, the communication apparatus 1100 may be:

(1) an independent integrated circuit IC, a chip, or a chip system or subsystem;

(2) a set including one or more ICs, where optionally, the set of 1Cs may further include a storage component configured to store data and a computer program.

(3) an ASIC, for example, a modem (Modem);

(4) a module that can be embedded in another device;

(5) a receiver machine, a terminal, an intelligent terminal, a cellular phone, a wireless device, a handheld device, a mobile unit, a vehicle-mounted device, a network device, a cloud device, or an artificial intelligence device; or (6) others.

In a possible product form, any network element (for example, the BeiDou ground receiving station 31, the BeiDou ground transmitting station 35, the signal receiving and processing device 32, the signal processing center 33, the signal sending and processing device 36, the operation control center 37, or the BeiDou short packet integrated communication platform 34) in the BeiDou network device 200 in embodiments of this application may be implemented by using a general bus architecture.

Figure 12:
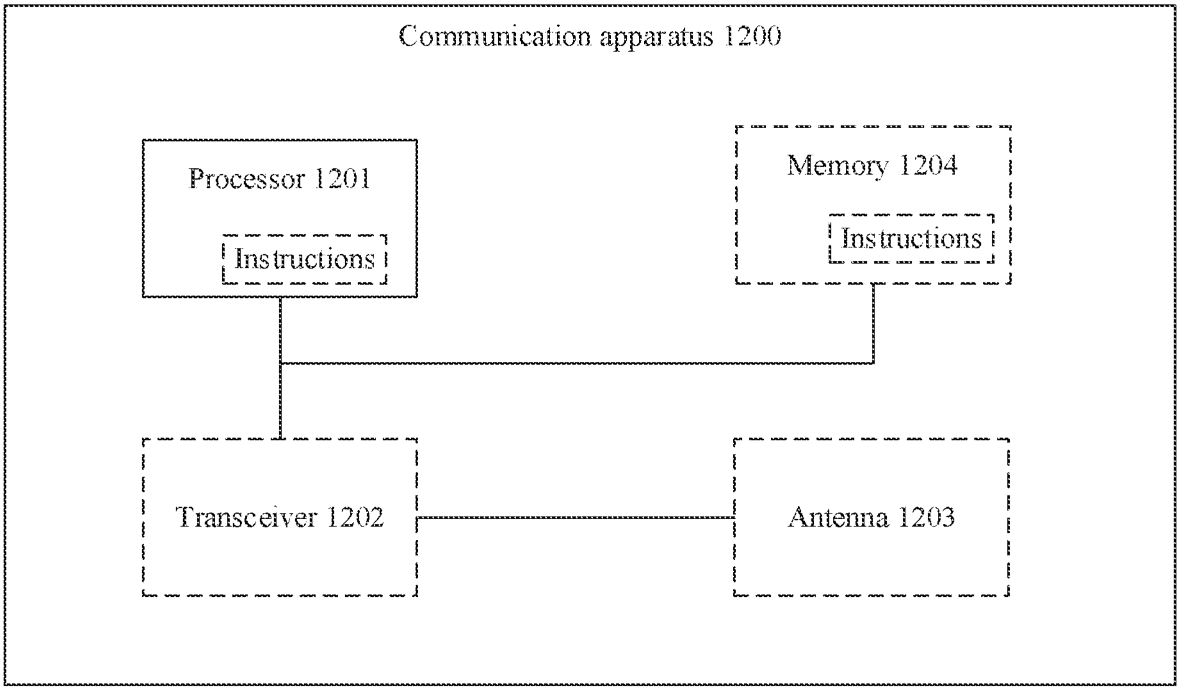
FIG. 12 is a schematic diagram of a structure of another communication apparatus according to an embodiment of this application.

FIG. 12 is a schematic diagram of a structure of a communication apparatus 1200 according to an embodiment of this application. The communication apparatus 1200 may be the BeiDou network device 200 or an apparatus in the BeiDou network device 200. As shown in FIG. 12, the communication apparatus 1200 includes a processor 1201 and a transceiver 1202 that is internally connected to and communicates with the processor. The processor 1201 is a general-purpose processor, a dedicated processor, or the like. For example, the processor may be a baseband processor or a central processing unit in satellite communication. The baseband processor in satellite communication may be configured to process a satellite communication protocol and satellite communication data, and the central processing unit may be configured to control a communication apparatus (for example, a baseband chip) to execute a computer program, to process data of the computer program. The transceiver 1202 may be referred to as a transceiver unit, a transceiver machine, a transceiver circuit, or the like, and is configured to implement a transceiver function. The transceiver 1202 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function. Optionally, the communication apparatus 1200 may further include an antenna 1203 and/or a radio frequency unit (not shown in the figure). The antenna 1203 and/or the radio frequency unit may be located inside the communication apparatus 1200, or may be separated from the communication apparatus 1200.

In other words, the antenna 1203 and/or the radio frequency unit may be deployed remotely or in a distributed manner.

Optionally the communication apparatus 1200 may include one or more memories 1204. The memory may store instructions. The instructions may be a computer program. The computer program may be run on the communication apparatus 1200, so that the communication apparatus 1200 performs the method described in the foregoing method embodiments. Optionally, the memory 1204 may further store data. The communication apparatus 1200 and the memory 1204 may be separately disposed, or may be integrated.

The processor 1201, the transceiver 1202, and the memory 1204 may be connected through a communication bus.

In a design, the communication apparatus 1200 may be configured to perform functions of the BeiDou network device 200 in the foregoing embodiments. The processor 1201 may be configured to perform functional steps that are related to protocol parsing and encapsulation and operation determining and that are performed by the BeiDou network device 200 in the embodiments shown in FIG. 7, and/or another process of the technology described in this specification. The transceiver 1202 may be configured to perform functional steps that are related to protocol parsing and encapsulation and operation determining and that are performed by the BeiDou network device 200 in the embodiments shown in FIG. 4A and FIG. 4B. FIG. 6A and FIG. 6B, and FIG. 7, and/or another process of the technology described in this specification.

In any one of the foregoing designs, the processor 1201 may include a transceiver configured to implement sending and receiving functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1201 may store instructions. The instructions may be a computer program. The computer program is run on the processor 1201, so that the communication apparatus 1200 performs the method steps performed by the terminal 100 in the foregoing method embodiments. The computer program may be fixed in the processor 1201, and in this case, the processor 1201 may be implemented by hardware.

An embodiment of this application further provides a computer-readable storage medium. The computer-readable storage medium stores computer program code. When the processor executes the computer program code, the communication apparatus is enabled to perform the method in any one of the foregoing embodiments.

An embodiment of this application further provides a computer program product. When the computer program product runs on a computer, the computer is enabled to perform the method in any one of the foregoing embodiments.

An embodiment of this application further provides a communication apparatus. The apparatus may exist in a product form of a chip. A structure of the apparatus includes a processor and an interface circuit. The processor is configured to communicate with another apparatus through the interface circuit, to enable the apparatus to perform the method in any one of the foregoing embodiments.

An embodiment of this application further provides a BeiDou communication system, including a terminal 100 and a BeiDou network device 200. The terminal 100 and the BeiDou network device 200 may perform the method in any one of the foregoing embodiments.

The short packet communication function in the BeiDou communication system is described in this application. It may be understood that another satellite system may also have a communication function that supports a short packet. Therefore, this is not limited to the BeiDou communication system, if another satellite system also supports the short packet communication function, the method described in this application is also applicable to communication in the another satellite system.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

According to the context, the term "when" used in the foregoing embodiments may be interpreted as a meaning of "if", "after". "in response to determining", or "in response to detecting" Similarly, according to the context, the phrase "when it is determined that . . . " or "if (a stated condition or event) is detected" may be interpreted as a meaning of "if it is determined that . . . ", "in response to determining . . . ", "when (a stated condition or event) is detected", or "in response to detecting (a stated condition or event)".

All or some of the foregoing embodiments may be implemented through software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

Persons of ordinary skill in the art may understand that all or some of the processes of the methods in embodiments may be implemented by a computer program instructing related hardware. The program may be stored in a computer-readable storage medium. When the program runs, the processes of the methods in embodiments are performed.

The storage medium includes any medium that can store program code, such as a ROM, a random access memory RAM, a magnetic disk, or an optical disc.

What is claimed is:

1. A method comprising:

receiving, by a first terminal of a satellite communication system, a first letter;

sending, by the first terminal, a letter download query request packet to a satellite network device of the satellite communication system, wherein the letter download query request packet requests downloading first content of a letter from one or more second terminals to the first terminal, wherein the letter download query request packet comprises a message identifier (ID) field, wherein the message ID field indicates a first letter ID of the first letter, and wherein the first letter ID instructs the satellite network device to delete the first letter;

receiving, by the first terminal, a second letter from the one or more second terminals; and receiving, by the first terminal, a letter download query result packet from the satellite network device, wherein the letter download query result packet comprises a letter content field and a second letter ID field, wherein the letter content field indicates second content of the second letter, wherein the second letter ID field indicates an ID of the second letter, and wherein the second letter ID is arranged after the first letter ID in sequence.

2. The method of claim 1, wherein the letter download query request packet further comprises a service type field, wherein when the service type field is a first value, the service type field indicates that the letter download query request packet requests downloading the second content of the second letter from a second terminal of the second terminals in a trustlist to the first terminal, wherein when the service type field is a second value, the service type field indicates that the letter download query request packet requests downloading the second content of the second letter from a second terminal of the second terminals that is not in the trustlist to the first terminal, wherein when the service type field is a third value, the service type field indicates that the letter download query request packet requests downloading content of second letters from all second terminals to the first terminal, wherein the trustlist is set in the first terminal, and wherein the trustlist stores an identifier of a second terminal of the second terminals associated with the first terminal and a first sequence number of the second terminal associated with the first terminal.

3. The method of claim 2, wherein when the service type field is the first value, the letter download query request packet further comprises a first sender ID field, and the first sender ID field indicates a second sequence number of the second terminal in the trustlist, and wherein when the service type field is the second value, the letter download query request packet further comprises the first sender ID field, and the first sender ID field indicates an identifier of the second terminal that is not in the trustlist.

4. The method of claim 3, wherein the letter download query result packet further comprises a trustlist indicator field and a second sender ID field, wherein when the trustlist indicator field is a fourth value, the trustlist indicator field indicates that the second sender ID field is a mobile phone number of the second terminal that is not in the trustlist, and wherein when the trustlist indicator field is a fifth value, the trustlist indicator field indicates that the second sender ID field is the second sequence number.

5. The method of claim 4, wherein the letter download query result packet further comprises a message type indicator field, wherein when the message type indicator field is a sixth value, the message type indicator field indicates that the letter download query result packet indicates a quantity of the second letters, and wherein when the message type indicator field is a seventh value, the message type indicator field indicates that the letter download query result packet indicates the content of the second letter from the one or more second terminals to the first terminal.

6. The method of claim 5, wherein when the service type field in the letter download query request packet is the first value, the trustlist indicator field in the letter download query result packet is the fifth value, and the message type indicator field in the letter download query result packet is the seventh value, and wherein when the service type field in the letter download query request packet is the second value, the trustlist indicator field in the letter download query result packet is the fourth value, and the message type indicator field in the letter download query result packet is the seventh value.

7. The method of claim 2, wherein the letter download query result packet further comprises a letter download completion indicator field, wherein when the service type field is the first value or the second value, the letter download completion indicator field indicates whether there is still a letter from the second terminal to the first terminal after the satellite network device sends the second letter, and wherein when the service type field is the third value, the letter download completion indicator field indicates whether there are still letters from all second terminals to the first terminal after the satellite network device sends the second letter.

8. The method of claim 7, wherein the letter download query result packet further comprises an original message sending time field indicting an original sending time of the second letter.

9. The method of claim 8, wherein the letter download query result packet further comprises a location information indicator field, wherein when the location information indicator field is an eighth value, the location information indicator field indicates that there is no location information field in a subsequent field, and wherein when the location information indicator field is a ninth value, the location information indicator field indicates that there is a location information field in a subsequent field.

10. The method of claim 9, wherein when the location information indicator field is the ninth value, the letter download query result packet further comprises the location information field, and wherein the location information field indicates location information of a second terminal of the second terminals indicated by a sender ID field.

11. The method of claim 1, wherein the letter download query result packet further comprises a data format indicator field indicating a format of the content of the second letter.

12. The method of claim 11, wherein before sending the letter download query request packet to the satellite network device, the method further comprises:

detecting, by the first terminal, a first operation; and generating the letter download query request packet based on the first operation.

13. The method of claim 12, wherein sending the letter download query request packet to the satellite network device comprises:

delivering, by the first terminal at an application (APP) layer, the letter download query request packet to a message data convergence protocol (MDCP) layer of the first terminal as an MDCP service data unit (SDU) of the MDCP layer;

segmenting, by the first terminal after adding padding data and a redundancy length indicator field to the MDCP SDU, the MDCP SDU into one or more MDCP protocol data units (PDUs), wherein the one or more MDCP PDUs comprise a first MDCP PDU;

delivering, by the first terminal, the first MDCP PDU to a satellite link control (SLC) layer as an SLC SDU of the SLC layer;

segmenting, by the first terminal, the SLC SDU into one or more SLC PDUs; and sending, by the first terminal, the one or more SLC PDUs to the satellite network device.

14. The method of claim 13, wherein receiving the letter download query result packet from the satellite network device comprises:

receiving, by the first terminal, P SLC PDUs from the satellite network device, wherein P is a positive integer;

splicing, by the first terminal, the P SLC PDUs into Q SLC SDUs at the SLC layer, wherein Q is a positive integer, and wherein Q is less than or equal to P;

uploading, by the first terminal, the Q SLC SDUs to the MDCP layer as Q MDCP PDUs of the MDCP layer;

splicing, by the first terminal, the Q MDCP PDUs into an MDCP SDU at the MDCP layer; and uploading, by the first terminal after removing the padding data and the redundancy length indicator field from the MDCP SDU at the MDCP layer, the MDCP SDU to the APP layer as the letter download query result packet.

15. The method of claim 14, wherein after receiving the letter download query result packet from the satellite network device, the method further comprises:

parsing, by the first terminal, the content that is of the second letter and that is in the letter content field in the letter download query result packet; and displaying, by the first terminal, the content of the second letter on a display.

16. A first terminal, comprising:

one or more memories configured to store computer program code comprising computer instructions; and one or more processors coupled to the one or more memories and configured to execute the computer instructions to cause the first terminal to:

receive a first letter;

send a letter download query request packet to a satellite network device, wherein the letter download query request packet requests downloading first content of a letter from one or more second terminals to the first terminal, wherein the letter download query request packet comprises a message identifier (ID) field, wherein the message ID field indicates a first letter ID of the first letter, and wherein the first letter ID instructs the satellite network device to delete the first letter;

receive a second letter from the one or more second terminals; and receive a letter download query result packet from the satellite network device, wherein the letter download query result packet comprises a letter content field and a second letter ID field, the letter content field indicates second content of the second letter, wherein the second letter ID field indicates an ID of the second letter, and wherein the second letter ID is arranged after the first letter ID in sequence.

17. The first terminal of claim 16, wherein the letter download query request packet further comprises a service type field, wherein when the service type field is a first value, the service type field indicates that the letter download query request packet requests downloading the second content of the second letter from a second terminal of the second terminals in a trustlist to the first terminal, wherein when the service type field is a second value, the service type field indicates that the letter download query request packet requests downloading the second content of the second letter from a second terminal of the second terminals that is not in the trustlist, wherein when the service type field is a third value, the service type field indicates that the letter download query request packet requests downloading content of second letters from all second terminals to the first terminal, wherein the trustlist is set in the first terminal, and wherein the trustlist stores an identifier of a second terminal of the second terminals associated with the first terminal and a first sequence number of the second terminal associated with the first terminal.

18. The first terminal of claim 17, wherein when the service type field is the first value, the letter download query request packet further comprises a first sender ID field indicating a second sequence number of the second terminal in the trustlist, and wherein when the service type field is the second value, the letter download query request packet further comprises the first sender ID field indicating an identifier of the second terminal that is not in the trustlist.

19. The first terminal of claim 18, wherein the letter download query result packet further comprises a trustlist indicator field and a second sender ID field, wherein when the trustlist indicator field is a fourth value, the trustlist indicator field indicates that the second sender ID field is a mobile phone number of the second terminal that is not in the trustlist, and wherein when the trustlist indicator field is a fifth value, the trustlist indicator field indicates that the second sender ID field is the second sequence number.

20. A chip system, used in a terminal and comprising:

an interface circuit configured to receive code instructions and transmit the code instructions; and a processing circuit coupled to the interface circuit and configured receive the code instructions, wherein the processing circuit is configured to:

receive a first letter;

send a letter download query request packet to a satellite network device, wherein the letter download query request packet requests downloading first content of a letter from one or more second terminals to the first terminal, wherein the letter download query request packet comprises a message identifier (ID) field, wherein the message ID field indicates a first letter ID of the first letter, and wherein the first letter ID instructs the satellite network device to delete the first letter;

receive a second letter from the one or more second terminals; and receive a letter download query result packet from the satellite network device, wherein the letter download query result packet comprises a letter content field and a second letter ID field, the letter content field indicates second content of the second letter, wherein the second letter ID field indicates an ID of the second letter, and wherein the second letter ID is arranged after the first letter ID in sequence.

* * * * *